United States Patent
Yanagi et al.

(10) Patent No.: US 6,509,895 B2
(45) Date of Patent: *Jan. 21, 2003

(54) VOLTAGE GENERATING CIRCUIT, AND COMMON ELECTRODE DRIVE CIRCUIT, SIGNAL LINE DRIVE CIRCUIT AND GRAY-SCALE VOLTAGE GENERATING CIRCUIT FOR DISPLAY DEVICES

(75) Inventors: Toshihiro Yanagi, Nara (JP); Hisao Okada, Ikoma-gun (JP); Tadatsugu Nishitani, Amagasaki (JP); Yuji Yamamoto, Kobe (JP); Takeshi Takarada, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/916,343

(22) Filed: Jul. 30, 2001

(65) Prior Publication Data

US 2002/0018059 A1 Feb. 14, 2002

Related U.S. Application Data

(62) Division of application No. 09/234,446, filed on Jan. 21, 1999, now Pat. No. 6,310,616, which is a division of application No. 08/194,151, filed on Feb. 9, 1994, now Pat. No. 5,929,847.

(30) Foreign Application Priority Data

| Feb. 9, 1993 | (JP) | 5-21532 |
| Feb. 9, 1993 | (JP) | 5-21533 |
| Jul. 7, 1993 | (JP) | 5-168120 |
| Aug. 6, 1993 | (JP) | 5-196417 |
| Aug. 10, 1993 | (JP) | 5-198635 |
| Oct. 22, 1993 | (JP) | 5-265120 |
| Nov. 11, 1993 | (JP) | 5-282580 |

(51) Int. Cl.⁷ .............................................. G09G 5/00
(52) U.S. Cl. ........................ 345/211; 345/204; 345/89
(58) Field of Search .............................. 345/94, 95, 96, 345/89, 147

(56) References Cited

U.S. PATENT DOCUMENTS

| 3,938,136 A | 2/1976 | Kawakami |
| 3,955,185 A | 5/1976 | Nishimura |
| 4,141,002 A | 2/1979 | Reinhold |
| 4,781,437 A | 11/1988 | Shields et al. |
| 5,027,040 A | 6/1991 | Ikeda et al. |

(List continued on next page.)

FOREIGN PATENT DOCUMENTS

| EP | 0 391 655 | 10/1990 |
| EP | 0 435 258 | 7/1991 |
| EP | 0 515 191 | 11/1992 |
| EP | 0 532 191 | 3/1993 |
| EP | 0 599 621 | 1/1994 |
| JP | 61-33091 | 2/1986 |
| JP | 1-145632 | 6/1989 |
| JP | 1-147525 | 6/1989 |
| JP | 3-177890 | 8/1991 |
| JP | 3-251817 | 11/1991 |
| JP | 4-97218 | 3/1992 |
| JP | 4-136983 | 5/1992 |
| JP | 4-140787 | 5/1992 |
| JP | 5-53534 | 10/1993 |

OTHER PUBLICATIONS

Donald L. Shilling "Electronic Circuits Discrete and Integrated" McGraw-Hill, pp. 304-312.

*Primary Examiner*—Amare Mengistu
(74) *Attorney, Agent, or Firm*—Nixon & Vanderhye P.C.

(57) ABSTRACT

A drive circuit for a display device supplying a plurality of gray-scale voltages to the display device, based on externally supplied digital video signal data, includes: a plurality of gray-scale power supplies, a plurality of drive power supplies, a unit for forming a first part of the plurality of gray-scale voltages using the gray-scale voltage power supplies, and a unit for forming a second part of the plurality of gray-scale voltages using the drive power supplies.

6 Claims, 38 Drawing Sheets

U.S. PATENT DOCUMENTS

| | | | |
|---|---|---|---|
| 5,088,018 A | 2/1992 | Lee | |
| 5,252,954 A | 10/1993 | Nagata et al. | |
| 5,266,936 A | 11/1993 | Saitoh | |
| 5,301,047 A | 4/1994 | Hoshino et al. | |
| 5,347,294 A * | 9/1994 | Usui et al. | 345/89 |
| 5,363,118 A | 11/1994 | Okumura | |
| 5,365,250 A | 11/1994 | Hirashima | |
| 5,402,142 A | 3/1995 | Okada et al. | |
| 5,414,443 A | 5/1995 | Kanatani et al. | |
| 5,440,323 A | 8/1995 | Okada | |
| 5,469,068 A * | 11/1995 | Katsuma | 324/658 |
| 5,517,212 A | 5/1996 | Inoue | |
| 5,574,474 A | 11/1996 | Tamanoi | |
| 5,627,556 A | 5/1997 | Kwon et al. | |
| 5,642,126 A * | 6/1997 | Okada et al. | 345/94 |
| 5,673,061 A * | 9/1997 | Okada et al. | 345/89 |
| 5,680,148 A * | 10/1997 | Okada et al. | 345/95 |
| 5,729,246 A | 3/1998 | Masuko | |
| 5,844,536 A * | 12/1998 | Okada et al. | 345/94 |
| 5,859,632 A | 1/1999 | Ito | |
| 5,929,847 A * | 7/1999 | Yanagi et al. | 345/204 |
| 6,002,384 A * | 12/1999 | Tamai et al. | 345/95 |
| 6,151,005 A * | 11/2000 | Takita et al. | 345/89 |
| 6,172,663 B1 * | 1/2001 | Okada et al. | 345/96 |
| 6,219,016 B1 * | 4/2001 | Lee | 345/87 |
| 6,222,515 B1 * | 4/2001 | Yamaguchi et al. | 345/89 |
| 6,310,616 B1 | 10/2001 | Yanagi et al. | 345/211 |
| 6,331,797 B1 * | 12/2001 | Lambert | 326/68 |
| 6,437,716 B2 * | 8/2002 | Nakao | 341/118 |

\* cited by examiner

VOLTAGE GENERATING CIRCUIT, AND COMMON ELECTRODE DRIVE CIRCUIT, SIGNAL LINE DRIVE CIRCUIT AND GRAY-SCALE VOLTAGE GENERATING CIRCUIT FOR DISPLAY DEVICES

This application is a division of application Ser. No. 09/234,446, filed Jan. 21, 1999, now U.S. Pat. No. 6,310,616, which is a Divisional of Ser. No. 08/194,151, filed Feb. 9, 1994, now U.S. Pat. No. 5,929,847, the entire content of which is hereby incorporated by reference in this application.

BACKGROUND OF THE INVENTION

1. Field of the Invention

The present invention relates to a voltage generating (output) circuit used as a drive source of a device for directly or indirectly driving a capacitive load; a common electrode drive circuit of a display device provided with the voltage generating circuit, for driving a common electrode in a display device; and a signal line drive circuit and a gray-scale (gradation) voltage generating circuit of a display device provided with the voltage generating circuit, for driving the signal lines in a display device.

2. Description of the Related Art

An active matrix liquid crystal display device of FIG. 48 represents an example of the above-mentioned display device. This liquid crystal display device includes liquid crystal which is a display medium between two substrates 100 and 101 facing each other. Pixel electrodes 103 (P(i, j)) are arranged in a matrix on the liquid crystal side of the substrate 100, and signal lines (data lines or source lines) 104 (S(1), S(2), ..., S(i), ..., S(N)) and scanning lines (gate lines) 105 (G(1), G(2), ..., G(j), ..., G(M)) are provided at the periphery of each pixel electrode 103 so as to cross each other. A thin film transistor (TFT) 102 (T(i, j)) is provided as a switching element in the vicinity of each crossing portion of the signal lines 104 and the scanning lines 105. The TFT 102 is connected to the signal line 104, the scanning line 105, and the pixel electrode 103 so as to drive the pixel electrode 103.

A common electrode 101a is provided on the liquid crystal side of the other substrate 101. A capacitance of the liquid crystal contributing to a display is formed between the common electrode 101a and the pixel electrodes 103.

A source driver (signal line drive circuit) 200 is connected to the signal lines 104, and a gate driver 300 is connected to the scanning lines 105. The source driver 200 supplies a voltage to the signal lines 104; in the example shown in FIG. 48, a digital source driver to which a video signal is applied in a digital form is used. The source driver 200 and the gate driver 300 are provided with an output signal from a control circuit 600. The control circuit 600 supplies a control signal POL to a gray-scale voltage generating circuit 400 and a common electrode drive circuit 500. The gray-scale voltage generating circuit 400 outputs gray-scale voltages $v_0$, $v_2$, $v_2$, and $v_3$ to the source driver 200, and the common electrode drive circuit 500 outputs a common electrode voltage $v_{com}$ to the common electrode 101a.

Hereinafter, the gray-scale voltage generating circuit 400 and the common electrode drive circuit 500 provided in the display device thus constructed will be as described. FIG. 49 shows an example of a drive circuit as proposed in "A driving circuit for a display device", Japanese Laid-Open Patent Publication No. 5-53534 by H. Okada. This drive circuit works a s the gray-scale voltage generating circuit 400 as well as the common electrode drive circuit 500. The drive circuit is provided with an operational amplifier $OP_c$ for generating the common electrode voltage $v_{com}$, and operational amplifiers $OP_0$ to $OP_3$ for generating the gray-scale voltages $v_0$ to $v_3$. Each inversion input terminal of the operational amplifiers $OP_c$, $OP_0$, and $OP_1$ is provided with the control signal POL. The control signal POL is inverted by an inverter INV and then input to each inversion input terminal of the operational amplifiers $OP_2$ and $OP_3$. Each non-inversion input terminal of the operational amplifiers $OP_c$ and $OP_0$ to $OP_3$ is provided with an output from resistance type potential dividers $PD_{com}$ and $PD_0$ to $PD_3$, respectively. The resistance dividers $PD_{com}$ and $PD_0$ to $PD_3$ respectively consist of two fixed resistors $R_{c1}$ and $R_{c2}$, $R_{01}$ and $R_{02}$, $R_{11}$ and $R_{12}$, $R_{21}$ and $R_{22}$, and $R_{31}$ and $R_{32}$. One terminal of each of the resistors $R_{c1}$, $R_{01}$, $R_{11}$, $R_{21}$, and $R_{31}$ is connected to a power supply $V_{dd}$ at a positive electric potential; and each of the other terminals of the resistors $R_{c2}$, $R_{02}$, $R_{12}$, $R_{22}$, and $R_{32}$ is connected to a power supply $V_{ss}$ at a ground electric potential.

FIG. 50A shows an example of an output waveform of the above-mentioned drive circuit. When the control signal POL is at a high level, the common electrode voltage $v_{com}$ and the gray-scale voltages $v_0$ to $v_3$ are output so that a voltage applied to a pixel has a positive polarity with respect to the common electrode (a time period in this state is referred to as "positive time period"). When the control signal POL is at a low level, the common electrode voltage $v_{com}$ and the gray-scale voltages $v_0$ to $v_3$ are output so that a voltage applied to a pixel has a negative polarity with respect to the common electrode (a time period in this state is referred to as "negative time period"). In either time period, the absolute value of an electric potential difference between the common electrode and the pixel electrode is set to be higher in the same order of the data value 0 to 3 (i.e., $|v_0-v_{com}|<|v_1-v_{com}|<|v_2-v_{com}|<|v_3-v_{com}|$).

The above relation represents a condition for driving a liquid crystal display body in a normally black mode. The above relation may be reversed when a liquid crystal display body is driven in a normally white mode. FIG. 50B shows an output in the case where the liquid crystal display body is driven in a normally white mode. It is not related to the present invention in which mode the liquid crystal display body is driven; therefore, in the following examples, either case (i.e., a normally black mode or a normally white mode) will be described. Unless otherwise stated, the level of a voltage refers to that in a positive time period. FIGS. 50A and 50B show waveforms in a line inversion in which the polarity of a voltage applied to a pixel is inverted per horizontal line (transverse line or row line).

The common electrode voltage $v_{com}$ and gray-scale voltages $v_0$ to $v_3$ oscillate in synchronization with the control signal POL based on a reference voltage $v_M$ (i.e., a voltage applied to each non-inversion input terminal) are output from the operational amplifiers $OP_c$ and $OP_0$ to $OP_3$ by appropriately setting the fixed resistors $R_{01}$, $R_{02}$, $R_{11}$, $R_{12}$, $R_{21}$, $R_{22}$, $R_{31}$, and $R_{32}$. As is understood from FIG. 50A, the voltages $v_{com}$, $v_0$, and $v_1$ have a phase opposite to that of the voltages $v_2$ and $v_3$. The amplitude of these voltages are determined in terms of an amplification ratio of the operational amplifiers $OP_c$ and $OP_0$ to $OP_3$.

FIG. 51 shows the gray-scale voltages $v_0$ to $v_3$ based on the common electrode voltage $v_{com}$ which is applied to the common electrode 101a. As is understood from FIG. 51, when a certain pixel is selected by the gate driver 300 through the scanning lines 105, the pixel electrode 103 is charged with an output (i.e., one of the gray-scale voltages $v_0$ to $v_3$) from the source driver 200 connected to the selected pixel, and the difference between the electric potential at the pixel electrode 103 and that of the common electrode 101a facing the pixel electrode 103 with the liquid crystal layer sandwiched therebetween.

As described above, in the case where the common electrode 101a is driven with an A.C. voltage, there is an advantage that the amplitude of a voltage to be applied to a signal line for obtaining a predetermined voltage between the pixel electrode 103 and the common electrode 101a can be decreased and a working voltage for the source driver 200 can be decreased (see Japanese Laid-Open Patent Publication No. 3-177890).

The gray-scale voltages $v_0$ to $v_3$ are supplied to the source driver 200 which is a signal line drive circuit.

FIG. 52 shows a circuit diagram showing the structure of the source driver 200. Video signal data is composed of two bits. That is, the video signal data has four values (0 to 3) and either of the gray-scale voltages $v_0$ to $v_3$ supplied from the gray-scale voltage generating circuit 400 shown in FIG. 48 is selected to be output in accordance with the respective value of the video signal data.

FIG. 53 shows a circuit diagram showing a circuit portion corresponding to the (i)th output. This circuit includes D-type flip-flops (sampling flip-flops) $M_{SMP}$ respectively for video signal data $D_0$ and $D_1$, flip-flops (holding flip-flops) $M_H$ respectively for the video signal data $D_0$ and $D_1$, a decoder DEC, analog switches $ASW_0$ to $ASW_3$ respectively provided between four kinds of power supplies $V_0$ to $V_3$ outputting gray-scale voltages $v_0$ to $v_3$, and a signal line S(i) ((i)th signal line 104). For sampling digital video signal data, various kinds of flip-flops other than D-type flip-flips can be used.

The operation of the source driver 200 with the above-mentioned structure will be described.

The two-bit video signal data ($D_0$, $D_1$) is taken in the sampling flip-flops $M_{SMP}$ at the time when a sampling pulse $T_{SMPi}$ corresponding to the (i)th signal line S(i) rises and held therein. When the sampling for one horizontal period is completed, an output pulse $O_E$ is given to the holding flip-flops $M_H$ and the video signal $D_0$, $D_1$ held in the sampling flip-flops $M_{SMP}$ are taken in the holding flip-flops $M_H$ to be output to the decoder DEC. The decoder DEC decodes the video signal data ($D_0$, $D_1$) and turns on one of the analog switches $ASW_0$ to $ASW_3$ in accordance with the values (0 to 3) of the video signal data. ($D_0$, $D_1$), whereby one of the four gray-scale voltages $v_0$ to $v_3$ is output to the signal line S(i).

FIG. 54 shows a liquid crystal display device which receives video signal data composed of three bits ($D_0$, $D_1$, $D_2$). FIG. 55 partially shows a circuit corresponding to the signal line S(i) of the source driver 210 of FIG. 54. More specifically, the source driver 210 has this structure as many as the signal lines 104 of a display panel (i.e., the number of this structure owned by the source driver 210 is identical with that of the signal lines 104 of a display panel). In this case, the video signal data has 8 values (0 to 7), and the signal voltage given to each pixel is either of eight levels of gray-scale voltages $v_0$ to $v_7$ output from gray-scale power supplies $V_0$ to $V_7$ of the gray-scale voltage generating circuit 410.

The source driver 210 includes first-stage D-type flip-flops $M_{SMP}$ used for sampling data, second-stage D-type flip-flops $M_H$ for holding data, a decoder DEC, and a plurality of analog switches $ASW_0$ to $ASW_7$ respectively provided between the eight external power supplies $V_0$ to $V_7$ and the signal line S(i). The first-stage D-type flip-flops $M_{SMP}$ and the second-stage D-type flip-flops $M_H$ are provided for each bit ($D_0$, $D_1$, $V_2$). Eight kinds of gray-scale voltages $v_0$ to $v_7$ from the gray-scale voltage generating circuit 410 and control signals $S_0$ to $S_7$ from the decoder DEC are respectively input to the analog switches $ASW_0$ to $ASW_7$. The respective analog switches $ASW_0$ to $ASW_7$ are turned on to output the gray-scale voltages $v_0$ to $v_7$ in accordance with the levels of the control signals $S_0$ to $S_7$.

In the case where the value of the video signal data is 3 in the source driver 210, the analog switch $ASW_3$ turns a conductive state, and the gray-scale voltage $v_3$ is output. In this case, the gray-scale voltage $v_3$ drives the signal line S(i) through the analog switch $ASW_3$. The gray-scale voltage generating circuit 410 is provided separately from the source driver 210 constituting a drive circuit; thus, the gray-scale voltages $v_0$ to $v_7$ are input to a drive circuit for each signal line S(i). The reason for this is that the number of the actual drive circuits is identical with that of the signal lines 104. For example, the number of the signal lines 104 is 1920 in the case of the VGA liquid crystal display device. There is a possibility that the gray-scale voltage generating circuit 410 drives all of the signal lines 104 simultaneously. In such a case, it is difficult to produce the gray-scale voltage generating circuit 410, which is capable of sufficiently supplying an electric current required for driving all of the signal lines 104 simultaneously, with high integration on the chip identical with that of the source driver 210.

In addition, the source driver 210 has problems such as a complicated structure and a large size. The reason for this is as follows: In the case where the digital video signal is 4 bit, 16 kinds of gray-scale voltages are required; as the video signal increases to 6 bit, 8 bit, etc., the number of gray-scale voltages required increases to 64, 256, etc. That is to say, the gray-scale voltages whose number is the same as that of the gray scales are required. Because of this, the structure of the power supply circuit for forming such a number of gray-scale voltages becomes complicated and is enlarged, and moreover, the connecting line between the voltage generating circuit and the analog switches becomes complicated.

In the above-mentioned situation, conventionally, the source driver 210 is only used for a 3-bit or 4-bit video signal. Thus, when a video signal is composed of a large number of bits, a drive circuit for performing a gray-scale display has been difficult to construct.

Considering the above, the inventors of the present invention achieved a method for interpolating a gray scale between a plurality of gray-scale voltages given from outside and have filed applications (Japanese Patent Application No. 4-129164 and Japanese Laid-open Patent Publication Nos. 4-136983, 4-140787 and 5-53534).

FIG. 24 shows a liquid crystal display device 220 having a basic structure of the present invention, based on an oscillating voltage driving method proposed in Japanese Laid-open Patent Publication No. 5-53534. FIG. 25 is a block diagram corresponding to the signal line S(i) of the source driver of FIG. 24 per output. The following description refers to FIGS. 24 to 27 to which examples of the present invention (described later) will also refer to.

The case where video signal data is composed of 3 bits ($D_0$, $D_1$, $D_2$) will be described. More specifically, the video signal data has 8 values (i.e., 0 to 7), and a signal voltage to be applied to each pixel is either one of external gray-scale voltages $v_0$, $v_2$, $v_5$, and $v_7$ supplied from the gray-scale power supplies $V_0$ to $V_7$ of a gray-scale voltage generating circuit 420, or either one of or a plurality of external gray-scale voltages between any two of the external gray-scale voltages $v_0$, $v_2$, $v_5$, and $v_7$.

A source driver 220 is provided for each bit ($D_0$, $D_1$, $D_2$) of the video signal data. The source driver 220 includes first-stage D-type flip-flops $M_{SMP}$ for sampling, second-stage D-type flip-flops $M_H$ for holding, a selection control circuit SCOL, and analog switches $ASW_0$ to $ASW_7$ provided between the external gray-scale voltage power supplies $V_0$ to $V_7$ and a signal line $S(i)$. The external gray-scale voltages $v_0$, $v_2$, $v_5$, and $v_7$ and control signals $S_0$, $S_2$, $S_5$, and $S_7$ from the selection control circuit SCOL are input to the analog switches $ASW_0$, $ASW_2$, $ASW_5$, and $ASW_7$. Further, a signal $t_3$ having a predetermined duty ratio is supplied to the selection control circuit SCOL.

The source driver 220 shown in FIGS. 24 and 25 has the same effects as those of the source driver 210 shown in FIGS. 54 and 55 in terms of the realization of an 8-gray-scale display. In the source driver of FIG. 25, in order to realize the 8-gray-scale display, the number of external gray-scale power supplies is reduced to four (i.e., half of the conventional example shown in FIG. 55). In the source driver 220, the outputs from the gray-scale voltage power supplies $V_1$, $V_3$, $V_4$, and $V_6$ are formed by the above-mentioned oscillating voltage driving method.

Table 1 shows the relation between the video signal data input to the source driver 3 and the gray-scale voltage obtained from the source driver 3.

TABLE 1

| $d_2$ | $d_1$ | $d_0$ | Output S (i) (FIG. 55) | Output S (i) (FIG. 25) |
|---|---|---|---|---|
| 0 | 0 | 0 | V0 | V0 |
| 0 | 0 | 1 | V1 | $\frac{V0 + 2V2}{3}$ |
| 0 | 1 | 0 | V2 | V2 |
| 0 | 1 | 1 | V3 | $\frac{2V2 + V5}{3}$ |
| 1 | 0 | 0 | V4 | $\frac{V2 + V5}{3}$ |
| 1 | 0 | 1 | V5 | V5 |
| 1 | 1 | 0 | V6 | $\frac{2V5 + V7}{3}$ |
| 1 | 1 | 1 | V7 | V7 |

When the value of the video signal data is either of 1, 2, 5, or 7, one of the external gray-scale voltages $v_0$ to $v_7$ input from outside is output to the signal line $S(i)$. When the value of the video signal data is other than 1, 2, 5, and 7, an oscillating voltage oscillating between any two external gray-scale voltages $v_0$ to $v_7$ are output to the signal line $S(i)$. Thus, an 8-gray-scale display can be obtained from 4 external gray-scale voltages.

Hereinafter, the oscillating voltage driving method will be described.

The output waveform corresponding to the external gray-scale voltage $v_1$ is shown in (1) of FIG. 26, and the output waveform corresponding to the external gray-scale voltages $v_0$ and $v_2$ are shown in (2) of FIG. 26. For example, an oscillating voltage oscillating a plurality of times between the external gray-scale voltages $v_0$ and $v_2$ during one output period (e.g., one horizontal scanning period) is output. The resistance and capacitance of wirings (i.e., signal line) between the source driver 220 and pixels forming a display panel constitutes a low pass filter (LPF), as shown in FIG. 56. The oscillating voltage passes through the LPF, whereby the gray-scale voltage $v_1$ is applied to a pixel as an average value of the oscillating voltage.

FIG. 27 shows the waveform of the external gray-scale voltages $v_0$ and $v_7$ together with a common electrode signal $v_{com}$. FIG. 27 shows the waveforms in the case of line inversion in which the polarity of the voltage is inverted per horizontal scanning period. Hereinafter, the case of the line inversion will be described.

As is understood from FIG. 27, the external gray-scale voltage $v_0$ has a polarity opposite to that of the common electrode signal $v_{com}$, and the external gray-scale voltage $v_0$ and the common electrode signal $v_{com}$ have rectangular waveforms which are alternately inverted at an identical point. In the case where the video signal data is 0, the capacitance of the liquid crystal layer of each pixel and the like is charged with a voltage between the gray-scale voltage $v_0$ and the common electrode signal $v_{com}$.

As described above, the signal line 104 of the display panel is charged and discharged between a positive electric potential and a negative electric potential each time the outputs of the common electrode drive power supply 500 and the gray-scale generating circuit 420 have their polarity inverted. FIG. 56 shows an equivalent circuit in the case where the signal line 104 is considered as a load. In this equivalent circuit, an equivalent resistor $R_s$ of the signal line 104 and an equivalent capacitance $C_s$ thereof are connected in series. In a practical liquid crystal display device, the number of the signal lines 104 are 1920 (640×3), for example, in a display panel with a VGA specification, and the gray-scale power supplies are in some cases required to drive a load 1920 times that of the circuit shown in FIG. 56.

Hereinafter, a peak electric current flowing when the polarity of the gray-scale voltage is inverted will be considered.

Assuming that the resistance of the equivalent resistor $R_s$ of the signal line 104 is 50 KΩ and the maximum electric potential difference between the positive state and the negative state in the common electrode 101a is 10 V, the maximum peak electric current is 10/50 KΩ×1920=384 mA. Conventionally, the gray-scale power supply is required to have an ability of charging the maximum capacity of an electric current; therefore the gray-scale power supply may have a structure as shown in FIG. 57.

This circuit includes an operational amplifier OP and a complementary circuit (electric current amplifier) BUF. The operational amplifier OP is provided with a predetermined voltage and a control voltage POL. The output terminal of the operational amplifier OP is connected the complementary circuit BUF consisting of transistors $Q_1$ and $Q_2$. When an output voltage $V_{out}$ from the complementary circuit BUF is fed back to the operational amplifier OP, the operational amplifier OP performs an inversion amplification. In the circuit of FIG. 57, the operational amplifier OP uses a slewing rate and an electric current capacity as large as possible.

The above-mentioned art causes the increase in cost. In addition, since the complementary circuit BUF (transistors $Q_1$ and $Q_2$) itself consumes an electric power, the consumption of electric current is increased. The increase in the consumption of electric current means an increase in electric current which is not required for driving the display panel.

There is no substantial difference between the case where the circuit shown in FIG. 57 is used as the common electrode drive circuit and the case where the circuit shown in FIG. 57 is used for each gray-scale voltage generating element of the gray-scale voltage generating circuit. However, in the case where the circuit shown in FIG. 57 is used for each gray-scale voltage generating element, the output voltage will have an amplitude and a center voltage corresponding to the respective data and will have the same phase with respect to the control voltage POL.

Further, there is another problem. That is, in the conventional gray-scale voltage generating device, when the signal line drive circuit (source driver) selects either of the gray-scale voltages $v_0$ to $v_3$, a load is rapidly fluctuated at the time of switching the polarity of the output of the gray-scale voltage generating circuit. In the case where the oscillating voltage driving method is applied to the signal line drive circuit, the load fluctuation is larger and the change speed thereof is higher than the case where a gray-scale voltage is merely selected.

Such a load fluctuation causes the fluctuation of the output voltage. FIG. 58 shows an example of an output waveform of a certain voltage level of the gray-scale voltage generating circuit, in the case where the oscillating voltage driving method is applied to the signal line drive circuit. As shown in this figure, since the voltage having the output waveform of the gray-scale voltage generating circuit is fluctuated, the voltage to be charged to a pixel is not uniform, resulting in the deterioration of display quality.

In order to solve the above-mentioned problems, it is considered that a capacitor be provided between the output terminal of the gray-scale voltage generating circuit and the gray-scale voltage input terminal of the signal line drive circuit, thereby absorbing and supplying a charge in accordance with the voltage fluctuation. However, in this case, it has been difficult to use a capacitor with a sufficient capacitance. The reasons for this are as follows:

When the output terminal of the gray-scale voltage generating circuit is connected to the capacitor, the capacitor itself becomes a load on the gray-scale voltage generating circuit performing an A.C. drive. This necessitates that the capacitor be charged and discharged by the gray-scale voltage generating circuit at the time of switching the polarity of the gray-scale voltage. As a result, there arises some problems such as the delayed output waveform of the gray-scale voltage generating circuit and the increased electric power consumption is increased. Thus, in actuality, it has been impossible to use a capacitor with a sufficient capacitance.

The above-mentioned problems are hardly ever known in the case where the source driver 210 having a structure shown in FIG. 55 is used; however, these problems are serious in the case of the signal line drive circuit using the oscillating voltage driving method as shown in FIG. 25. More specifically, a capacitor with a capacitance sufficient for compensating the current fluctuation due to the oscillating voltage which is switched at a higher speed per output period cannot be used. This causes the strain of the voltage as shown in FIG. 58 and in some cases, the deterioration of a display will be caused. In addition, in the common electrode driving circuit, the problems similar to those in the gray-scale voltage generating circuit arise. The voltage (output waveform) from the common electrode driving circuit is fluctuated because of the sudden load fluctuation of the source driver 220, in particular, using the oscillating voltage driving method; as a result, a display quality is deteriorated.

SUMMARY OF THE INVENTION

The drive circuit for a display device of this invention supplying a plurality of gray-scale voltages to the display device, based on externally supplied digital video signal data, comprises: a plurality of gray-scale power supplies, a plurality of drive power supplies, means for forming a first part of the plurality of gray-scale voltages using the gray-scale voltage power supplies, and means for forming a second part of the plurality of gray-scale voltages using the drive power supplies.

In one embodiment of the present invention, the gray-scale voltages formed by the drive power supplies is at least one of a maximum gray-scale voltage and a minimum gray-scale voltage among the plurality of gray-scale voltages.

In another embodiment of the present invention, the means for forming the second part of the plurality of gray-scale voltages by the drive power supplies comprises a pair of ON-OFF control means for forming one of the plurality of gray-scale voltages, respectively provided in first and second sections, one of the pair of ON-OFF control means in the first section is an AND circuit, the other of the pair of ON-OFF control means in the first section is a NOR circuit, the AND circuit performs an ON-OFF switch of one of the pair of ON-OFF control means in the second section, and the NOR circuit performs an ON-OFF switch of the other of the pair of ON-OFF control means in the second section.

According to another aspect of the present invention, a voltage generating circuit comprises:

two D.C. power supplies respectively outputting predetermined voltages at different levels;

means, which comprises switching means for alternately selecting the output voltages supplied from the two D.C. power supplies to output the selected voltage, for outputting an A.C. voltage based on the output voltage selected by the switching means; and capacitor means branched to be connected to two wirings electrically connecting the respective D.C. power supplies to the switching means.

In one embodiment of the present invention, the capacitor means is independently connected to the two wirings.

In another embodiment of the present invention, the two wirings are connected to each other with the capacitor means therebetween.

In another embodiment of the present invention, two kinds of control voltages at predetermined electric potentials are respectively input to the two D.C. power supplies, one of the two D.C. power supplies outputs a voltage equal to a sum of the two kinds of control voltages, and the other of the two D.C. power supplies outputs a voltage equal to a difference between the two kinds of control voltages.

According to another aspect of the present invention, a common electrode drive circuit for a display device in which pixel electrodes are provided on one of two substrates facing each other with a display body sandwiched therebetween and a common electrode, which constitutes capacitance between the common electrode and the pixel electrodes, is provided on the other substrate, for driving the common electrode, comprises:

two D.C. power supplies respectively outputting predetermined voltages at different levels;

means, which comprises switching means for alternately selecting the output voltages supplied from the two D.C. power supplies to output the selected voltage, for outputting an A.C. voltage based on the output voltage selected by the switching means; and capacitor means branched to be connected to two wirings electrically connecting the respective D.C. power supplies to the switching means.

In one embodiment of the present invention, the capacitor means is independently connected to the two wirings.

In another embodiment of the present invention, the two wirings are connected to each other with the capacitor means therebetween.

In another embodiment of the present invention, two kinds of control voltages at predetermined electric potentials are respectively input to the two D.C. power supplies, one of the two D.C. power supplies outputs a voltage equal to a sum of the two kinds of control voltages, and the other of the two D.C. power supplies outputs a voltage equal to a difference between the two kinds of control voltages.

According to another aspect of the present invention, a signal line drive circuit for a display device in which pixel electrodes and signal lines are provided on one of two substrates facing each other with a display body sandwiched therebetween, for supplying a signal to the pixel electrodes through the signal lines, comprises at least two voltage supply sources for supplying a voltage to the signal lines respectively comprising:

two D.C. power supplies respectively outputting predetermined voltages at different levels;

means, which comprises switching means for alternately selecting the output voltages supplied from the two D.C. power supplies to output the selected voltage, for outputting an A.C. voltage based on the output voltage selected by the switching means; and capacitor means branched to be connected to two wirings electrically connecting the respective D.C. power supplies to the switching means.

In one embodiment of the present invention, the capacitor means is independently connected to the two wirings.

In one embodiment of the present invention, the two wirings are connected to each other with the capacitor means therebetween.

In one embodiment of the present invention, two kinds of control voltages at predetermined electric potentials are respectively input to the two D.C. power supplies, one of the two D.C. power supplies outputs a voltage equal to a sum of the two kinds of control voltages, and the other of the two D.C. power supplies outputs a voltage equal to a difference between the two kinds of control voltages.

According to another aspect of the present invention, a gray-scale voltage generating circuit for a display device in which pixel electrodes are provided on one of two substrates facing each other with a display body sandwiched therebetween, for supplying a plurality of gray-scale voltages to the pixel electrodes, based on a digital video signal externally supplied, comprises:

a plurality of voltage generating circuits outputting A.C. voltages at different levels; and first capacitor means provided between any two of the plurality of voltage generating circuits, each of the voltage generating circuits comprising:
two voltage sources outputting voltages at different levels; and
switching means which receives voltages output from the two voltage sources and externally outputs one of the voltages,
wherein one terminal of the first capacitor means is connected between either one of the two voltage sources and the switching means in one of the two of the voltage generating circuits and the other terminal of the first capacitor means is connected between either one of the two voltage sources and the switching means in the other of the two voltage generating circuits.

In one embodiment of the present invention, each of the voltage generating circuits further comprises second capacitor means, and one terminal of the second capacitor means is connected between one of the two voltage sources and the switching means.

In another embodiment of the present invention, the voltage generating circuit further comprises third capacitor means, one terminal of the third capacitor means is connected. between one of the two voltage sources and the switching means and the other terminal of the third capacitor means is connected between the other of the two voltage sources and the switching means.

According to another aspect of the present invention, a signal line drive circuit electrically connected to a capacitance load of a display body which performs a display with a charge charged in the capacitive load, comprises:

a gray-scale voltage generating circuit outputting a plurality of A.C. voltages at different levels; and means for outputting a voltage to the display body, the voltage being among the plurality of A.C. voltages output from the gray-scale voltage generating circuit, corresponding to image data to be displayed on the display body, each of the gray-scale voltage generating circuits comprising:
a plurality of voltage generating circuits outputting A.C. voltages at different levels; and
first capacitor means provided between any two of the plurality of voltage generating circuits,
each of the voltage generating circuit comprising:
two voltage sources outputting voltages at different levels; and
switching means which receives voltages output from the two voltage sources and outputs one of the two voltages to the capacitance load,
wherein one terminal of the first capacitor means is connected between either one of the two voltage sources and the switching means in one of the two voltage generating circuits and the other terminal of the first capacitor means is connected between either one of the two voltage sources and the switching means in the other of the two voltage generating circuits.

According to another aspect of the present invention, a voltage generating circuit comprises:

a power supply outputting a power supply signal in an A.C. waveform, the power supply signal alternately having a first period in which the power supply signal is at a first level and a second period in which the power supply signal is at a second level;

a power supply line one terminal of which is connected to the power supply;

a load connected to the other terminal of the power supply line, which receives the power supply signal from the power supply;

a plurality of charge storage means connected so as to be in parallel with the power supply line between the power supply and the load; and a plurality of switching means respectively provided between the power supply line and each of the charge storage means, the plurality of switching means connecting a first part of the plurality of charge storage means to the power supply while disconnecting a second part of the plurality of charge storage means from the power supply when the power supply signal is in the first period, and connecting the second part of the plurality of charge storage means to the power supply while disconnecting the first part of the plurality of charge storage means from the power supply when the power supply signal is in the second period.

In one embodiment of the present invention, a pair of charge storage means are connected in parallel with the power supply line.

In another embodiment of the present invention, a pair of power supplies and a pair of power supply lines are used.

In another embodiment of the present invention, the plurality of switching means are respectively provided between one of the pair of charge storage means and the pair of power supply lines and between the other of the pair of charge storage means and the pair of power supply lines.

In another embodiment of the present invention, the power supply signal is in a rectangular waveform.

According to another aspect of the present invention, a voltage generating circuit comprises:

a power supply outputting a plurality of power supply signals in an A.C. waveform at different levels, each of the power supply signals alternately having a first period in which the power supply signal is at a first level and a second period in which the power supply signal is at a second level;

a plurality of power supply lines, one terminal of each of the power supply lines being connected to the power supply, respectively receiving the plurality of power supply signals from the power supply;

a plurality of loads, each of the loads being connected to the other terminal of each of the power supply lines, respectively receiving the plurality of power supply signals from the power supply;

charge storage means connected between the plurality of power supply lines provided between the power supply and the plurality of loads, having a first electrode and a second electrode;

a plurality of switching means respectively provided between the plurality of power supply lines and the first electrode of the charge storage means and between the plurality of power supply lines and the second electrode of the charge storage means, each of the plurality of switching means connecting the first electrode to a power supply line which receives one of the plurality of power supply signals while connecting the second electrode to a power supply line other than the power supply line which receives the one of the plurality of power supply signals, when the one of the plurality of power supply signals is in the first period, and each of the plurality of switching means connecting the first electrode to one of the power supply lines other than the power supply line which receives the one of the power supply signals while connecting the second electrode to the power supply line which receives the one of the power supply signals, when the one of the plurality of power supply signals is in the second period.

In one embodiment of the present invention, a pair of power supplies and a pair of power supply lines are used, a pair of charge storage means are connected in parallel with each of the power signal lines, the plurality of switching means comprise a first switching element, a second switching element, a third switching element, and a fourth switching element, the first and third switching elements are respectively provided between the first electrode and one of the pair of the power supply lines, the second and fourth switching elements are respectively provided between the second electrode and the other of the pair of the power supply lines, the first and fourth switching elements are synchronously turned on or off, and the second and third switching elements are coupled to each other.

In another embodiment of the present invention, the power supply signal is in a rectangular waveform.

According to another aspect of the present invention, a voltage generating circuit comprises:

a first power supply outputting a first voltage in an A.C. waveform oscillating between a first level and a second level to a power supply line connected to a load;

a second power supply outputting a second voltage at a predetermined level;

a third power supply outputting a third voltage at a predetermined level;

a first switch connected in parallel with the power supply line;

storage means connected between the first switch and the second power supply;

a second switch connected between the storage means and the third power supply so as to be in parallel with the first switch;

control means for controlling the first and second switches so that the second switch is in a non-conductive state when the first switch is in a conductive state, the second switch is in a conductive state when the first switch is in a non-conductive state, the storage means is disconnected from the third power supply by the second switch in a period including a period in which the storage means is connected to the first power supply by the first switch, and the storage means is connected to the third power supply by the second switch in a period including a period in which the storage means is disconnected from the first power supply by the first switch.

In one embodiment of the present invention, the control means selects a timing, at which the storage means is connected to the first power supply, right after the first voltage from the first power supply is switched between the first and second levels, and part of charge, which is to be supplied or absorbed between the first power supply and the load at a time of switching of a level of the first voltage, is compensated by the storage means.

In another embodiment of the present invention, a plurality of storage means are used, the control means connects the first part of the plurality of storage means to the first power supply only when the first voltage from the first power supply is at the first level and connects the second part of the plurality of storage means to the first power supply only when the first voltage from the first power supply is at the second level.

According to another aspect of the present invention, a voltage generating circuit comprises:

a first power supply outputting a first voltage in an A.C. waveform to a power supply line, the first voltage oscillating between a first level and a second level and having an output cut-off period between a period of the first level and a period of the second level;

a second power supply outputting a second voltage at a predetermined level;

a third power supply outputting a third voltage at a level in the vicinity of the first level;

a fourth power supply outputting a fourth voltage at a level in the vicinity of the second level;

a first switch and a second switch connected to the power supply line, the first switch being in parallel with the second switch;

first storage means connected between the first switch and the second power supply;

second storage means connected between the second switch and the second power supply;

a third switch connected between the first storage means and the third power supply so as to be in parallel with the first switch;

a fourth switch connected between the second storage means and the fourth power supply so as to be in parallel with the second switch; and control means for controlling the first and third switches so that the third switch is in a non-conductive state when the first switch is in a conductive state, the third switch is in a conductive state when the first switch is in a non-conductive state, during a period including a period in which the first voltage output to the power supply line is at the first level, the storage means being disconnected from the third power supply by the third switch during a period in which the storage means is connected to the power supply line by the first switch, the storage means being connected to the third power supply by the third switch during a period in which the storage means is disconnected from the power supply line by the first switch, the storage means being connected to the power supply line during the output cut-off period of the first voltage, the control means further controlling the second and fourth switches so that the fourth switch is in a non-conductive state when the second switch is in a conductive state, the fourth switch is in a conductive state when the second switch is in a non-conductive state, during a period including a period in which the first voltage output to the power supply is at the second level, the storage means being disconnected from the third power supply by the fourth switch during a period in which the storage means is connected to the power supply line by the second switch, the storage means being connected to the third power supply by the fourth switch during a period in which the storage means is disconnected from the power supply line by the second switch, the storage means being connected to the power supply line during the output cut-off period of the first voltage.

In one embodiment of the present invention, the first power supply comprises: a plurality of D.C. power supplies respectively outputting a plurality of D.C. voltages at different levels; a plurality of storage means respectively connected to an output terminal of each of the D.C. power supplies; and a plurality of switches respectively connected between the plurality of storage means and the power supply line.

In another embodiment of the present invention, the control means controls the first, second, third, and fourth switches so that the storage means is connected to the first power supply, at a time when the D.C. power supply, which has been connected to the storage means up to a time when the first voltage from the first power supply is switched between the first level and the second level, is disconnected therefrom or at a time right after the D.C. power supply is disconnected therefrom.

In another embodiment of the present invention, a D.C. power supply is used as the third and fourth power supplies.

According to another aspect of the present invention, a drive circuit for a display device in which pixel electrodes are provided on one of two substrates facing each other with a display body sandwiched therebetween and the common electrode forms capacitance between the common electrode and the pixel electrodes, comprises:

a common electrode drive circuit outputting two kinds of voltages at different levels in a rectangular waveform to the common electrode;

a voltage generating circuit generating a voltage at an arbitrary level between the levels of the two kinds of voltages in a rectangular waveform; and switching means for switching an output of the common electrode drive circuit to an output of the voltage generating circuit during a predetermined period in which the level of the voltage in a rectangular waveform is switched.

In one embodiment of the present invention, the switching means includes a first switching element and a second switching element, the first switching element switches the output of the common electrode drive circuit or an output of a gray-scale voltage drive circuit, the second switching element switches the output of the voltage generating circuit, whereby the output of the common electrode drive circuit or the output of the gray-scale voltage drive circuit to the output of the voltage generating circuit during the predetermined period in which the level of the voltage in a rectangular waveform is switched, the first and second switching elements are controlled so as to be turned off together, and an OFF period is set to be longer than a switching period which is a transient period of the first and second switching elements.

According to another aspect of the present invention, a drive circuit for a display device comprises:

a gray-scale voltage drive circuit which directly outputs externally supplied gray-scale voltages or outputs interpolated voltages formed of the combination of the gray-scale voltages, thereby applying two kinds of voltages at different levels in a rectangular waveform to signal lines;

a voltage generating circuit generating a voltage at an arbitrary level between the levels of the two kinds of voltages in a rectangular waveform; and switching means for switching an output of the gray-scale voltage drive circuit to an output of the voltage generating circuit during a predetermined period in which the level of the voltage in a rectangular waveform is switched.

In one embodiment of the present invention, the switching means includes a first switching element and a second switching element, the first switching element switches the output of the common electrode drive circuit or an output of a gray-scale voltage drive circuit, the second switching element switches the output of the voltage generating circuit, whereby the output of the common electrode drive circuit or the output of the gray-scale voltage drive circuit to the output of the voltage generating circuit during the predetermined period in which the level of the voltage in a rectangular waveform is switched, the first and second switching elements are controlled so as to be turned off together, and an OFF period is set to be longer than a switching period which is a transient period of the first and second switching elements.

According to another aspect of the present invention, a voltage generating circuit comprises:

a plurality of power supplies respectively outputting a voltage at a predetermined level, the respective levels of the voltages being different from each other;

a first switching means group including a plurality of switching means which respectively receive the voltage from the respective power supplies, in which the switching means is successively turned on, whereby a voltage whose level is switched from the level of the voltage from the respective power supplies is output; and a second switching means one terminal of which is connected to an output side of the first switching means group and the other terminal of which is grounded, the second switching means being turned on only during a period including a time at which the level of the voltage, whose level is to be switched, is switched and being turned off during the other period.

In one embodiment of the present invention, either one of the plurality of switching means forming the first switching means group and the second switching means is selected to be turned on and switching means to be turned on is moved sequentially.

In another embodiment of the present invention, in the case where each of the switching means forming the first switching means group and the second switching means use a switch having a large transient response, an OFF period is set to be sufficiently long so that each switch is not turned on simultaneously.

According to another aspect of the present invention, a common electrode drive circuit for a display device in which pixel electrodes are provided on one of two substrates facing each other with a display body sandwiched therebetween and a common electrode, which constitutes capacitance between the common electrode and the pixel electrodes, is provided on the other substrate, for driving the common electrode, comprises:

a plurality of power supplies respectively outputting a voltage at a predetermined level, the respective levels of the voltages being different from each other;

a first switching means group including a plurality of switching means which respectively receive the voltage from the respective power supplies, in which the switching means is successively turned on, whereby a voltage whose level is switched from the level of the voltage from the respective power supplies is output; and a second switching means one terminal of which is connected to an output side of the first switching means group and the other terminal of which is grounded, the second switching means being turned on only during a period including a time at which the level of the voltage, whose level is to be switched, is switched and being turned off during the other period.

In one embodiment of the present invention, either one of the plurality of switching means forming the first switching means group and the second switching means is selected to be turned on and switching means to be turned on is moved sequentially.

In another embodiment of the present invention, in the case where each of the switching means forming the first switching means group and the second switching means use a switch having a large transient response, an OFF period is set to be sufficiently long so that the switches are not turned on simultaneously.

According to another aspect of the present invention, a gray-scale voltage generating circuit for a display device in which pixel electrodes are provided on one of two substrates facing each other with a display body sandwiched therebetween, for supplying a plurality of gray-scale voltages to the pixel electrodes, based on an externally supplied digital video signal, comprises:

a plurality of power supplies respectively outputting a voltage at a predetermined level, the respective levels of the voltages being different from each other;

a first switching means group including a plurality of switching means which respectively receive the voltage from the respective power supplies, in which the switching means is successively turned on, whereby a voltage whose level is switched from the level of the voltage from the respective power supplies is output; and a second switching means one terminal of which is connected to an output side of the first switching means group and the other terminal of which is grounded, the second switching means being turned on only during a period including a time at which the level of the voltage, whose level is to be switched, is switched and being turned off during the other period.

In one embodiment of the present invention, either one of the plurality of switching means forming the first switching means group and the second switching means is selected to be turned on and switching means to be turned on is moved sequentially.

In another embodiment of the present invention, in the case where each of the switching means forming the first switching means group and the second switching means use a switch having a large transient response, an OFF period is set to be sufficiently long so that the switches are not turned on simultaneously.

Thus, the invention described herein makes possible the advantages of (1) providing a drive circuit for a display device at a low cost in which the number of gray-scale voltage power supplies can be reduced; (2) providing a gray-scale voltage generating device, a signal line drive circuit, and a common electrode drive circuit which can sufficiently cope with the rapid fluctuation of a load and can realize a high-grade display; and (3) a gray-scale voltage generating device, a signal line drive circuit, and a common electrode drive circuit which makes possible a display device with low power consumption.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings. In each of the following examples, a matrix type liquid crystal display device is exemplified. It is noted that the present invention can be applied to other kinds of display devices as well.

EXAMPLE 1

Figure 1:
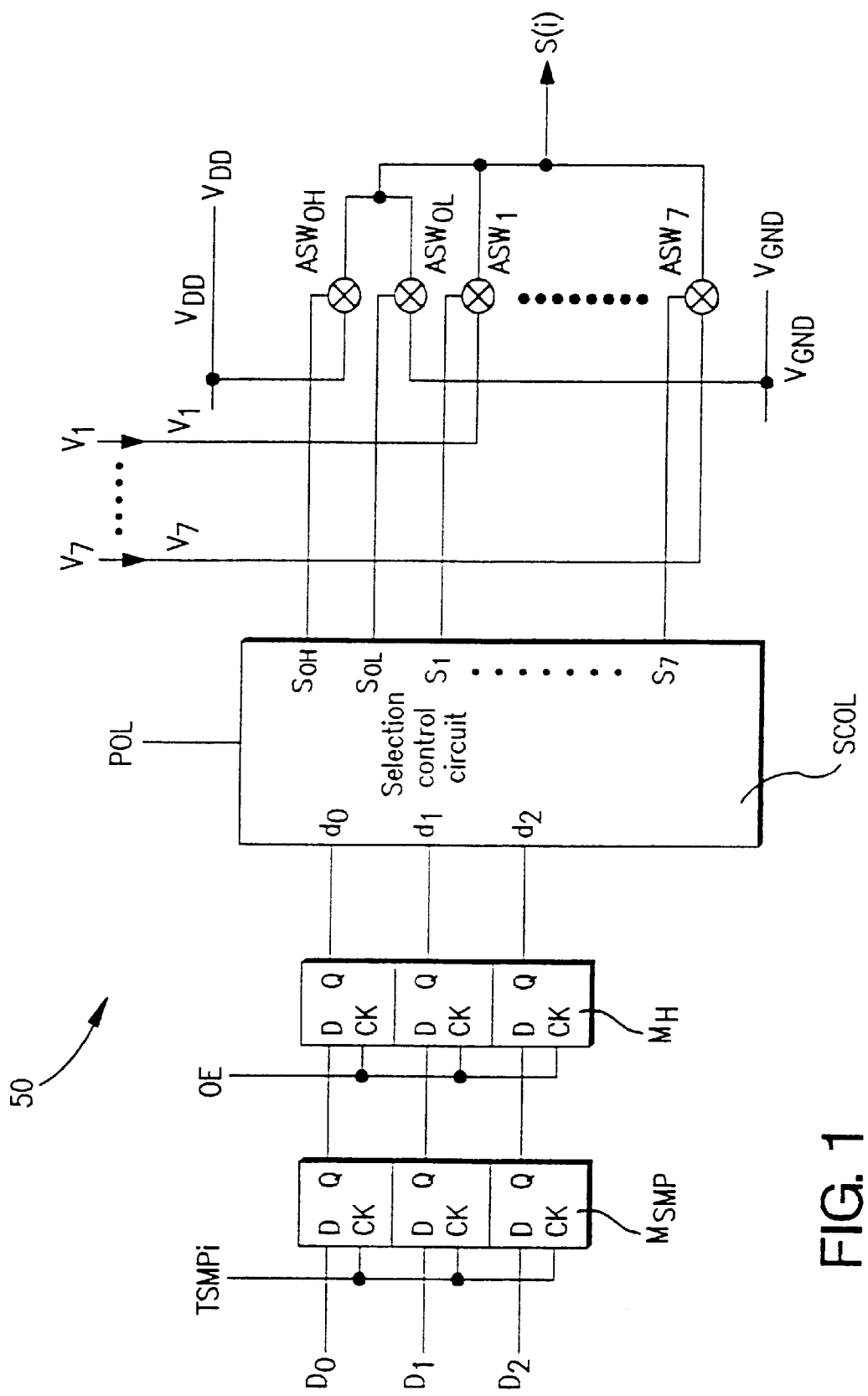
FIG. 1 is a block diagram showing part of one of a plurality of circuits provided on the output side of a source driver of Example 1.

FIG. 1 shows an output side of a drive circuit (source driver or digital data driver) of a display device according to the present invention. More specifically, FIG. 1 shows an exemplary structure of a circuit 50 corresponding to an (i)th pixel among N pixels. In this structure, digital video data consists of 3 bits.

The circuit 50 includes sampling flip-flops $M_{SMP}$, holding flip-flops $M_H$, a selection control circuit SCOL, and nine analog switches $ASW_{OH}$, $ASW_{OL}$, $ASW_1$–$ASW_7$. Digital video data is received by the sampling flip-flops $M_{SMP}$ and is held by the holding flip-flops $M_H$. An output signal from the holding flip-flops $M_H$ is input to the selection control circuit SCOL. The selection control circuit SCOL has nine output terminals $S_{OH}$, $S_{OL}$, $S_1$–$S_7$. Nine analog switches $ASW_{OH}$, $ASW_{OL}$, $ASW_1$–$ASW_7$ are turned on or off based on the output signal from the nine output terminals $S_{OH}$, $S_{OL}$, $S_1$–$S_7$ of the selection control circuit SCOL, respectively.

The analog switches $ASW_{OH}$ and $ASW_{OL}$ are respectively provided with voltages $v_{DD}$ and $v_{GND}$ from a high-potential drive power supply $V_{DD}$ and a low-potential drive power supply $V_{GND}$. The high-potential drive power supply $V_{DD}$ and the low-potential drive power supply $V_{GND}$ are both provided in a drive power supply for driving the source driver. The analog switches $ASW_1$–$ASW_7$ are respectively provided with gray-scale voltages $v_1$–$v_7$ from gray-scale power supplies $V_1$–$V_7$ provided separately from the drive power supply. The analog switches $ASW_{OH}$, $ASW_{OL}$, $ASW_1$–$ASW_7$ output the voltage $v_{DD}$ or the like, which is given to the $ASW_{OH}$ or the like from the high voltage side drive power supply $V_{DD}$, to a signal line S(i), when being turned on based on the signal output from the output terminals $S_{OH}$, $S_{OL}$, $S_1$–$S_7$ of the selection control circuit SCOL.

In the present example, the case where a display device is driven in a normally white mode requiring the highest voltage when data is 0 will be described.

Table 2 is a logic table showing the relation between the input signal and output signal of the selection control circuit SCOL.

TABLE 2

| Video signal data | $d_2$ | $d_1$ | $d_0$ | $S_{OH}$ | $S_{OL}$ | $S_1$ | $S_2$ | $S_3$ | $S_4$ | $S_5$ | $S_6$ | $S_7$ |
|---|---|---|---|---|---|---|---|---|---|---|---|---|
| 0 | 0 | 0 | 0 | p | p̄ | | | | | | | |
| 1 | 0 | 0 | 1 | | | 1 | | | | | | |
| 2 | 0 | 1 | 0 | | | | 1 | | | | | |
| 3 | 0 | 1 | 1 | | | | | 1 | | | | |
| 4 | 1 | 0 | 0 | | | | | | 1 | | | |
| 5 | 1 | 0 | 1 | | | | | | | 1 | | |
| 6 | 1 | 1 | 0 | | | | | | | | 1 | |
| 7 | 1 | 1 | 1 | | | | | | | | | 1 |

The first section of Table 2 shows the value of each bit input to input terminals $d_0$, $d_1$, and $d_2$ of the selection control circuit SCOL. The second section of Table 1 shows the value of each control signal output from the output terminals $S_{OH}$, $S_{OL}$, $S_1$–$S_7$ of the selection control circuit SCOL.

Figure 50A:
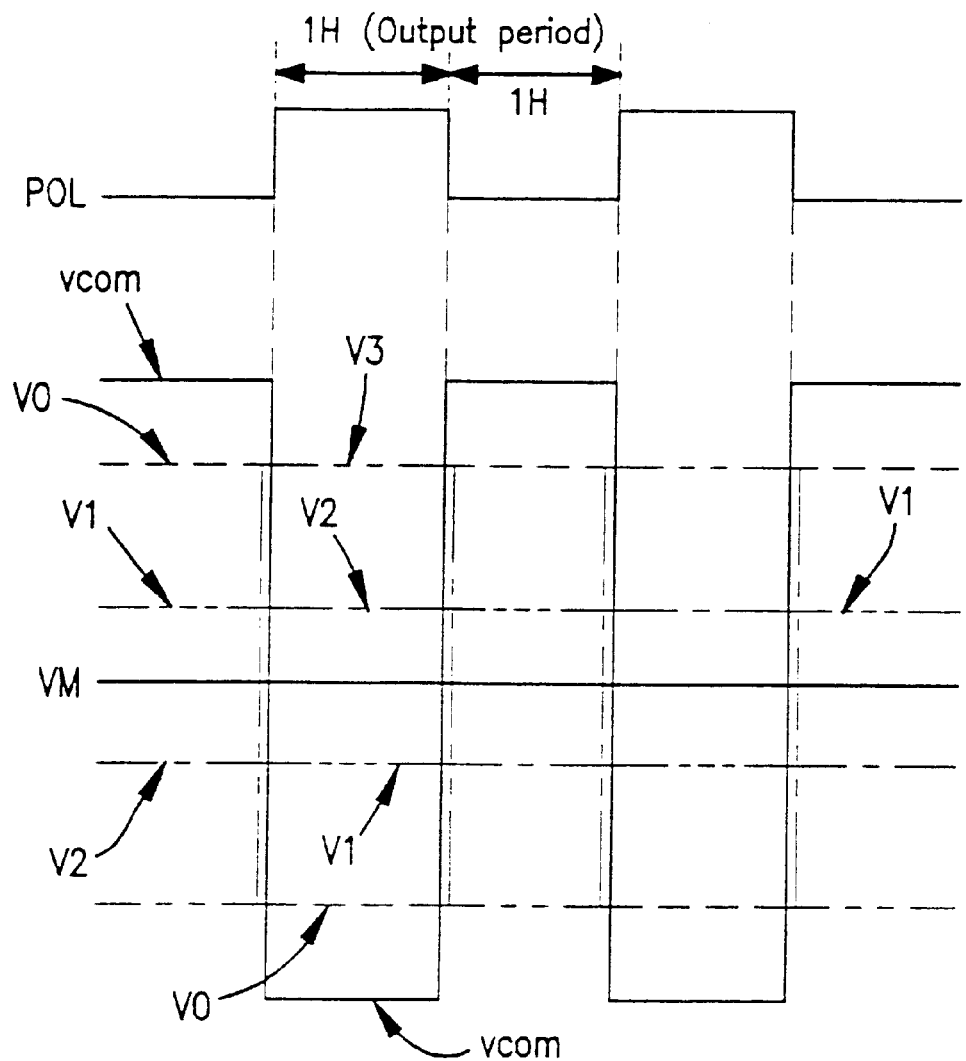
FIG. 50A is a timing chart of the output of the circuit of FIG. 49 in a normally black mode.
Figure 50B:
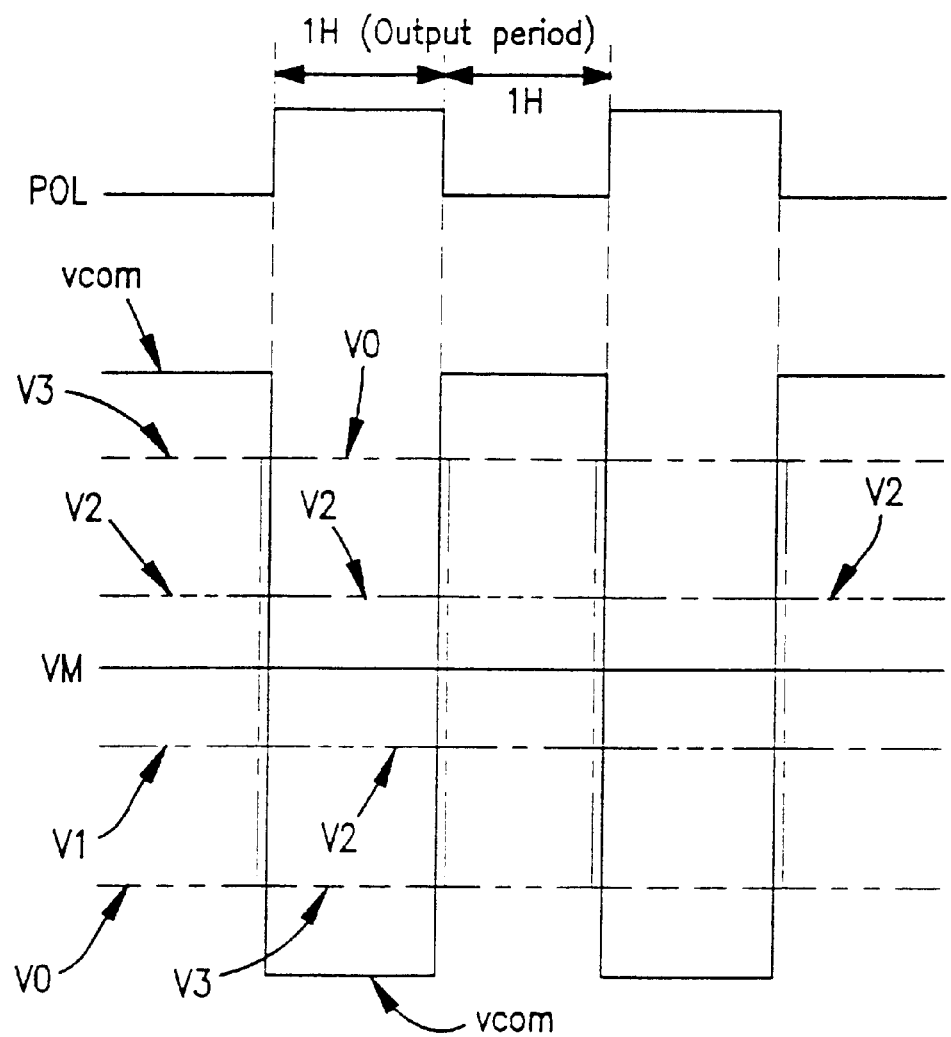
FIG. 50B is a timing chart of the output of the circuit of FIG. 49 in a normally white mode.
Figure 51:
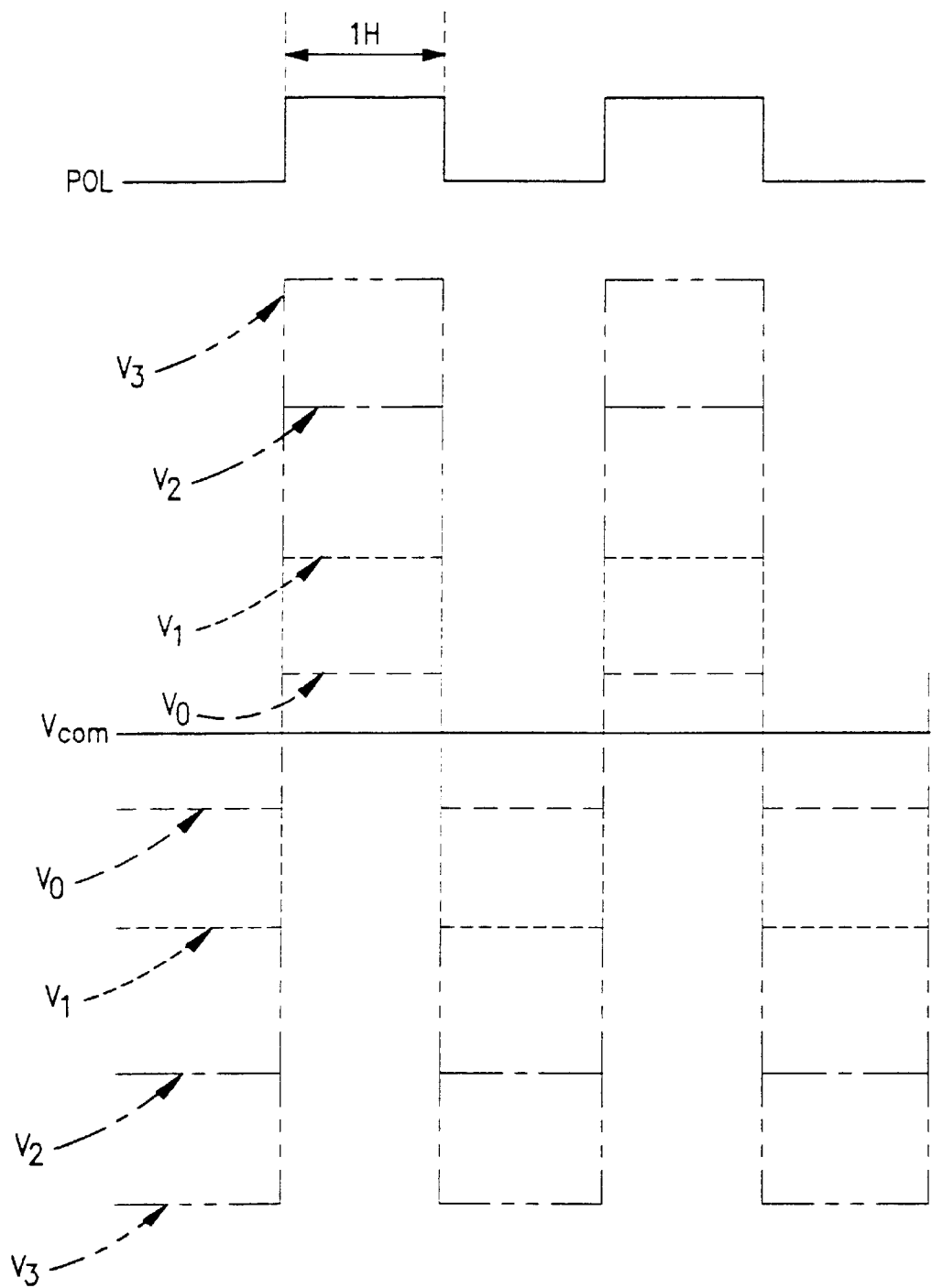
FIG. 51 is a block diagram showing each gray-scale voltage with respect to a common electrode voltage.
Figure 52:
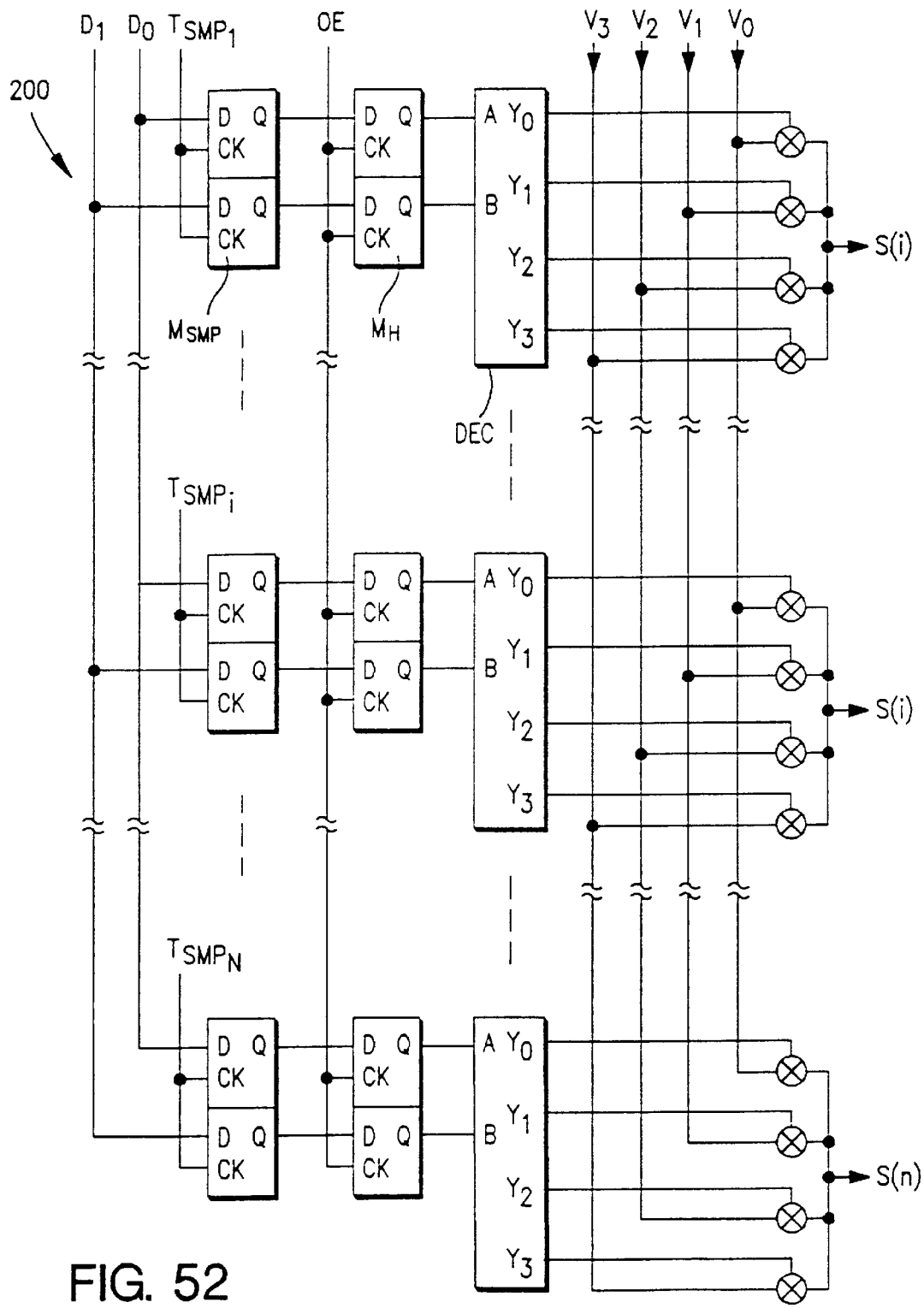
FIG. 52 is a block diagram of a digital source driver.
Figure 53:
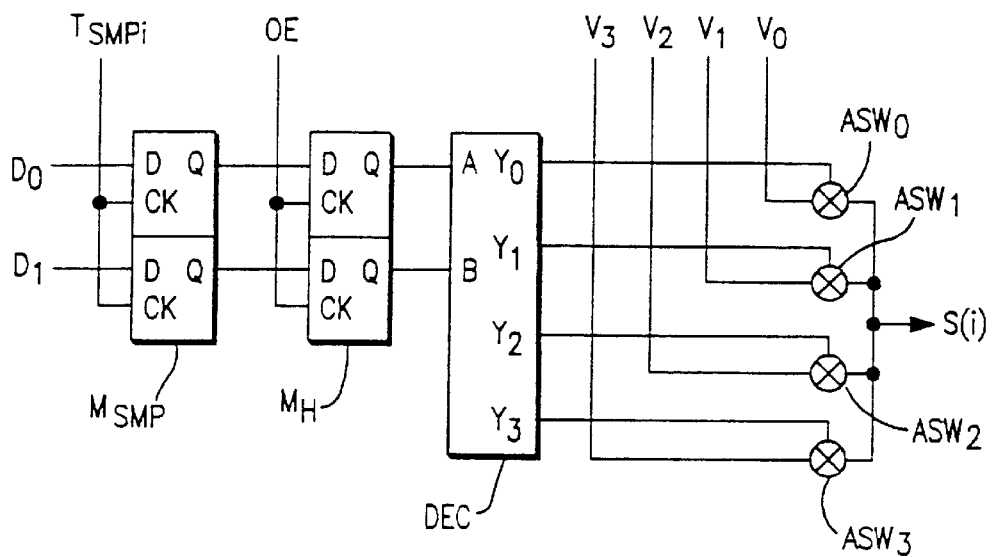
FIG. 53 is a block diagram showing part of the digital source driver of FIG. 52.

When the value of the control signal is 1, the analog switch connected to the output terminal from 10 which the control signal with the value 1 is output is turned on. When the value of the control signal is 0, the analog switch connected to the output terminal from which the control signal with the value of 0 is output is turned off. The blank portions of the second section of Table 2 represent the value of the control signal as 0. The symbol p represents the value of the control signal POL in FIGS. 50A and 50B. When the value of the control signal POL is at a high level (i.e., in a positive time period), the value of a signal p is 1, and when the value of the control signal POL is at a low level (i.e., in a negative time period), the value of the control signal p is 0. There are two cases regarding the inversion of the control signal POL: the control signal POL is inverted per horizontal line or per vertical line. Herein, principally, the case where the control signal POL is inverted per horizontal line is described. In the following description, the same case will also be described unless otherwise stated.

Next, the operation of the selection control circuit SCOL will be described.

In the case where the values of all the bits input to the input terminals $d_0$, $d_1$, and $d_2$ of the selection control circuit SCOL are 0, i.e., data to be output is 0, the corresponding value in the logic table is p. In this case, when p is 1, the output terminal $S_{OH}$ is turned on to output the voltage $v_{DD}$ from the high-potential drive power supply $V_{DD}$ to the signal line S(i). On the other hand, when p is 0, the output terminal $S_{OL}$ is turned on to output the voltage $v_{GND}$ from the low-potential drive power supply $V_{GND}$ to the signal line S(i).

Thus, according to the present example, an output equivalent to that of a gray-scale power supply $V_0$ in a conventional circuit can be obtained as a rectangular waveform consisting of two voltages $v_{DD}$ and $v_{GND}$ from the high-potential drive power supply $V_{DD}$ and the low-potential drive power supply $V_{GND}$. Accordingly, the number of the gray-scale power supplies can be reduced, compared with the conventional example.

EXAMPLE 2

In the present example, a source driver capable of further reducing the number of the gray-scale power supplies compared with Example 1 will be described. Components identical with those of Example 1 bear identical reference numerals.

Figure 2:
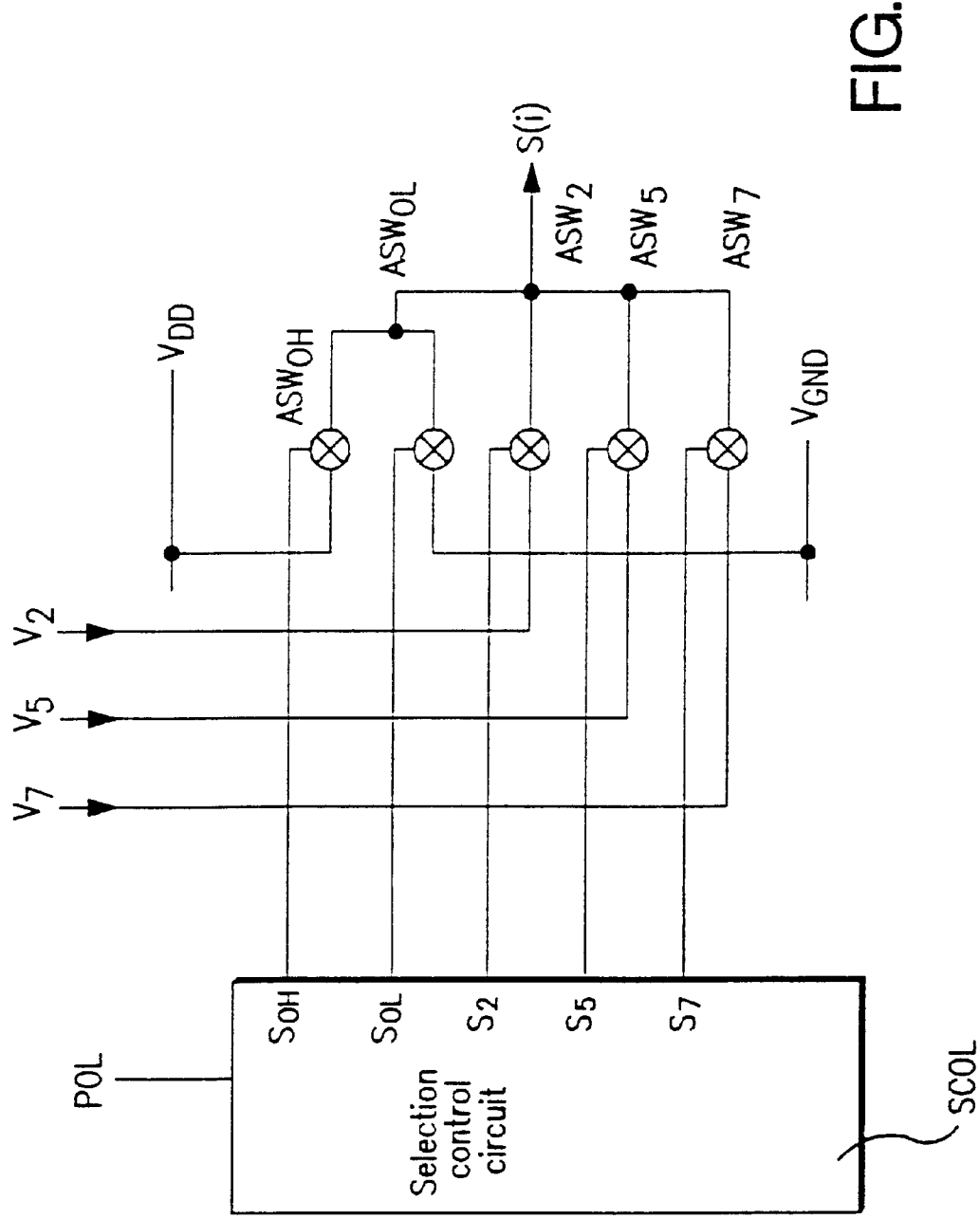
FIG. 2 is a block diagram showing part of one of a plurality of circuits provided on the output side of a source driver of Example 2.

FIG. 2 is a block diagram of a source driver according to the present example.

The circuit of the present example is provided with the voltages $v_{DD}$ and $V_{GND}$ from the high-potential drive power supply $V_{DD}$ and the low-potential drive power supply $V_{GND}$. In a positive time period, the gray-scale voltage $v_0$ is made of the voltage $v_{DD}$, and in a negative time period, the gray-scale voltage $v_0$ is made of the voltage $v_{GND}$. Thus, an output waveform similar to that of the gray-scale voltage $v_0$ shown in FIG. 50B can be obtained. The interpolated gray-scale voltages $v_1$, $v_3$, $v_4$, and $v_6$ are respectively made of gray-scale voltages on both sides thereof. For example, the interpolated voltage $v_2$ is made of the voltage higher than the interpolated voltage $v_2$ and the voltage lower than the interpolated voltage $v_2$ (i.e., $v_1$ and $v_3$) by an oscillating voltage driving method.

The above-mentioned circuit will be described in more detail. The circuit includes the selection control circuit SCOL; five analog switches $ASW_{OH}$, $ASW_{OL}$, $ASW_2$, $ASW_5$, and $ASW_7$; and three gray-scale power supplies $V_2$, $V_5$, and $V_7$. The selection control circuit SCOL has five output terminals $S_{OH}$, $S_{OL}$, $S_2$, $S_5$, and $S_7$. The analog switches $ASW_{OH}$, $ASW_{OL}$, $ASW_2$, $ASW_5$, and $ASW_7$ are turned on or off based on the output signal from the output terminals $S_{OH}$, $S_{OL}$, $S_2$, $S_5$, and $S_7$. In addition, the analog switches $ASW_2$, $ASW_5$, and $ASW_7$ are provided with gray-scale voltages $v_2$, $v_5$, and $v_7$ from the gray-scale power supplies $V_2$, $V_5$, and $V_7$. The analog switches $ASW_{OH}$ and $ASW_{OL}$ are respectively provided with voltages $v_{DD}$ and $v_{GND}$ from the high-potential drive power supply $V_{DD}$ and the low-potential drive power supply $V_{GND}$. The high-potential drive power supply $V_{DD}$ and the low-potential drive power supply $V_{GND}$ are both provided in a drive power supply for driving the source driver.

Table 3 is a logic table showing the relation between the input signal and output signal of the selection control circuit SCOL.

TABLE 3

| Video signal data | $d_2$ | $d_1$ | $d_0$ | $S_{OH}$ | $S_{OL}$ | $S_2$ | $S_5$ | $S_7$ |
|---|---|---|---|---|---|---|---|---|
| 0 | 0 | 0 | 0 | p | $\bar{p}$ | | | |
| 1 | 0 | 0 | 1 | pt | $\overline{pt}$ | t | | |
| 2 | 0 | 1 | 0 | | | 1 | | |
| 3 | 0 | 1 | 1 | | | t | $\bar{t}$ | |
| 4 | 1 | 0 | 0 | | | $\bar{t}$ | t | |
| 5 | 1 | 0 | 1 | | | | 1 | |
| 6 | 1 | 1 | 0 | | | | t | $\bar{t}$ |
| 7 | 1 | 1 | 1 | | | | | 1 |

When the data is 0 in a positive time period, the analog switch $ASW_{OH}$ alone is turned on, since signals p and $\bar{p}$ are respectively 1 and 0 in a positive time period.

When the data is 1 in a positive time period, the analog switches $ASW_{OH}$ and $ASW_{OL}$ are repeatedly turned on or off in accordance with the level of the signal t, and a pixel is charged with a voltage between the gray-scale voltage $v_0$ (the voltage from the high-potential drive power supply $V_{DD}$) and the gray-scale voltage $v_2$, the voltage being determined based on a duty ratio of the signal t in accordance with the oscillating voltage driving method.

When the data is 2, the output terminal $S_2$ is provided with a signal 1, and the analog switch $ASW_2$ is turned on. Thus, the gray-scale voltage $v_2$ from the gray-scale power supply $V_2$ is directly output to the signal line S(i).

When the data is 3, the output terminals $S_2$ and $S_5$ are provided with signals t and $\bar{t}$, and one of the analog switches $ASW_2$ and $ASW_5$ is turned on. Thus, one of the gray-scale voltage $v_2$ from the gray-scale power supply $V_2$ and the gray-scale voltage $v_5$ from the gray-scale power supply $V_5$ is alternately output to the signal line S(i). Namely, the gray-scale voltage $v_3$ which is an interpolated voltage between the gray-scale voltage $v_2$ and the gray-scale voltage $v_5$ is given to the display device.

When the data is 4, the output terminals $S_2$ and $S_5$ are respectively provided with signals $\bar{t}$ and t, and one of the analog switches $ASW_2$ and $ASW_5$ is turned on. Thus, one of the gray-scale voltage $v_2$ from the gray-scale power supply $V_2$ and the gray-scale voltage $v_5$ from the gray-scale power supply $V_5$ is alternately output to the signal line S(i). Namely, the gray-scale voltage $v_4$ which is an interpolated voltage between the gray-scale voltage $v_2$ and the gray-scale voltage $v_5$ is given to the display device.

The voltage values of the gray-scale voltages $v_3$ and $v_4$ depend upon the duty ratio of the signal t to the signal $\bar{t}$. If the duty ratio of the signal t to the signal $\bar{t}$ for the gray-scale voltage $v_3$ is equal to that for the gray-scale voltage $v_4$, the gray-scale voltages $v_3$ and $v_4$ become equal to each other, making it difficult to secure a predetermined gray-scale voltage. In a driver, which has been put into practical use, utilizing the present invention, a signal having a duty ratio of 2:1 (high/low) is used as the signal t. By doing so, as the gray-scale voltages $v_3$ and $v_4$ corresponding to the data of 3 and 4, the following voltages can be applied to pixels:

$$v_3 = \frac{2v_2 + v_5}{3}, v_4 = \frac{v_2 + 2v_5}{3}$$

When the data is 5, the output terminal $S_5$ is provided with a signal 1, and the analog switch $ASW_5$ is turned on. Thus, the gray-scale voltage $v_5$ from the gray-scale power supply $V_5$ is directly output to the signal line S(i).

When the data is 6, the output terminals $S_5$ and $S_7$ are respectively provided with signals t and $\bar{t}$, and one of the analog switches $ASW_5$ and $ASW_7$ is turned on. Thus, one of the gray-scale voltage $v_5$ from the gray-scale power supply $V_5$ and the gray-scale voltage $v_7$ from the gray-scale power supply $V_7$ is alternately output to the signal line S(i). Namely, the gray-scale voltage $v_6$ which is an interpolated voltage between the gray-scale voltage $v_5$ and the gray-scale voltage $v_7$ is given to the display device.

When the data is 7, the output terminal $S_7$ is provided with a signal 1, and the analog switch $ASW_7$ is turned on. Thus, the gray-scale voltage $v_7$ from the gray-scale power supply $V_7$ is directly output to the signal line S(i).

In a negative time period, when the data is 0, the gray-scale voltage $v_0$ is made of the voltage $v_{GND}$, and when the data is 1, the gray-scale voltage $v_0$ is also made of the voltage $v_{GND}$. The above-mentioned other cases in a positive time period apply to the other cases in a negative time period. As described above, according to the present example, the number of the gray-scale power supplies is made smaller than that of the conventional example (the number of the gray-scale power supplies of the present example can be further reduced, compared with Example 1).

EXAMPLE 3

In the present example, unlike Example 2, the interpolated gray-scale voltage $v_1$ is not made of the voltages $v_{DD}$ and $v_{GND}$ from the high-potential drive power supply $V_{DD}$ and the low-potential drive power supply $V_{GND}$, but is made of the gray-scale voltages $v_0$ and $v_2$.

Figure 3:
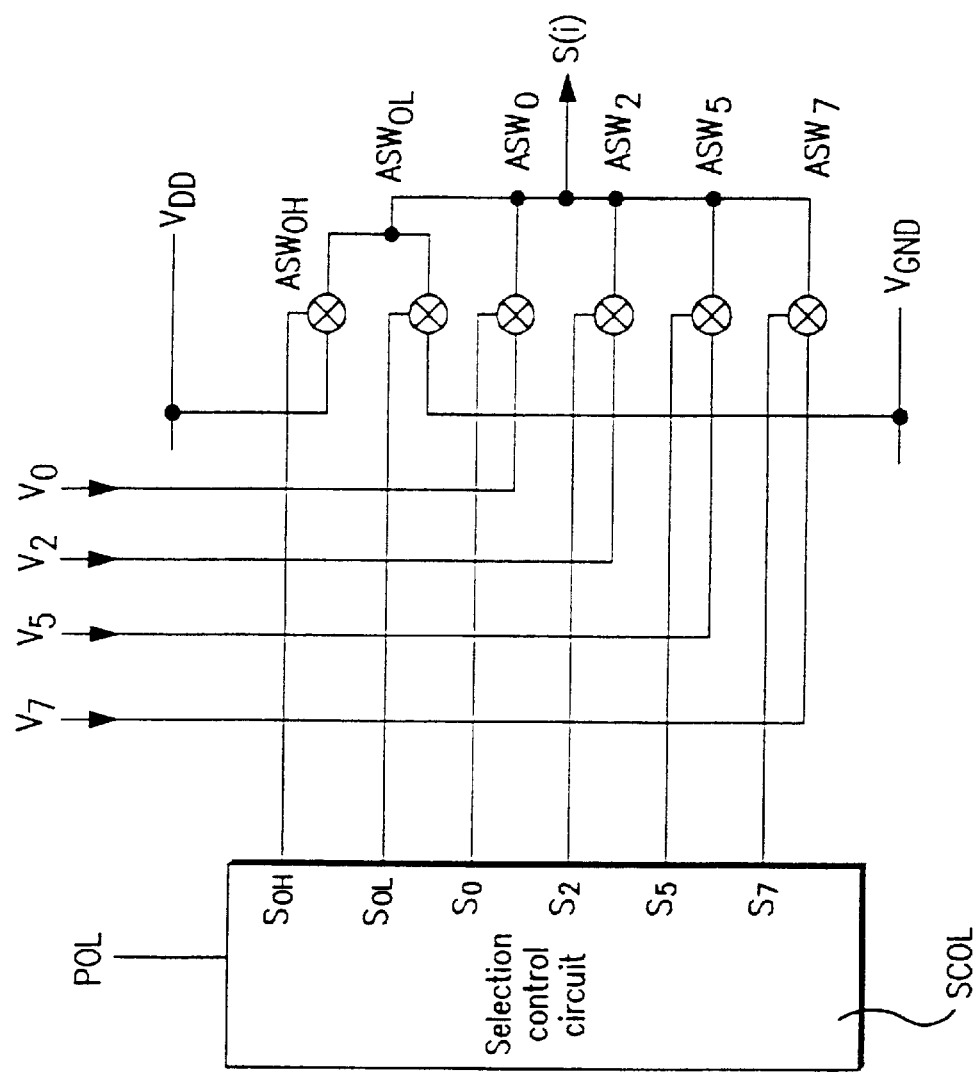
FIG. 3 is a block diagram showing part of one of a plurality of circuits provided on the output side of a source driver of Example 3.
Figure 4:
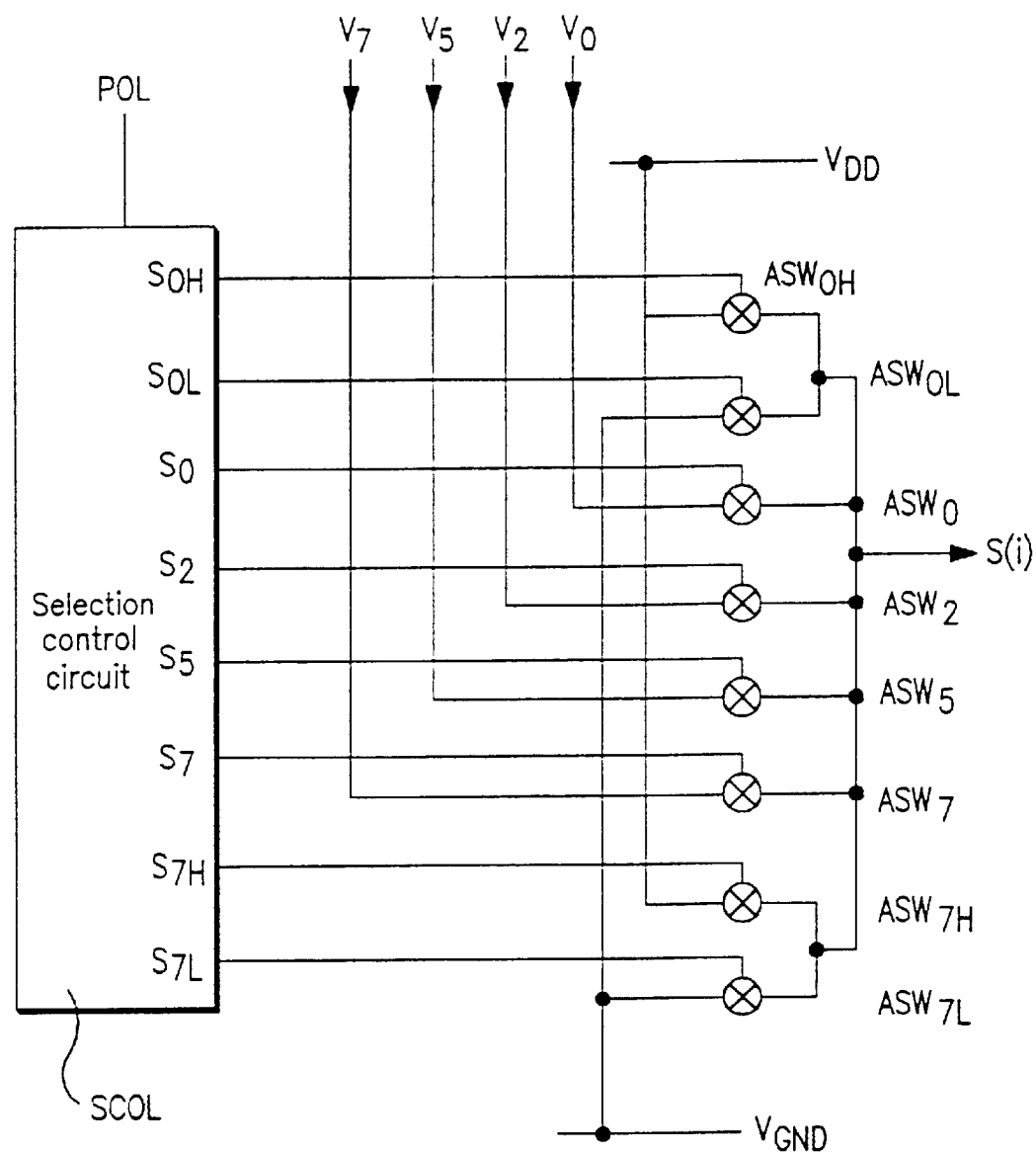
FIG. 4 is a block diagram showing part of one of a plurality of circuits provided on the output side of a source driver of Example 4.

FIG. 3 is a block diagram of a source driver according to the present example.

A circuit of the present example has the same structure as that of Example 2 with the following alterations:

The selection control circuit SCOL further includes an output terminal $S_0$; an analog switch $ASW_0$, which is turned on or off based on the signal from the output terminal $S_0$, is provided; and a gray-scale power supply $V_0$, which gives a gray-scale voltage $v_0$ to the analog switch $ASW_0$, is provided.

Table 4 is a logic table showing the relation between the input signal and output signal of the selection control circuit SCOL.

TABLE 4

| Video signal data | $d_2$ | $d_1$ | $d_0$ | $S_{OH}$ | $S_{OL}$ | $S_0$ | $S_2$ | $S_5$ | $S_7$ |
|---|---|---|---|---|---|---|---|---|---|
| 0 | 0 | 0 | 0 | p | $\bar{p}$ | | | | |
| 1 | 0 | 0 | 1 | | | $\bar{t}$ | t | | |
| 2 | 0 | 1 | 0 | | | | 1 | | |
| 3 | 0 | 1 | 1 | | | | t | $\bar{t}$ | |
| 4 | 1 | 0 | 0 | | | | $\bar{t}$ | t | |
| 5 | 1 | 0 | 1 | | | | | 1 | |
| 6 | 1 | 1 | 0 | | | | | t | $\bar{t}$ |
| 7 | 1 | 1 | 1 | | | | | | 1 |

When the data is 0, the same operation as that in Example 2 is performed. When the data is 1, the output terminals $S_0$ and $S_2$ are respectively provided with signals $\bar{t}$ and t, and one of the analog switches $ASW_0$ and $ASW_2$ is turned on. Thus, one of the gray-scale voltage $v_0$ from the gray-scale power supply $V_0$ and the gray-scale voltage $v_2$ from the gray-scale power Supply $V_2$ is alternately output to the signal line S(i). Namely, the interpolated gray-scale voltage $v_1$ which interpolates between the gray-scale voltage $v_0$ and the gray-scale voltage $v_2$ is given to the display device. In the present example, the duty ratio of 0 to 1 of a signal t is 1:1.

Thus, in the present example, the voltage to be applied to a pixel when the data is 0 and the voltage to be applied to a pixel when the data is 1 can be independently determined. As a result, a driver, in which a gray scale in the vicinity of a black level for the most black display is easily adjusted, can be obtained. In the same w ay as in Example 2, a signal having a duty ratio of 2:1 (high/low) is used as the signal t.

EXAMPLE 4

According to the present example, the lowest and highest gray-scale voltages are obtained, based on signals from a drive power supply for driving a source driver.

A circuit of the present example has the same structure as that of Example 3 with the following alterations:

The selection control circuit SCOL further includes output terminals $S_{7H}$ and $S_{7L}$; and analog switches $ASW_{7H}$ and $ASW_{7L}$, which are respectively turned on or off based oh the signals from the output terminals $S_{7H}$ and $S_{7L}$, are provided.

Table 5 is a logic table showing the relation between the input signal and output signal of the selection control circuit SCOL.

TABLE 5

| Video signal data | $d_2$ | $d_1$ | $d_0$ | $S_{0H}$ | $S_{0L}$ | $S_0$ | $S_2$ | $S_5$ | $S_7$ | $S_{7H}$ | $S_{7L}$ |
|---|---|---|---|---|---|---|---|---|---|---|---|
| 0 | 0 | 0 | 0 | p | $\bar{p}$ | | | | | | |
| 1 | 0 | 0 | 1 | | | $\bar{t}$ | t | | | | |
| 2 | 0 | 1 | 0 | | | | 1 | | | | |
| 3 | 0 | 1 | 1 | | | | | t | $\bar{t}$ | | |
| 4 | 1 | 0 | 0 | | | | | $\bar{t}$ | t | | |
| 5 | 1 | 0 | 1 | | | | | 1 | | | |
| 6 | 1 | 1 | 0 | | | | | | t | $\bar{t}$ | |
| 7 | 1 | 1 | 1 | | | | | | | $\bar{p}$ | p |

In the circuit of the present example, the operations in the case where the data is 0 to 6 are the same as those in Example 3. When the data is 7, a different operation is performed. More specifically, when the data is 7, the voltage $v_{GND}$ is output in a positive time period and the voltage $v_{DD}$ is output in a negative time period. Accordingly, the gray-scale voltage $v_6$ to be applied to a pixel when the data is 6 is determined independently from the voltage output from the driver when the data is 7. Thus, a driver, in which gray scales in the vicinity of a white level for the most white display as well as a black level is easily adjusted, can be obtained. In the present example, a signal having a duty ratio of 2:1 (high/low) is also used as the signal t.

In an actual liquid crystal display device, the transmittance with respect to a voltage applied to a drive terminal of the device is different depending upon the polarity (i.e., a positive time period and a negative time period). For compensating this difference, the center value of the gray-scale voltage and that of the common electrode voltage are shifted. Such a difference is slightly different depending upon voltages, so that the respective gray-scale power supplies are preferably adjusted independently. In order to achieve this, the inventors invented the following method:

The center value of the common electrode voltage $v_{com}$ is shifted with respect to the gray-scale voltage $v_0$ (which is the largest in a normally white mode), thereby compensating the difference in characteristics between the gray-scale voltage $v_0$ in a positive time period and that in a negative time period. Then, the center values of the other gray-scale voltages are shifted based on the center value of the common electrode thus determined. Thus, the difference in characteristics of all of the gray scales between a positive time period and a negative time period is compensated.

The cause for the difference in characteristics between a positive time period and a negative time period and a shift amount for compensating the difference are described in Japanese Laid-Open Patent Publication No. 5-53534.

In Example 4, an output voltage when the data is 0 and an output voltage when the data is 7 are formed by the high-potential drive power supply $V_{DD}$ and the low-potential drive power supply $V_{GND}$. The center value thereof is fixed to be $\frac{1}{2}(v_{DD}+v_{GND})$ and cannot be adjusted. This, however, does not cause any problems. The reason for this is that in the gray-scale voltage $v_7$, the absolute value of the electric potential difference with respect to the common electrode is small (at a level which hardly causes the difference in characteristics between a positive time period and a negative time period).

EXAMPLE 5

According to the present example, a feedthrough current, which is caused in the case where an interpolated gray-scale voltage is generated, is prevented by switching the analog switches to which the gray-scale voltages $v_{DD}$ and $v_{GND}$ are supplied from the high-potential drive power supply $V_{DD}$ and the low-potential drive power supply $V_{GND}$ for driving the source driver.

Figure 5:
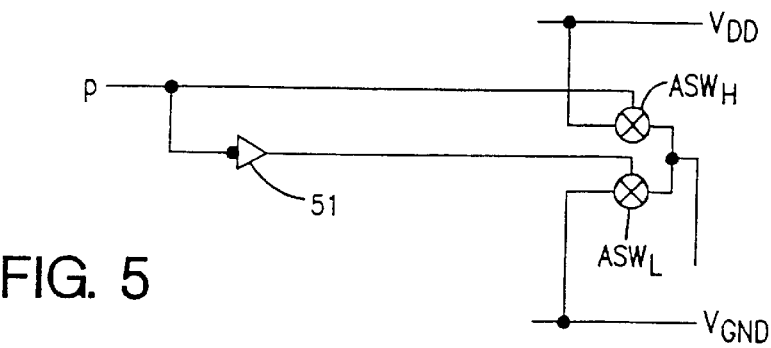
FIG. 5 is a circuit diagram showing the structure of a conventional source driver in which a feedthrough current is generated.

Referring to FIG. 5, in a conventional structure, a signal p is directly input to one analog switch $ASW_H$. The signal p is inverted by an inverter 51 and then input to the other analog switch $ASW_L$. Both of the analog switches $ASW_H$ and $ASW_L$ are instantaneously turned on; the voltage $v_{DD}$ from the high-potential drive power supply $V_{DD}$ flows into the low-potential drive power supply $V_{GND}$ to cause a feedthrough current. Consequently, a substantial noise component remains in the power supply, resulting in several problems such as heat generation and malfunction of the logic.

Figure 6:
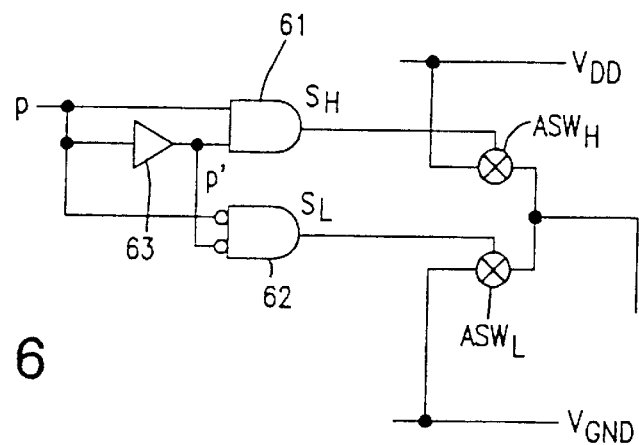
FIG. 6 is a circuit diagram showing the structure of a source driver of Example 5.

FIG. 6 shows the vicinity of the analog switches $ASW_H$ and $ASW_L$ of the drive circuit of the display device according to the present invention. The analog switches $ASW_H$ and $ASW_L$ are respectively provided with the gray-scale voltage $v_{DD}$ from the high-potential drive power supply $V_{DD}$ and the gray-scale voltage $v_{GND}$ from the low-potential drive power supply $V_{GND}$. This circuit has a structure in which the analog switches $ASW_H$ and $ASW_L$ are logically prevented from instantaneously turning on together at the time of switching the analog switches $ASW_H$ and $ASW_L$. More specifically, two portions of the selection control circuit SCOL, which output an on/off control signal to the analog switches $ASW_H$ and $ASW_L$, consist of an AND circuit 61 and a NOR circuit 62. A p signal is directly input to one input terminal of the AND circuit 61, and the p signal is input through a buffer 63 to the other input terminal of the AND circuit 61 as a p' signal. To one input inversion terminal of the NOR circuit 62, the p signal is directly input, and to the other input inversion terminal thereof, the p signal is input through the buffer 63 as the p' signal. An output terminal $S_H$ of the AND circuit 61 is electrically connected to the analog switch $ASW_H$, and an output terminal $S_L$ of the NOR circuit 62 is electrically connected to the analog switch $ASW_L$.

Figure 7:
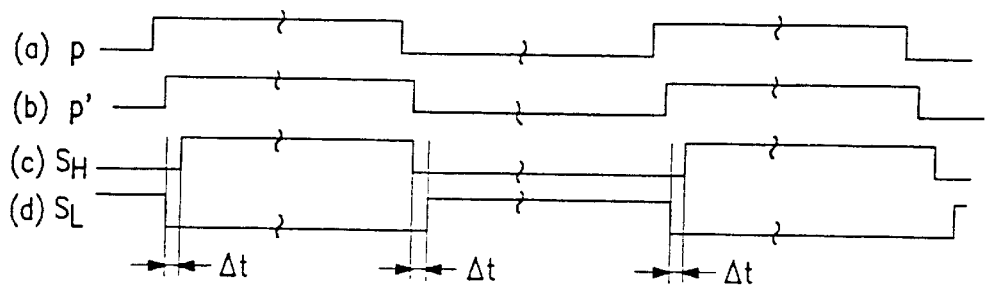
FIG. 7 is a diagram showing waveforms of input and output signals of the source driver of FIG. 6.

FIG. 7 shows input and output waveforms of the signals in the above-mentioned circuit: (a) a waveform of the p signal; (b) a waveform of the p' signal; (c) a waveform of the output terminal $S_H$; and (d) a waveform of the output terminal $S_L$. As is understood from this figure, when both of the p and p' signals become 1, the AND circuit 61 gives an ON (High level) signal to the analog switch $ASW_H$ through the output terminal $S_H$, thereby turning on the analog switch $ASW_H$.

Thereafter, when both of the p and p' signals become 0, the AND circuit 61 gives an OFF (Low level) signal to the analog switch $ASW_H$ through the output terminal $S_H$, thereby turning off the analog switch $ASW_H$. At the same time with this, the NOR circuit 62 gives an ON (High level) signal to the analog switch $ASW_L$ through the output terminal $S_L$, thereby turning on the analog switch $ASW_L$. At this time, the timing at which the p and p' signals (both of which are 0) are given to the AND circuit and the timing at which the p and p' signals (both of which are inverted) are given to the NOR circuit are slightly shifted by $\Delta t$.

According to the present example, both of the analog switches $ASW_H$ and $ASW_L$ are not simultaneously turned on. Thus, the feedthrough current can be prevented from being generated. As a result, a substantial noise component does not remain in the power supply, solving the problems such as heat generation and the malfunction of the logic.

EXAMPLE 6

Figure 8:
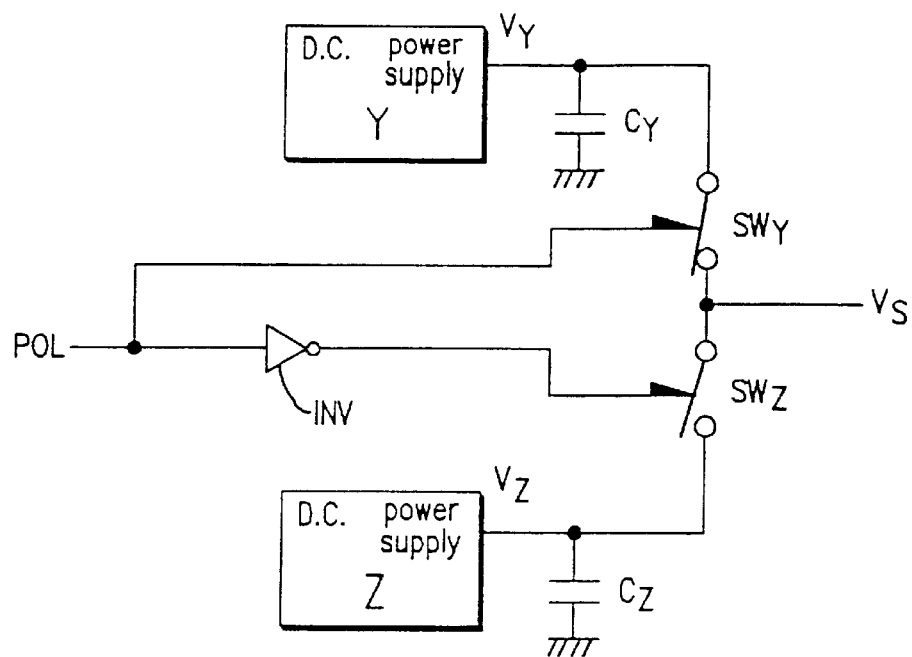
FIG. 8 is a diagram showing a basic structure of the voltage generating circuit of Example 6.

FIG. 8 shows a fundamental structure of a voltage generating circuit of the present example. This voltage generating circuit has two D.C. power supplies Y and Z. An output voltage $V_y$ from the power supply Y is set so as to be higher than an output voltage $V_z$ from the power supply Z. The output terminal of the power supply Y is connected to one terminal of a switch $SW_y$ and the output terminal of the power supply $V_z$ is connected to one terminal of a switch $SW_z$. The other terminal of the switch $SW_y$ and that of the switch $SW_z$ are connected to each other. A voltage at the connecting point between the switches $SW_y$ and $SW_z$ is an output voltage $V_s$. The switches $SW_y$ and $SW_z$ respectively select the D.C. power supplies Y and Z. The switch $SW_y$ is provided with a control signal POL. The control signal POL is inverted by an inverter INV and then input to the switch $SW_z$. More specifically, when the switch $SW_y$ is in an ON state, the switch $SW_z$ is in an OFF state, and when the switch $SW_y$ is in an OFF state, the switch $SW_z$ is in an ON state. One terminal of a capacitor $C_y$ is connected to the connecting point between the D.C. power supply Y and the switch $SW_y$, and one terminal of a capacitor $C_z$ is connected to the connecting point between the D.C. power supply Z and the switch $SW_z$. The other terminals of the respective capacitors $C_y$ and $C_z$ are grounded. In order to decrease the output impedance of the output voltage $V_s$, the switches $SW_y$ and $SW_z$ preferably have the lowest possible impedance when being in an ON state.

Figure 9:
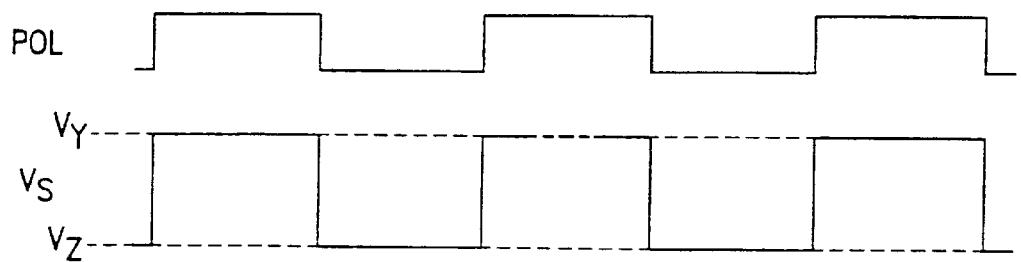
FIG. 9 is a basic timing chart of the voltage generating circuit of FIG. 8.

FIG. 9 shows a timing chart in the case where the voltage generating circuit shown in FIG. 8 is used as a gray-scale voltage generating circuit for a display device. The operation of the voltage generating circuit will be described with reference to FIG. 9.

The control signal POL is inverted per horizontal scanning period in a line inversion drive. The period during which the control signal POL is at a high level corresponds to the time at which a pixel is positively charged. The period during which the control signal POL is at a low level corresponds to the time at which a pixel is negatively charged. The switches $SW_y$ and $SW_z$ are turned on, when the control signal POL is at a high level, and are turned off, when the control signal POL is at a low level.

In the case of the voltage generating circuit shown in FIG. 8, when the control signal POL is at a high level, the switch $SW_y$ is turned on and the switch $SW_z$ is turned off. Thus, the D.C. voltage $V_y$ is output through the switch $SW_y$ from the D.C. power supply Y as the voltage $V_s$. During this time, the capacitor $C_z$ is disconnected from the power supply Y by the switch $SW_z$, so that the capacitor $C_z$ does not become a load for an output of the power supply Y. Further, the capacitor $C_y$ previously charged with the voltage $V_y$ of the power supply Y supplies or stores a charge in accordance with the load fluctuation through the switch $SW_y$. Likewise, when the control signal POL is at a low level, the voltage $V_z$ from the D.C. power supply Z is output through the switch $SW_z$ as the voltage $V_s$, and the capacitor $C_z$ supplies or stores a charge in accordance with the load fluctuation.

As described above, the capacitors $C_y$ and $C_z$ are respectively connected to only the D.C. power supplies Y and Z. When the polarity of the voltage $V_s$ is switched, the capacitors $C_y$ and $C_z$ do not become a load for an output of the voltage generating circuit. Thus, the capacitors $C_y$ and $C_z$ should have a capacitance sufficient for alleviating the voltage fluctuation due to the load fluctuation.

EXAMPLE 7

Figure 10:
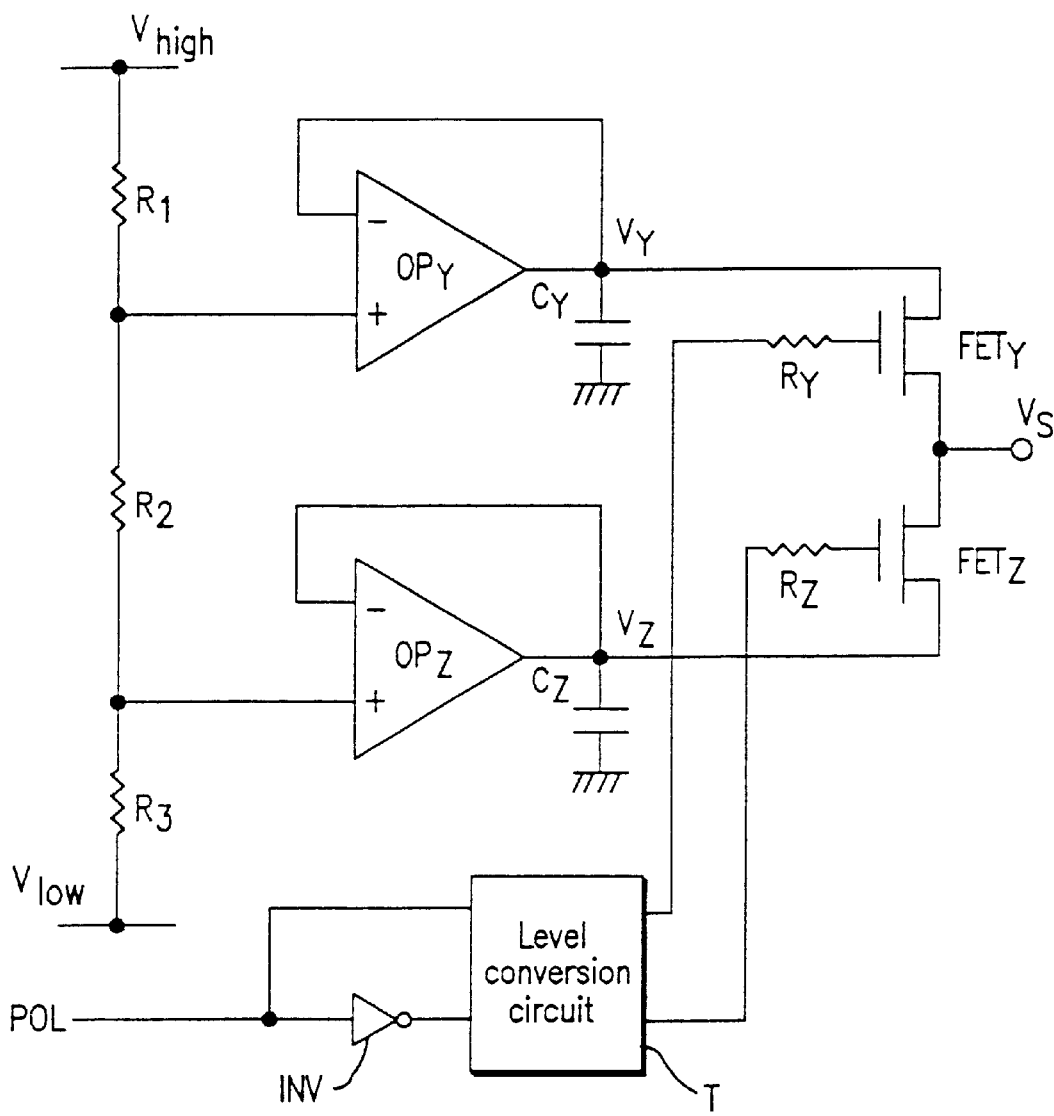
FIG. 10 is a circuit diagram showing the voltage generating circuit of Example 7.

FIG. 10 shows a circuit diagram of a voltage generating circuit of the present example. In the present example, operational amplifiers $OP_Y$ and $OP_Z$ are used for the D.C. power supplies Y and Z. A non-inversion input terminal of the operational amplifier $OP_Y$ is connected to the connecting point between fixed resistors $R_1$ and $R_2$ which are connected in series to a high potential $V_{high}$ side, and a non-inversion input terminal of the operational amplifier $OP_Z$ is connected to the connecting point between fixed resistors $R_2$ and $R_3$ which are connected in series to a low potential $V_{low}$ side. In the present example, transistors $FET_y$ and $FET_z$ are used instead of the switches $SW_y$ and $SW_z$. FETs allow an electric current to flow in two directions and have a remarkably small ON resistance; therefore, the FETs are suitable for use as switching elements of the present invention. Gates of the transistors $FET_y$ and $FET_z$ are respectively connected to a level conversion circuit T through fixed resistors $R_y$ and $R_z$. The level conversion circuit T converts the levels of the control signal POL and its inverted signal, which are given to the transistors $FET_y$ and $FET_z$ at a logic level, to those suitable for controlling the transistors $FET_y$ and $FET_z$. The level conversion circuit T is not required, depending upon the characteristics of the FETs to be used.

Figure 11:
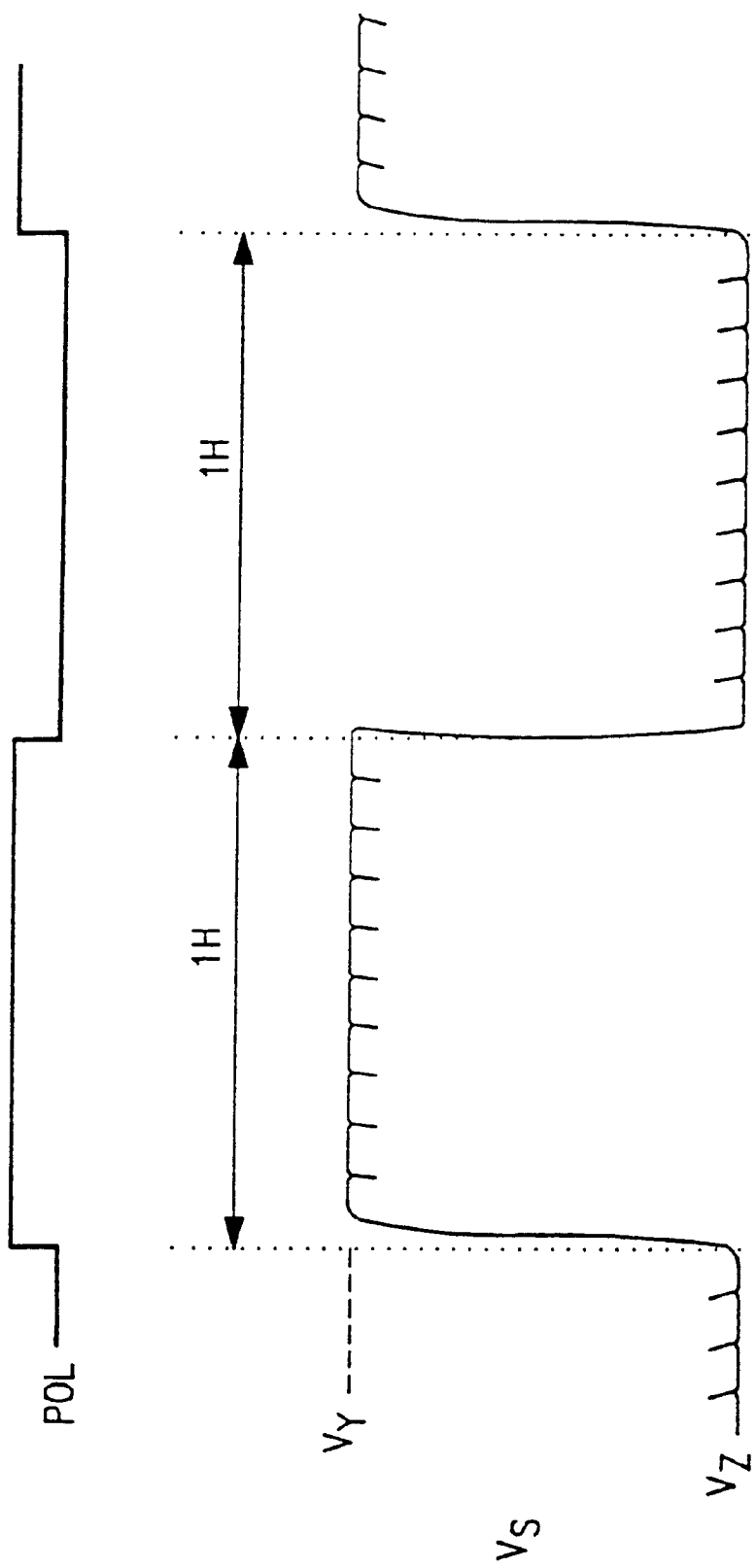
FIG. 11 is a diagram showing an example of waveforms of an output signal input from the voltage generating circuit for the display device of the present invention.

Hereinafter, the operation of the voltage generating circuit of the present example in the case where this circuit is used as a gray-scale voltage generating circuit of a display device will be described with reference to the timing chart of FIG. 11. In this case, the following is assumed: A control signal POL is inverted per horizontal scanning period H. When the control signal POL is at a high level, a pixel is positively charged, and when the control signal POL is at a low level, a pixel is negatively charged.

When the control signal POL is at a high level, the signal controlling the transistor $FET_y$ is at a high level (i.e., in an ON state), and the signal controlling the transistor $FET_z$ is at a low level (i.e., in an OFF state). Thus, a voltage $V_y$ from the operational amplifier $OP_Y$ is output from the voltage generating circuit through the transistor $FET_y$ in an ON state. At this time, the capacitor $C_z$ is disconnected from the voltage generating circuit by the transistor $FET_z$; therefore, the capacitor $C_z$ does not become a load on the output of the voltage generating circuit. The previously charged capacitor $C_y$ supplies or stores part of a charge of a rush current generated when a pixel is charged or discharged in the case where the output from the voltage generating circuit is switched from a positive time period to a negative time period or from a negative time period to a positive time period. Further, the capacitor $C_y$ alleviates the voltage fluctuation, which is caused due to the oscillating voltage in a positive time period or negative time period, through the transistor $FET_y$ in an ON state.

On the other hand, when the control signal POL is at a low level, the signal controlling the transistor $FET_z$ is at a high level (in an on state) and the transistor $FET_y$ is at a low level (in an off state). Thus, a voltage $V_z$ from the operational amplifier $OP_2$ is output from the voltage generating circuit through the transistor $FET_z$ in an ON state. At this time, the capacitor $C_y$ is disconnected from the output terminal of the voltage generating circuit by the transistor $FET_y$; therefore, the capacitor $C_y$ does not become a load on the output of the voltage generating circuit. The previously charged capacitor $C_z$ supplies or stores part of a charge of a rush current generated when a pixel is charged or discharged in the case where the output from the voltage generating circuit is switched from a positive time period to a negative time period or from a negative time period to a positive time period. Further, the capacitor $C_z$ alleviates the voltage fluctuation, which is caused due to the oscillating voltage in a positive time period or negative time period, through the transistor $FET_y$ in an ON state.

As described above, the capacitors $C_y$ and $C_z$ are respectively connected to only the operational amplifiers $OP_Y$ and $OP_Z$. Therefore, the capacitors $C_y$ and $C_z$ do not become a load when the voltage generating circuit outputs the voltage $V_z$ at the time of switching between a positive time period and a negative time period. Therefore, the capacitors $C_y$ and $C_z$ will have the capacitance required for the load fluctuation.

Figure 58:
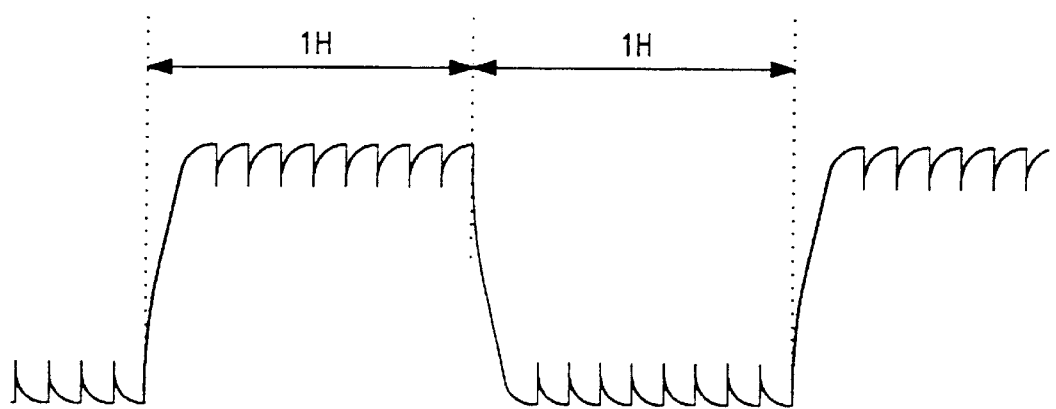
FIG. 58 is a diagram showing an example of an output waveform of the conventional voltage generating circuit in the case where the voltage is fluctuated due to the fluctuation of the load.
Figure 54:
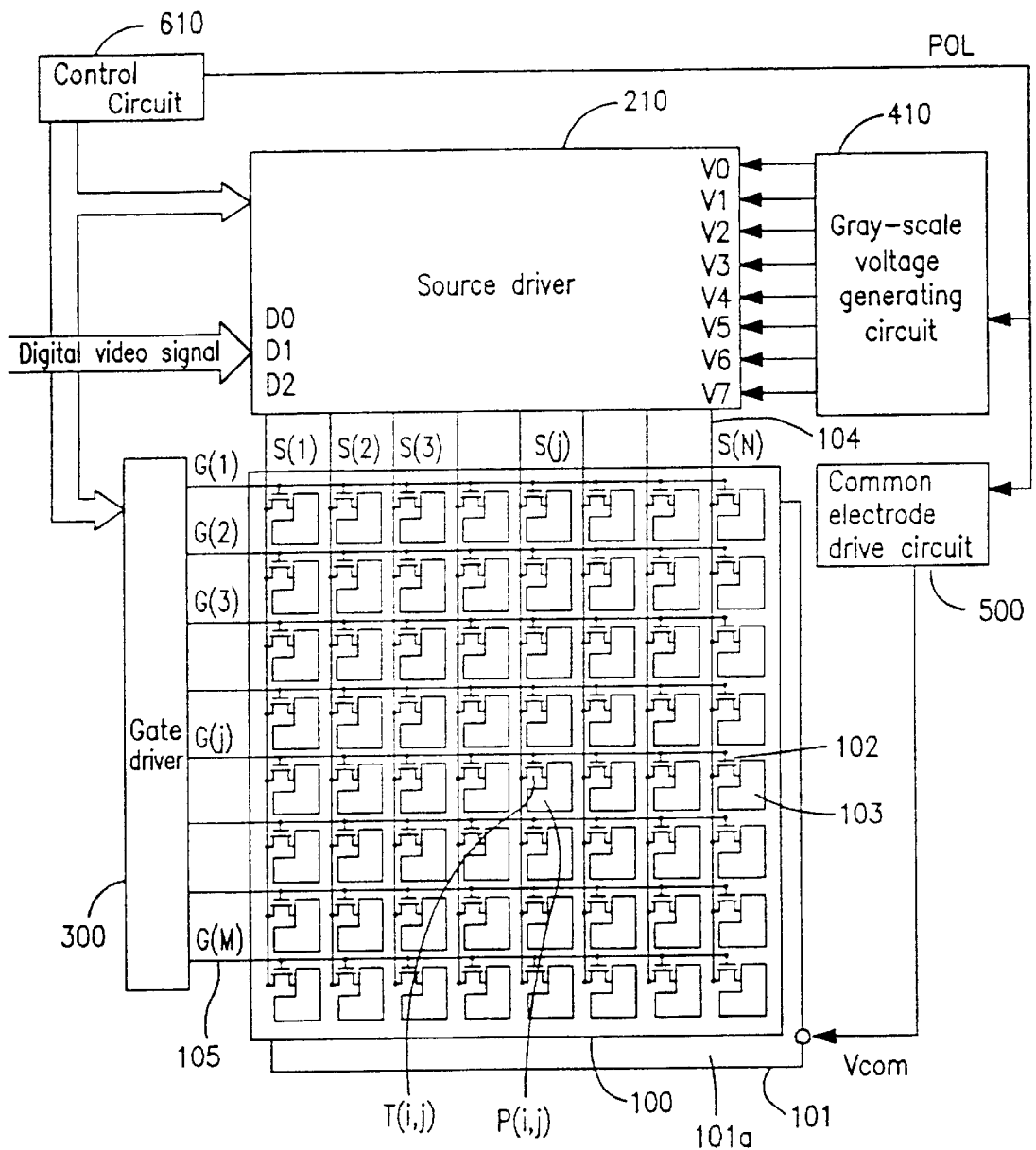
FIG. 54 is a block diagram showing an active matrix liquid crystal display device.

Thus, according to the present example, the capacitors $C_y$ and $C_z$ function so as to compensate for the load fluctuation, so that in the case where this voltage generating circuit is used as a common electrode drive circuit, a waveform having suppressed voltage fluctuation can be obtained without being less affected by a voltage applied to a pixel electrode by a source driver, compared with the output waveform of the conventional voltage generating circuit of FIG. 58. As a result, the deterioration of a display quality can be prevented.

Figure 49:
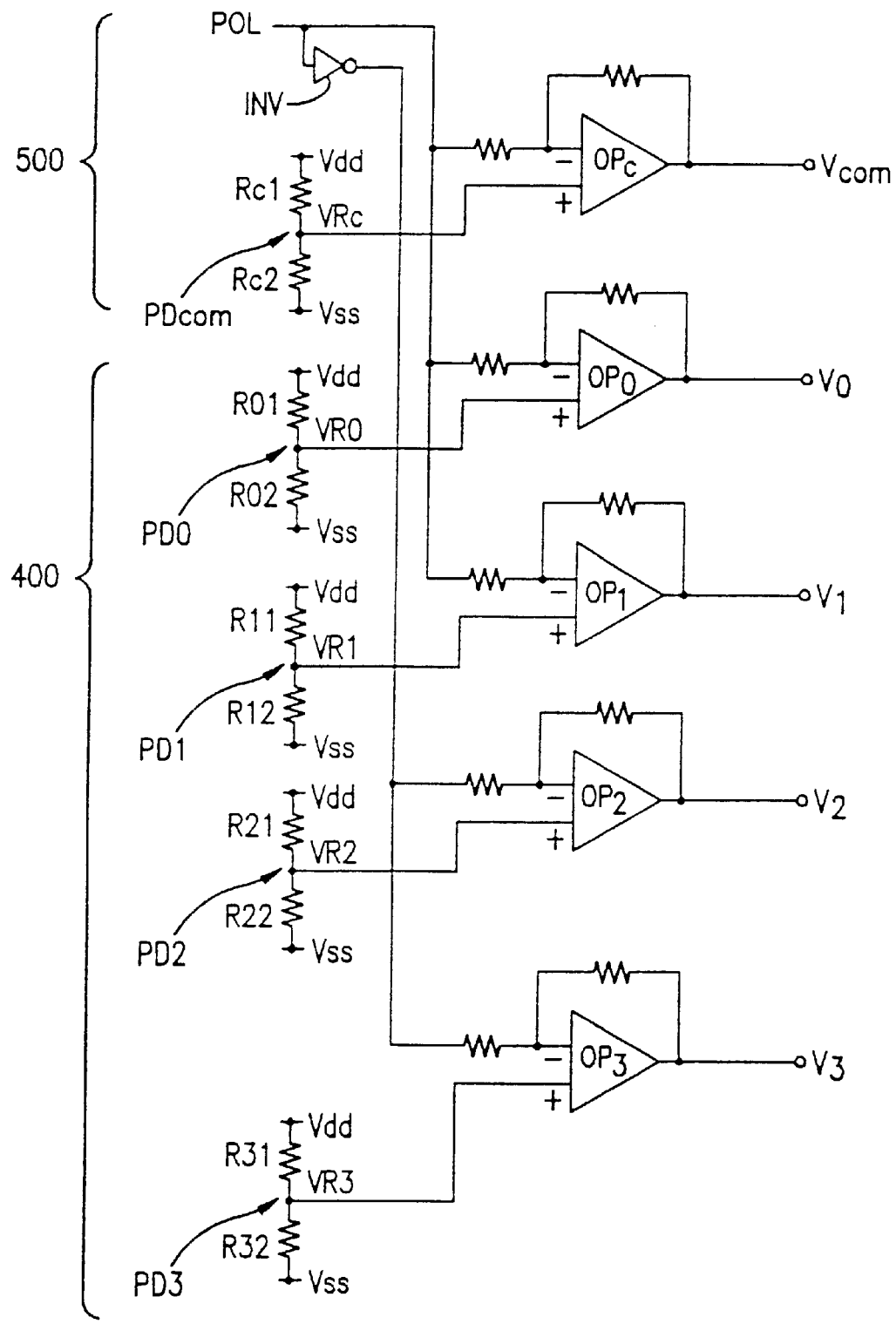
FIG. 49 shows an example of a circuit diagram of a conventional gray-scale voltage generating circuit and common electrode drive circuit.

In the voltage generating circuit having the above-mentioned structure, the operational amplifiers $OP_Y$ and $OP_Z$ do not supply an A.C. voltage (short rectangular waveform) as in operational amplifiers $OP_C$, $OP_0$, and $OP_1$ of the voltage generating circuit shown in FIG. 49, and only function as a D.C. voltage power supply. Since it is not required to consider the rise characteristics (slewing rate) of the operational amplifiers to be used, the operational amplifiers of the present example will have a sufficiently large current capacity even though any slewing rate is small. In addition, the capacitors $C_y$ and $C_z$ do not become a load when the voltage generating circuit outputs the voltage $V_z$ at the time of switching between a positive time period and a negative time period. Therefore, the capacitors $C_y$ and $C_z$ will have the capacitance required for the load fluctuation.

Figure 57:
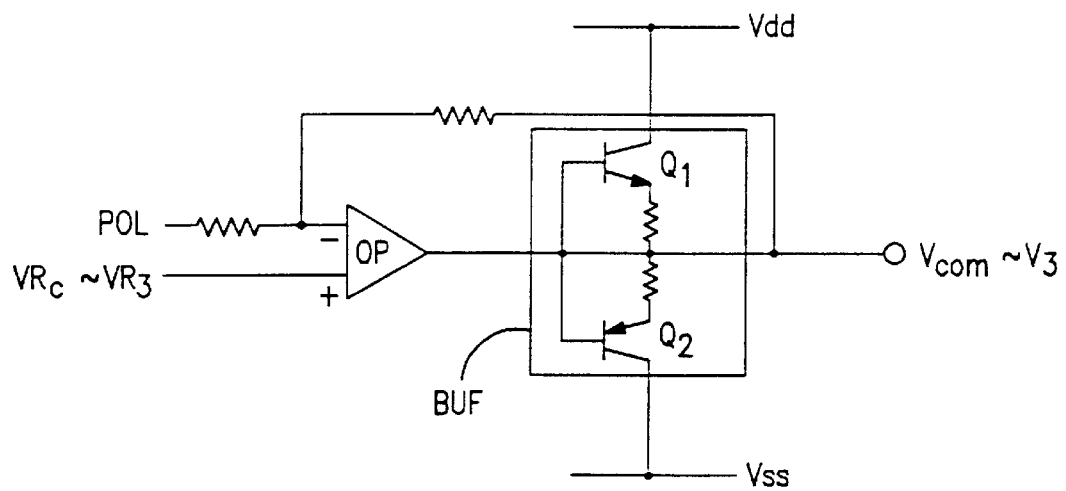
FIG. 57 shows an example of a circuit diagram of a conventional voltage generating circuit provided with an electric current amplifier.

In the voltage generating circuit of the present example, when the polarity of an output is switched, part of the charge required for charging or discharging the load can be supplied or stored by the capacitors $C_y$ and $C_z$. Therefore, transistors for allowing a large rush current as shown in FIG. 57 are not required. It is noted that transistors for amplifying an electric current may be provided, depending upon the characteristics of the required drive circuit.

The capacitors $C_y$ and $C_z$ alleviate the load fluctuation caused by an oscillating voltage or the like in one horizontal scanning period and supply a charge of a rush current for charging or discharging the load when the polarity of an output is switched. However, the present invention is not limited to the above-mentioned structure. It is also possible that a capacitor for alleviating the load fluctuation in one horizontal scanning period and another capacitor for supplying a charge of a rush current are separately provided in each power supply. This structure is advantageous, particularly in the case where each capacity coefficient of the intended capacitors is greatly different.

EXAMPLE 8

Figure 12:
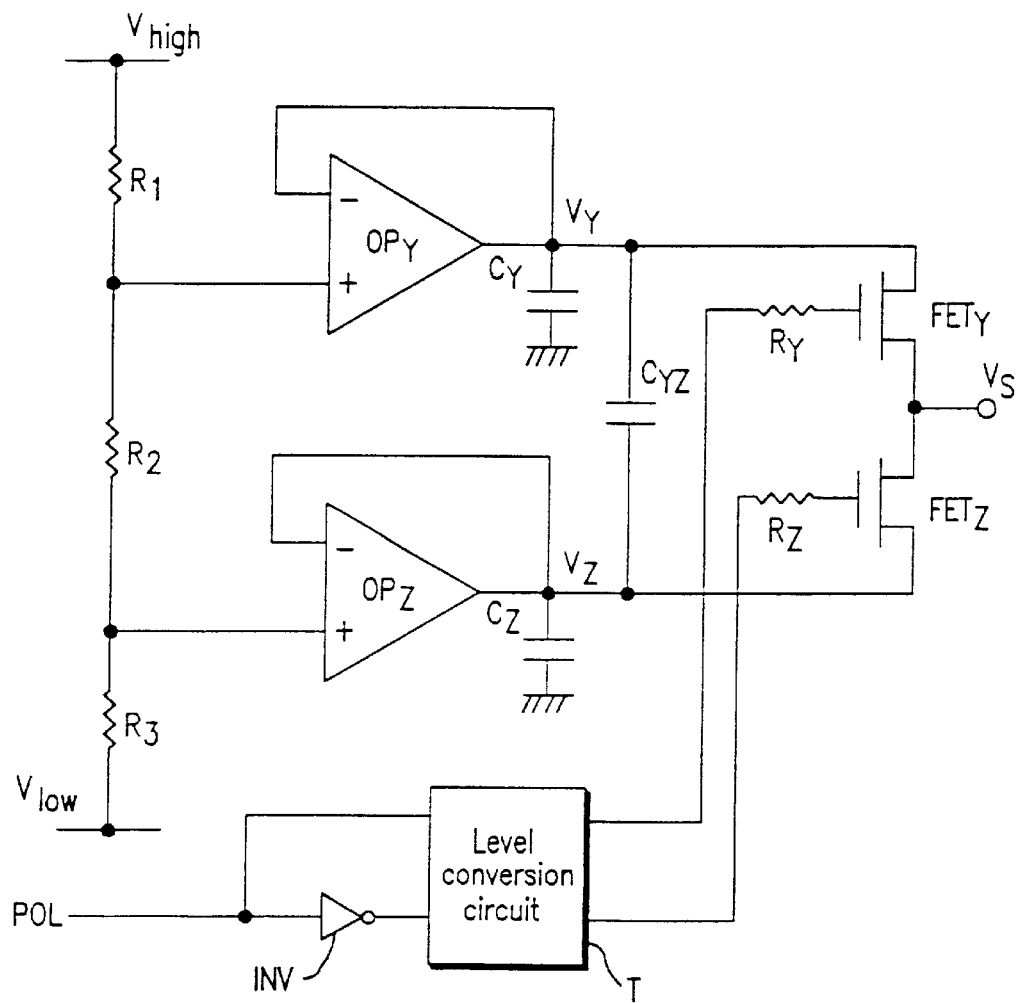
FIG. 12 is a circuit diagram of a voltage generating circuit of Example 8.

FIG. 12 shows a circuit diagram showing a voltage generating circuit of the present example. Components identical with those of Example 7 bear the identical reference numerals. In the voltage generating circuit shown in FIG. 12, a capacitor $C_{yz}$ is connected to the connecting point between the operational amplifier OPY and the transistor $FET_y$ and to the connecting point between the operational amplifier $OP_z$ and the transistor $FET_z$.

Since the capacitor $C_{yz}$ is connected between the voltages $V_y$ and $V_z$ having different polarities, the capacitor $C_{yz}$ enhances the effects of supplying a charge for a rush current at the time of switching the polarity, compared with the capacitors $C_y$ and $C_z$ each of which has one terminal grounded.

EXAMPLE 9

Figure 13:
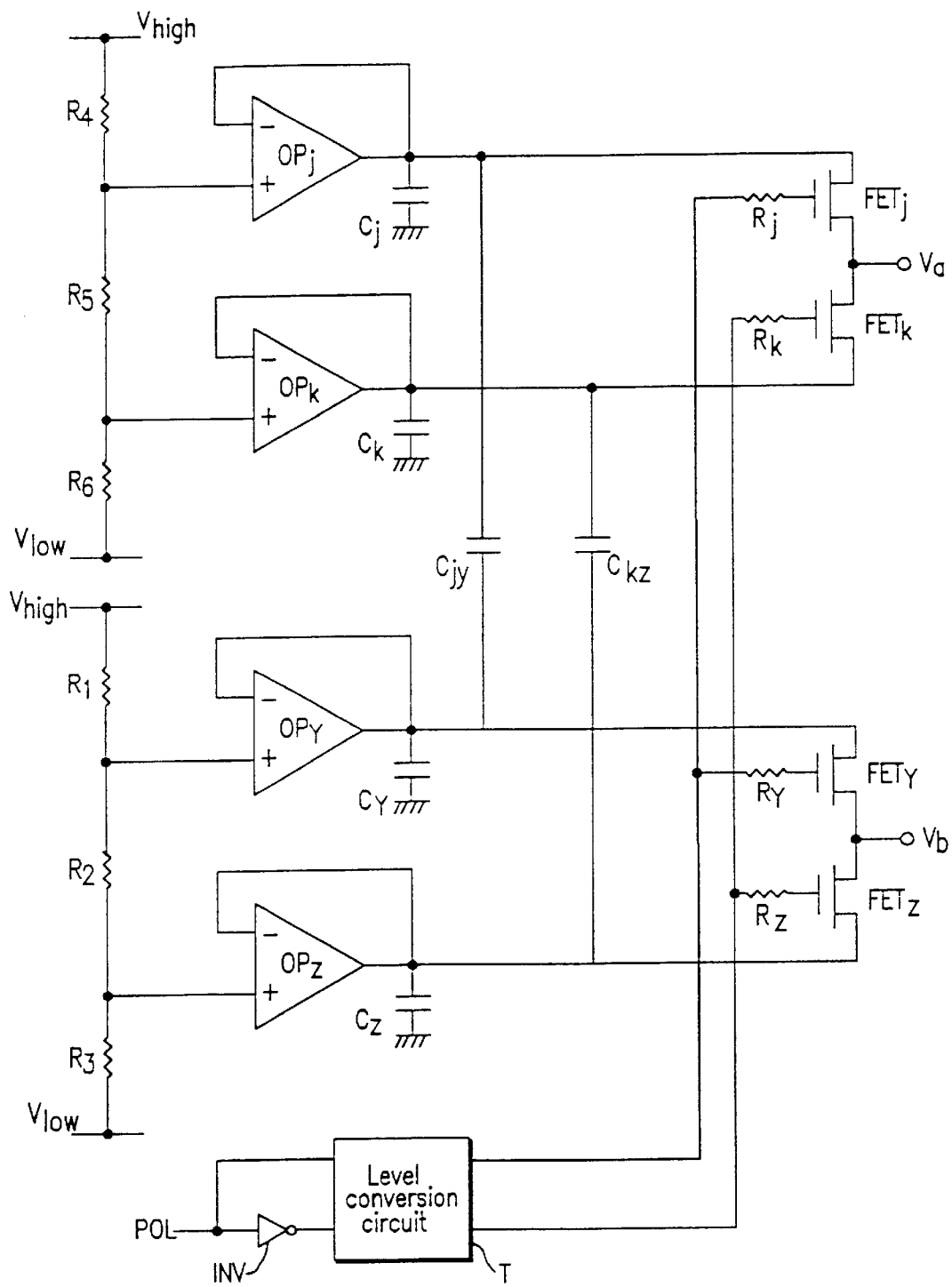
FIG. 13 is a circuit diagram of a gray-scale voltage generating device of Example 9.

FIG. 13 is a circuit diagram of a gray-scale voltage generating device of the present example. In general, the gray-scale voltage generating device requires a plurality of voltage generating circuits as shown in FIG. 49. Thus, each voltage generating circuit has a set of D.C. power supplies. The gray-scale voltage generating device of the present example includes two voltage generating circuits having a structure similar to that of Example 7 for the purpose of outputting two kinds of voltages $V_a$ and $V_b$. The voltage generating circuits respectively have operational amplifiers $OP_J$ and $OP_K$ and operational amplifiers $OP_Y$ and $OP_Z$. A non-inversion input terminal of the operational amplifier $OP_J$ is connected to the connecting point between fixed resistors $R_4$ and $R_5$ which are connected in series to a high potential $V_{high}$ side. A non-inversion input terminal of the operational amplifier $OP_K$ is connected to the connecting point between fixed resistors $R_5$ and $R_6$ which are connected in series to a low potential $V_{low}$ side. Likewise, a non-inversion input terminal of the operational amplifier POY is connected to the connecting point between fixed resistors $R_1$ and $R_2$ which are connected in series to a high potential $V_{high}$ side. A non-inversion input terminal of the operational amplifier $OP_Z$ is connected to the connecting point between fixed resistors $R_2$ and $R_3$ which are connected in series to a low potential $V_{low}$ side. The output voltages $V_j$, $V_k$, $V_y$, and $V_z$ from the operational amplifiers $OP_J$, $OP_K$, $OP_Y$, and $OP_Z$ are set at predetermined values by appropriately setting the resistances of the fixed resistors $R_1$ to $R_6$. Thus, different levels of voltages $V_a$ and $V_b$ are obtained.

An output terminal of the operational amplifier $OP_J$ is connected to a capacitor $C_j$ and a transistor $FET_j$; that of the operational amplifier $OP_K$ is connected to a capacitor $C_k$ and a transistor $FET_k$; that of the operational amplifier $OP_Y$ is connected to a capacitor $C_y$ and a transistor $FET_y$; and that of the operational amplifier $OP_Z$ is connected to a capacitor $C_z$ and a transistor $FET_z$. Each gate of the transistors $FET_j$, $FET_k$, $FET_y$, and $FET_z$ is connected to the level conversion circuit T respectively through fixed resistors $R_j$, $R_k$, $R_y$, and $R_z$. The level conversion circuit T converts the level of the control signal POL, which is given at a logic level, to that suitable for controlling the transistors $FET_j$ and $FET_y$, thus providing the control signal POL to the transistors $FET_j$ and $FET_y$. The level conversion circuit T also converts the level of an inverted control signal $\overline{POL}$ to that suitable for controlling the transistors $FET_k$ and $FET_z$, thus providing the inverted control signal $\overline{POL}$ to the transistors $FET_k$ and $FET_z$. The level conversion circuit T is not required, depending upon the characteristics of FETs to be used.

Further, in the present example, a capacitor $C_{jy}$ is provided between the output terminals of the power supplies $OP_J$ and $OP_Y$, and a capacitor $C_{kz}$ is provided between the output terminals of the power supplies $OP_K$ and $OP_Z$.

In the same way as in Example 7, the gray-scale voltage generating device alleviates the voltage fluctuation caused by the supply of a charge of a rush current and the load fluctuation without increasing the power consumption. In particular, the capacitors $C_{jy}$ and $C_{kz}$ are effective for alleviating the load fluctuation caused by an oscillating voltage or the like in addition to the effects of the voltage generating circuit of Example 7. In an oscillating voltage driving method, a source driver alternately selects the voltages $V_a$ and $V_b$ per horizontal scanning period. Therefore, in the case where the transistors $FET_j$ and $FET_y$ are selected in one horizontal scanning period, in some cases, the capacitor $C_{jy}$ effectively alleviates the voltage fluctuation.

The gray-scale voltage generating device of the present example includes two voltage generating circuits; however, the number of the voltage generating circuits is not limited to two. Three or more voltage generating circuits may be used as shown in FIG. 49. In this case, capacitors provided between the output terminals of two operation amplifiers (i.e., capacitors $C_{jy}$ and $C_{kz}$ in FIG. 13) may be provided between any operational amplifiers of any voltage generating circuit.

Figure 14:
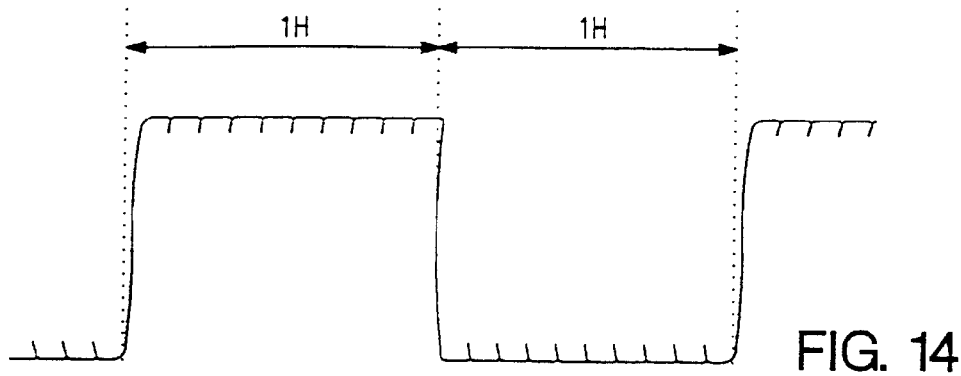
FIG. 14 is a diagram showing an example of an output waveform of the gray-scale voltage generating device of the present invention in the case where a voltage fluctuation due to the fluctuation of a load is improved.

FIG. 14 shows an output waveform of the voltage generating circuit of the present invention in the case where the source driver is driven by the oscillating voltage driving method. FIG. 14 corresponds to the output waveform of the conventional example shown in FIG. 58. As is understood from FIGS. 14 and 58, according to the present invention, the waveform rises or falls more rapidly at the time of switching the polarity, compared with the conventional example. The reason for this is that charges stored in the capacitors can be provided as part of a rush current. In addition, according to the present invention, the voltage fluctuation is suppressed more than the conventional example. This is because the capacitors compensate the load fluctuation caused by an oscillating voltage or the like. Thus, in the source driver employing the gray-scale voltage generating device of the present example, the output waveform has less voltage fluctuation, resulting in the rapid rise and fall of the waveform. The source driver may have a structure in which the gray-scale voltage generating device is integrated therein.

As is apparent from the above description, in the gray-scale voltage generating device of Example 9, the delay of the output waveform is reduced and the voltage fluctuation is suppressed, so that the display quality of the display device can be improved.

In the conventional circuit, electric power for charging or discharging the load is consumed right after the operational amplifier generates an A.C. signal (rectangular waveform). In the gray-scale voltage generating device of the present invention, since part of a charge for charging or discharging the load can be supplied by the capacitors, the consumption power supply can be reduced. In addition, in the conventional example as shown in FIG. 57, the electric power consumed by the transistor for amplifying an electric current is not required according to the present invention. Thus, the electric power consumption can be reduced.

Moreover, the power supply is not required to output an A.C. voltage, so that the operational amplifier for general purpose with a low slewing rate and at a low cost can be used. As a result, the effective cost reduction can be obtained. In the case where the transistors for a rush current are omitted, the effects of the reduction of cost are further increased.

When a gray-scale voltage generating device having the above-mentioned effects is applied to a source driver, the output waveform has less voltage fluctuation and its rise and fall are hardly delayed. Furthermore, since the electric power consumption in the source driver is reduced, a display device consuming a low electric power can be realized.

In addition, in Examples 6 to 9, the case where the present invention is applied to the gray-scale voltage generating circuit for a display device is described. The present invention is not limited thereto. For example, the present invention can be applied to a voltage generating circuit such as a common electrode drive circuit for a display device.

EXAMPLE 10

Figure 15:
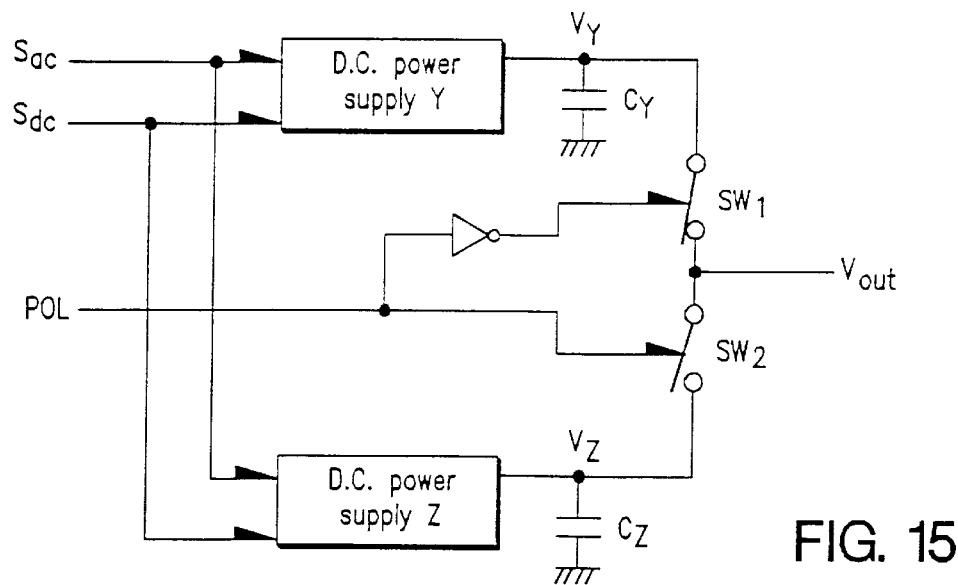
FIG. 15 is a circuit diagram of a common electrode drive circuit for a display device of Example 10.

FIG. 15 is a block diagram of a common electrode drive circuit of the present example. The present example shows the case where the amplitude of an A.C. output voltage $V_{out}$ given to the common electrode and the center of the amplitude are independently controlled.

Figure 16:
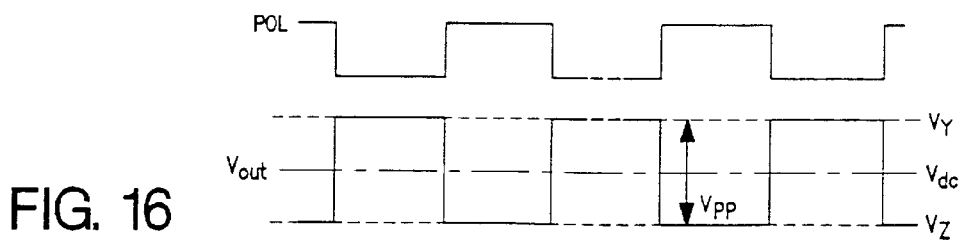
FIG. 16 is a diagram showing an output voltage $V_{out}$ of the common electrode drive circuit for the display device of FIG. 15.

The common electrode drive circuit shown in FIG. 15 includes D.C. power supplies Y and Z to which control signals $S_{ac}$ and $S_{dc}$ are given from outside. Output voltages $V_y$ and $V_z$ from the D.C. power supplies Y and Z are controlled by the control signals $S_{ac}$ and $S_{dc}$. FIG. 16 shows an example of the operation of a common electrode drive circuit of FIG. 15. The difference of an electric potential $V_{pp}$ of the output voltages $V_y$ and $V_z$ from the D.C. power supplies Y and Z is controlled by the control signal $S_{ac}$, and a center voltage $V_{dc}$ of the output voltages $V_y$ and $V_z$ is controlled by the control signal $S_{dc}$. Consequently, the amplitude of the output voltage $V_{out}$ and the center thereof can be controlled by the control signals $S_{ac}$ and $S_{dc}$ by switching the output voltages $V_y$ and $V_z$ with the switches $SW_1$ and $SW_2$.

Figure 17:
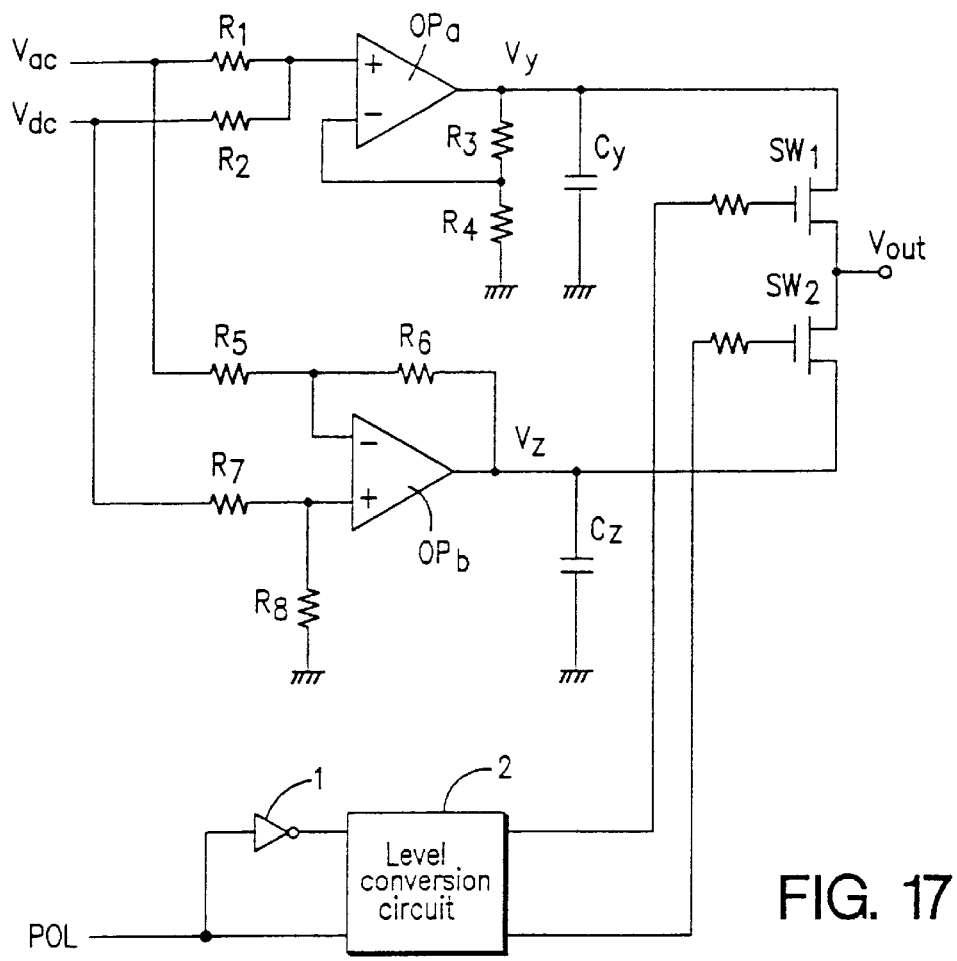
FIG. 17 is a circuit diagram of a common electrode drive circuit for a display device according to another embodiment of Example 10.

FIG. 17 illustrates an example in which the control signals $S_{ac}$ and $S_{dc}$ are regulated with a voltage. The control voltages $V_{ac}$ and $V_{dc}$ are respectively input to a non-inversion input terminal (+) of an operational amplifier $OP_a$ through resistors $R_1$ and $R_2$, and the output from the operational amplifier $OP_a$ is input to an inversion input terminal (−) after being divided by resistors $R_3$ and $R_4$. Thus, the operational amplifier $OP_a$ constitutes a non-inversion adder. The voltage $V_y$ is represented by the following Expression 1:

$$V_y = \frac{R_3 + R_4}{R_4}\left(\frac{V_{ac} \cdot R_2 + V_{dc} \cdot R_1}{R_1 + R_2}\right) \quad (1)$$

The control voltage $V_{dc}$ is input to a non-inversion input terminal (+) of the operational amplifier $OP_b$ after being divided by resistors $R_7$ and $R_8$, and the control voltage $V_{ac}$ is input to the inversion input terminal (−) through a resistor $R_5$. The output terminal of the operational amplifier $OP_b$ is connected to an inversion input terminal (−) through a resistor $R_6$. Thus, the operational amplifier $OP_b$ constitutes a subtracter. The voltage $V_z$ is represented by the following Expression 2:

$$V_z = V_{dc}\left(\frac{R_8}{R_7 + R_8} \cdot \frac{R_5 + R_6}{R_5}\right) - V_{ac}\frac{R_6}{R_5} \quad (2)$$

Assuming that the values of four resistors $R_1$, $R_2$, $R_3$, and $R_4$ provided around the operational amplifier $OP_a$ are equal to each other, and the values of four resistors $R_5$, $R_6$, $R_7$, and $R_8$ provided around the operational amplifier $OP_b$ are equal to each other, the output voltage $V_y$ from the operational amplifier $OP_a$ is represented by the following expression 3 and the operational amplifier $OP_b$ is represented by the following Expression 4:

$$V_y = V_{dc} + V_{ac} \quad (3)$$

$$V_z = V_{dc} - V_{ac} \quad (4)$$

Figure 18:
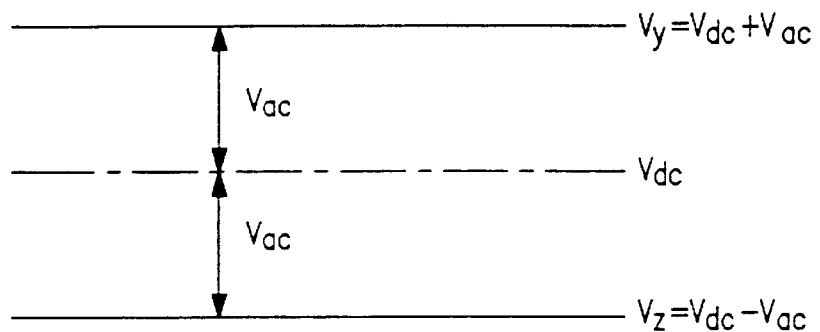
FIG. 18 is a diagram illustrating the output of two D.C. power supplies provided in the common electrode drive circuit for the display device of FIG. 17.

Thus, the output voltages $V_y$ and $V_z$ are as shown in FIG. 18.

Figure 19:
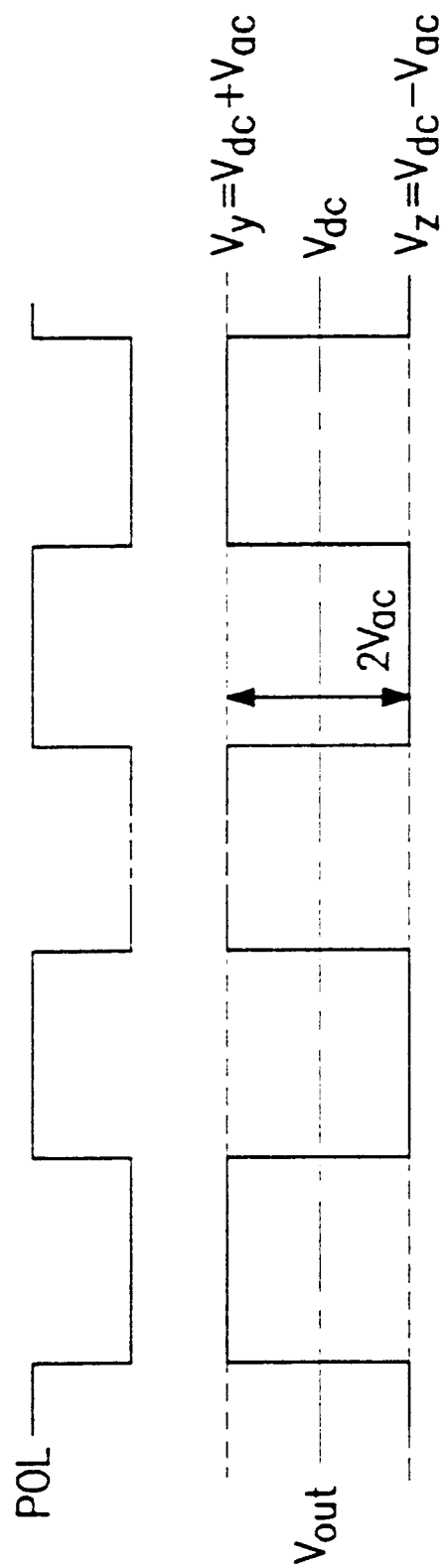
FIG. 19 is a diagram showing waveforms of a signal input to the common electrode drive circuit of the display device of FIG. 17 and a voltage output therefrom.

The output voltages $V_y$ and $V_z$ from the operational amplifiers $OP_a$ and $OP_b$ to the common electrode are controlled by switching the switches $SW_1$ and $SW_2$; therefore, when the switches $SW_1$ and $SW_2$ are alternately turned on and off, the output voltage $V_{out}$ to the common electrode becomes an A.C. voltage having a rectangular waveform in which a peak-to-peak voltage is the control voltage $V_{ac} \times 2$ and the center of the amplitude is the control voltage $V_{dc}$, as shown in FIG. 19. Because of this, the amplitude can be adjusted with the control voltage $V_{ac}$ and the center of the amplitude can be adjusted with the control voltage $V_{dc}$.

The reasons for the above-mentioned structure are as follows:

In the case of the voltage generating circuits as shown in FIGS. 8, 10, and 12, the respective voltages output from the D.C. power supplies Y and Z or from the operational amplifiers $OP_Y$ and $OP_Z$ have different amplitude and the centers thereof are different from each other. When the center of the amplitude is adjusted after the amplitude is set, the amplitude thus set is also varied. On the other hand, when the amplitude is adjusted after the center of the amplitude is set, the center of the amplitude is also varied. As a result, the voltage to be applied to each pixel is not uniform, leading to the deterioration of a display quality. On the other hand, in the case of the circuit shown in FIG. 17, even though the control voltage $V_{ac}$ is varied, the center of the amplitude is not varied, and even though the control voltage $V_{dc}$ is varied, the amplitude is not varied. More specifically, in this case, the center of the amplitude can be changed without changing the amplitude or the amplitude can be changed without changing the center of the amplitude. Particularly in the liquid crystal display device, the display quality can be prevented from being deteriorated.

In the case of the circuit of FIG. 17, a voltage is used as a control signal; however, the amplitude and the center thereof can be controlled with a logic signal by installing a D/A converter in the circuit, instead of being controlled with the voltage. In the example shown in FIG. 17, the non-inversion adder, i.e., the combination of the operational amplifier and the resistors is used as one D.C. power supply, and the subtracter, i.e., the combination of the operational amplifier and the resistors is used as the other D.C. power supply. The present invention is not limited thereto. Circuits with another structure can be used as two D.C. power supplies.

Figure 25:
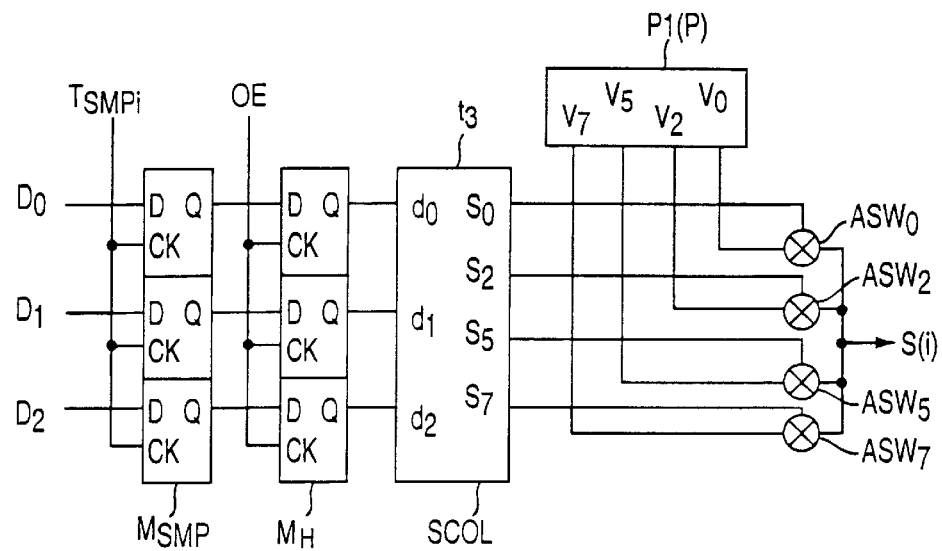
FIG. 25 is a block diagram of a data drive circuit showing a basic structure of the present invention.
Figure 55:
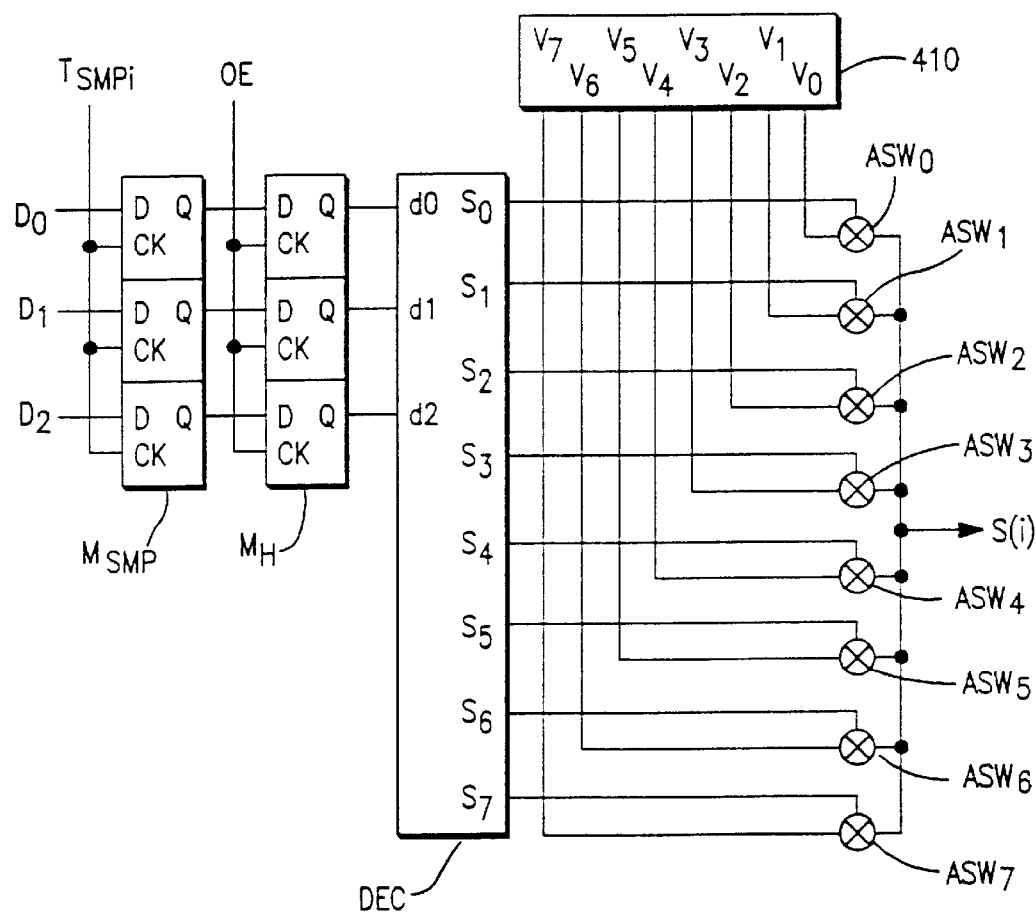
FIG. 55 is a block diagram of a conventional source driver.

The common electrode drive circuit of Example 10 is equivalent to a circuit in which the output terminal of the voltage generating circuit described in Examples 7 to 9 is connected to the common electrode. Thus, it is noted that the voltage generating circuit of the present invention can have a structure as shown in Examples 7 to 9. In this case, an appropriate circuit structure can be selected in accordance with an external device to which the output terminal is connected. The external device to which the voltage generating circuit of the present invention is applicable is not limited to the common electrode drive circuit. Any devices requiring a drive using a rectangular waveform can be applied. One example of such a device includes the gray-scale voltage power supply of the source drivers as shown in FIGS. 25 and 55. In this case, the source driver of the present invention can have the structures as shown in Examples 7 to 10.

EXAMPLE 11

Figure 20:
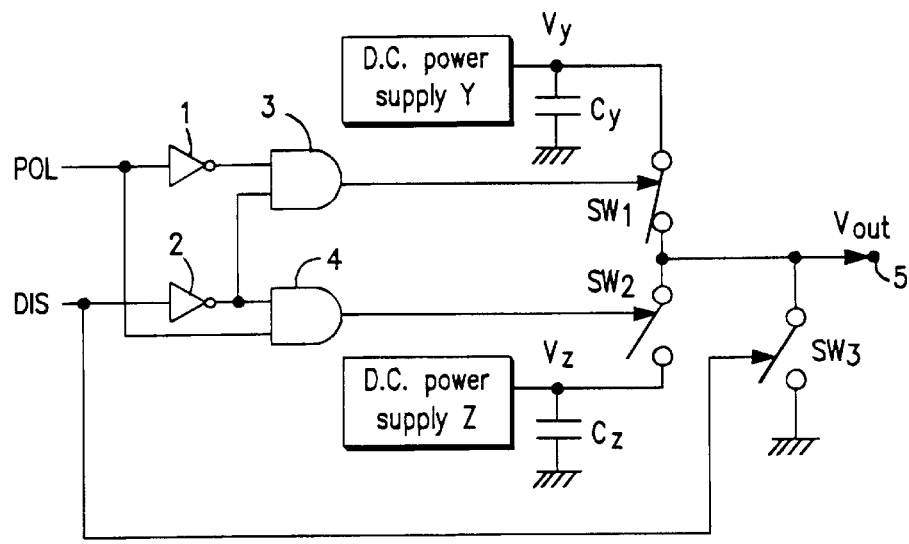
FIG. 20 is a circuit diagram showing a basic structure according to Example 11.

FIG. 20 shows the structure of a voltage generating-circuit according to the present example. The voltage generating circuit includes a plurality of power supplies, a D.C. power supply Y outputting a high output voltage $V_y$, a D.C. power supply Z outputting a low output voltage $V_z$, a first switching group consisting of two switches $SW_1$ and $SW_2$, and a second switching group consisting of one switch $SW_3$.

The D.C. power supply Y is connected to an output terminal 5 through the switch $SW_1$, the D.C. power supply Z is connected to the output terminal 5 through the switch $SW_2$, a portion between the output terminal 5 and the first switching group $SW_1$ is grounded (GND) through the switch $SW_3$.

The switches $SW_1$, $SW_2$, and $SW_3$ respectively select the D.C. power supplies Y, Z, and GND. The switches $SW_1$, $SW_2$, and $SW_3$ are turned on/off by a control signal POL (shown in (a) of FIG. 21) and a control signal DIS (shown in (b) of FIG. 21). The control signal POL has its polarity inverted per horizontal scanning period H, and the control signal DIS turns high for a predetermined period at a time when the control signal POL is switched from a high level to a low level or from a low level to a high level. The control signal POL inverted by an inverter 1 and the signal DIS inverted by an inverter 2 are operated through a positive logic AND gate 3, thereby obtaining a signal for the ON-OFF control of the switch $SW_1$. The control signal DIS inverted by the inverter 2 and the control signal POL are operated through a positive logic AND gate 4, thereby obtaining a signal for the ON-OFF control of the switch $SW_2$. The ON-OFF control of the switch $SW_3$ is performed by the control signal DIS. When the switch $SW_1$ is in an ON state, the switches $SW_2$ and $SW_3$ are turned off, and when the switch $SW_2$ is in an ON state, the switches $SW_1$ and $SW_3$ are turned off. When the switch $SW_3$ is in an ON state, the switches $SW_1$ and $SW_2$ are turned off. Thus, when the second switching group is in an ON state, the first switching group is turned off. More specifically, only one switch is turned on; a switch in an ON state is transferred sequentially.

The switches $SW_1$, $SW_2$, and $SW_3$ preferably have the lowest possible impedance when being in an ON state, and the highest possible impedance when being in an OFF state.

The output terminal of the D.C. power supply Y is connected to one terminal of a capacitor $C_y$ and that of the D.C. power supply Z is connected to one terminal of a capacitor $C_z$. The voltages output from the D.C. power supplies Y and Z are stabilized by the capacitors $C_y$ and $C_z$.

Figure 21:
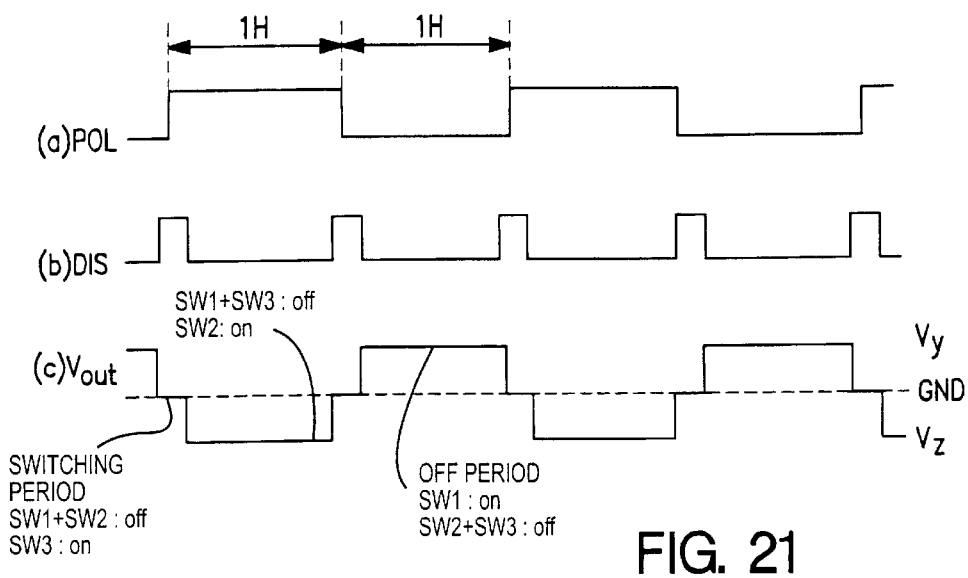
FIG. 21 is a basic timing chart of Example 11.

Hereinafter, the operation of the voltage generating circuit will be described by exemplifying the case where the voltage generating circuit is used in a common electrode drive circuit of a display device with reference to the timing chart of FIG. 21. In the line inversion driving method, it is assumed that a pixel is positively charged when the control signal POL is at a high level, and a pixel is negatively charged when the control signal POL is at a low level.

Under the above-mentioned assumption, the switches $SW_1$, $SW_2$, and $SW_3$ satisfying the following conditions are used: The switches $SW_1$, $SW_2$, and $SW_3$ are turned on when the control signal POL is at a high level, and the switches $SW_1$, $SW_2$, and $SW_3$ are turned off when the control signal POL is at a low level. In this case, as shown in (a) of FIG. 21, when the control signal POL is at a high level and the control signal DIS is at a low level, that is, when a pixel is to be positively charged, the switch $SW_2$ is turned on and the switches $SW_1$ and $SW_3$ are turned off. Thus, as shown in (c) of FIG. 21, a voltage $V_z$ output from the D.C. power supply Z is output to the output terminal 5. On the other hand, when the control signal POL is at a low level and the control signal DIS is at a low level, that is, when a pixel is to be negatively charged, the switch $SW_1$ is turned on and the switches $SW_2$ and $SW_3$ are turned off. Thus, as shown in (c) of FIG. 21, a voltage $V_y$ is output from the D.C. power supply Y is output to the output terminal 5. When the polarity of the control signal POL is switched, that is, when the control signal DIS is at a high level, the switches $SW_1$ and $SW_2$ are always in an OFF and the switch $SW_3$ is in an ON state. As shown in (c) of FIG. 21, the output terminal 5 is grounded (GND) by the switch $SW_3$.

Because of the above-mentioned structure, a rush current flowing when the polarity of the control signal POL is switched is supplied from the GND, thus reducing the rush current from the D.C. power supplies Y and Z.

EXAMPLE 12

Figure 22:
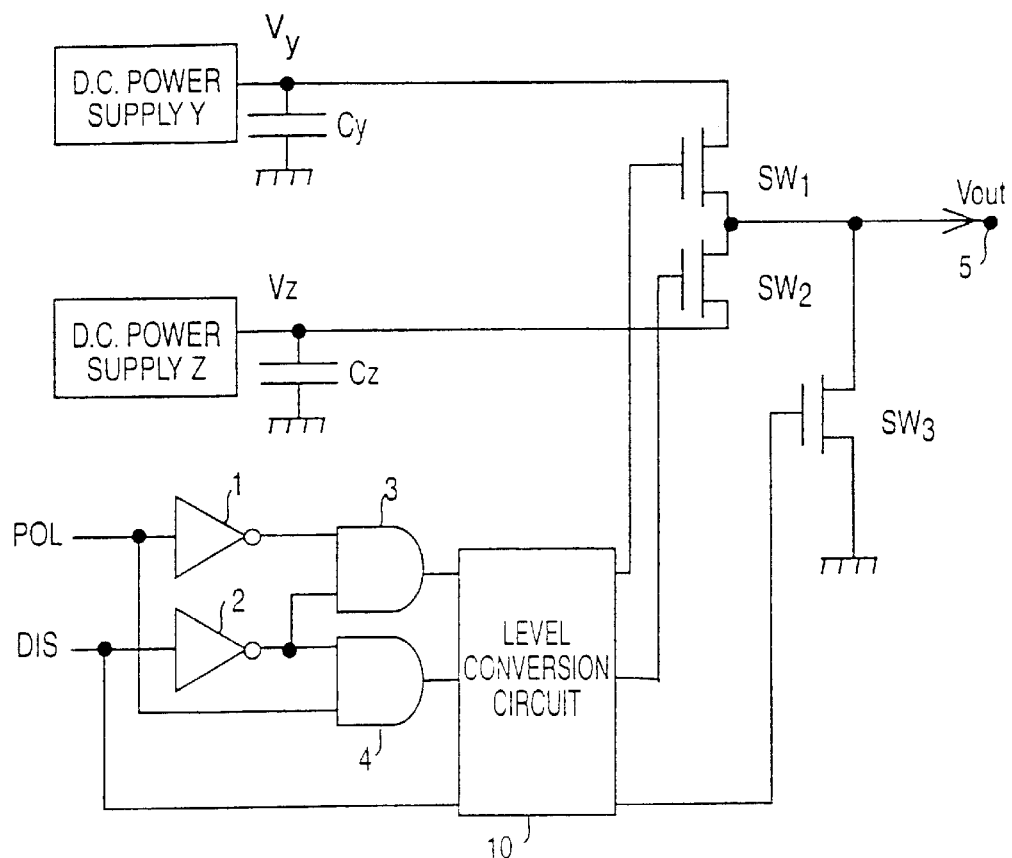
FIG. 22 is a circuit diagram of a common electrode drive circuit for a display device of Example 12.

FIG. 22 shows a common electrode drive circuit of a display device according to the present invention. The timing chart of the present example is the same as that shown in FIG. 21 of Example 11.

In the present example, FETs are used as the switches $SW_1$, $SW_2$, and $SW_3$. Because of this, the level conversion circuit 10 converts the levels of the control signal DIS and the inverted signal thereof, which are provided at a logic level, into those suitable for the control of the FETs. The other components are similar to those in FIG. 20. The reason for using FETs for switches is that the FETs have characteristics suitable for the present invention, i.e., the FETs allow an electric current to flow bidirectionally and have remarkably small ON resistance. The level conversion circuit 10 is not required, depending upon the characteristics of the FETs to be used.

In the common electrode drive circuit with the above-mentioned structure, when the polarity of the control signal POL is switched, that is, when the control signal DIS is at a high level, the switches $SW_1$ and $SW_2$ are always in an OFF state, the switch $SW_3$ is in an ON state, and the output terminal 5 is grounded (GND) by the switch $SW_3$. Because of this, a rush current flowing when the polarity of the control signal POL is switched is supplied from the GND, thus reducing the rush current from the D.C. power supplies Y and Z.

Since a plurality of switches $SW_1$, $SW_2$, and $SW_3$ are not simultaneously turned on, there is no possibility that the electric current flowing from the D.C. power supplies Y and Z flow into the GND through the switches $SW_1$ and $SW_3$ or the switches $SW_2$ and $SW_3$.

In the present example, the FETs are used as switches; however, the present invention is not limited thereto. Other kinds of switches can be used.

EXAMPLE 13

The present example shows the case where switches having a large transient response are used.

In Example 12, a plurality of switches are not simultaneously turned on. In the case where switches having a transient response such as a MOS analog switch are used, a feedthrough current sometimes flows at the time of switching from a ON state to an OFF state or from an OFF state to an ON state. In the present example, each switch may be controlled so as to have a period in which both of the switches are simultaneously turned off at the time of switching. More specifically, the OFF period is preferably set to be as long as possible.

Figure 48:
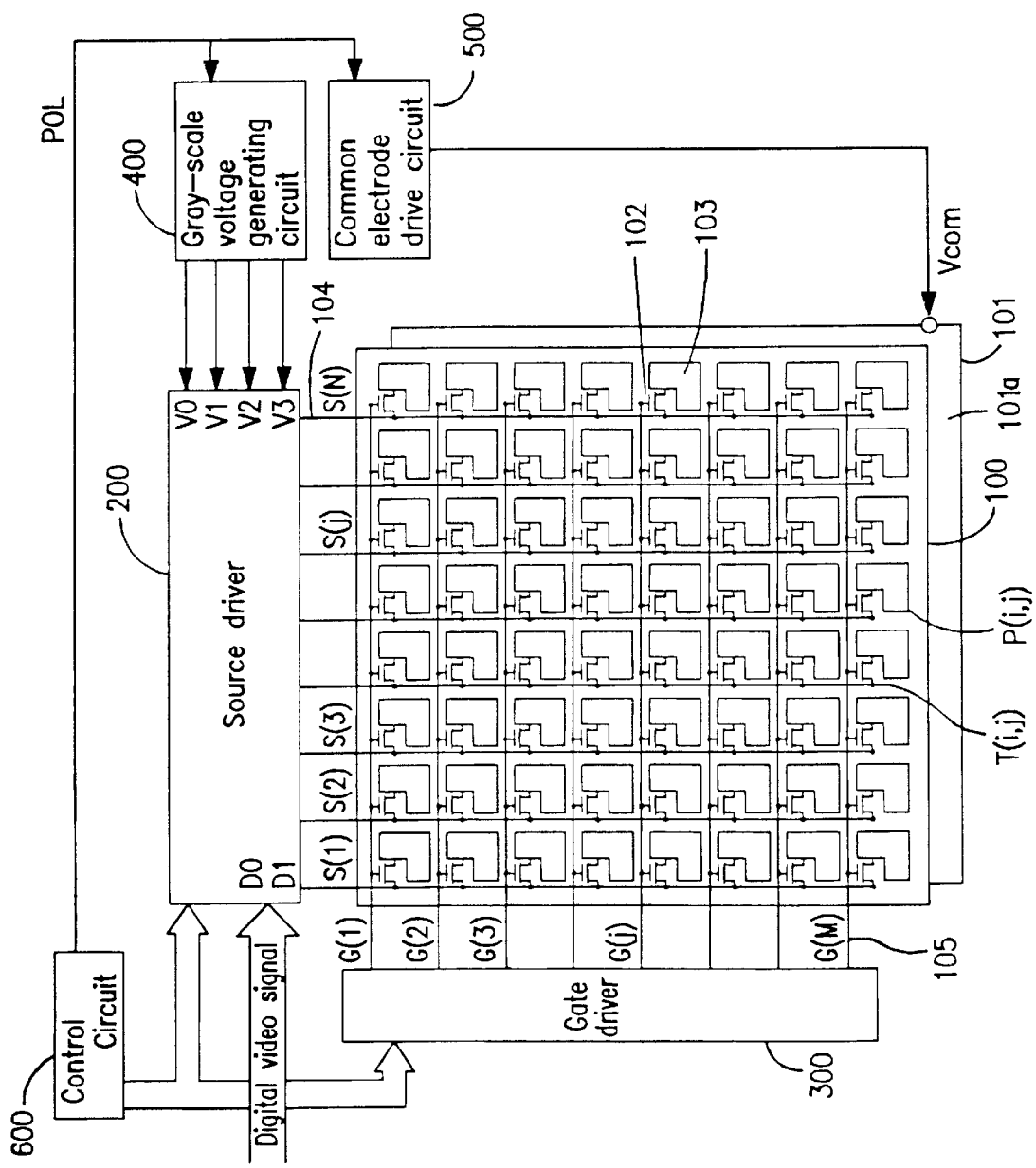
FIG. 48 is a circuit diagram showing an active matrix liquid crystal display device.

The voltage generating circuit of Examples 11 to 13 of the present invention can be applied to any device directly or indirectly driving the load as well as the common electrode drive circuit of the display device. An example of the device includes the gray-scale voltage generating circuit 400 for providing the gray-scale voltage to the source driver 200 shown in FIG. 48.

The present invention can be applied to both the common electrode drive circuit and the gray-scale voltage generating circuit used in the display device.

As is apparent from the above description, in the voltage generating circuits of Examples 11 to 13, a rush current flowing when the polarity of the control signal POL is switched is not required to be supplied from the circuit itself and a rush current generated in the circuit can be remarkably decreased, realizing a voltage generating circuit with low power consumption. Moreover, a conventionally used complementary circuit for amplifying an electric current constituted by a transistor or the like is not required, thus reducing the cost. Furthermore, the electric power consumed by the transistors in the conventional example is not required, so that the electric power can be reduced. Thus, the voltage generating circuit consumes a small amount of electric power, so that the substrate used therein can be miniaturized and a device provided with the voltage generating circuit can be made thin.

When the present invention is applied to the common electrode drive circuit or the gray-scale voltage generating circuit of the display device in which a rush current causes the strain of a voltage waveform to decrease a display quality, the display quality can be improved while low electric power is consumed. In particular, when the present invention is applied to the common electrode drive circuit and the gray-scale voltage generating circuit of the display device, the low power consumption and the improved display quality can be further effectively obtained.

EXAMPLE 14

Figure 23:
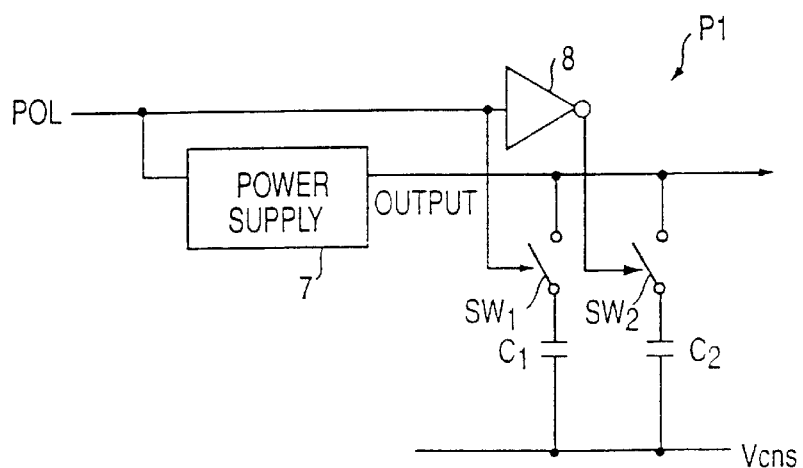
FIG. 23 is a circuit diagram of a power supply circuit of Example 14.
Figure 24:
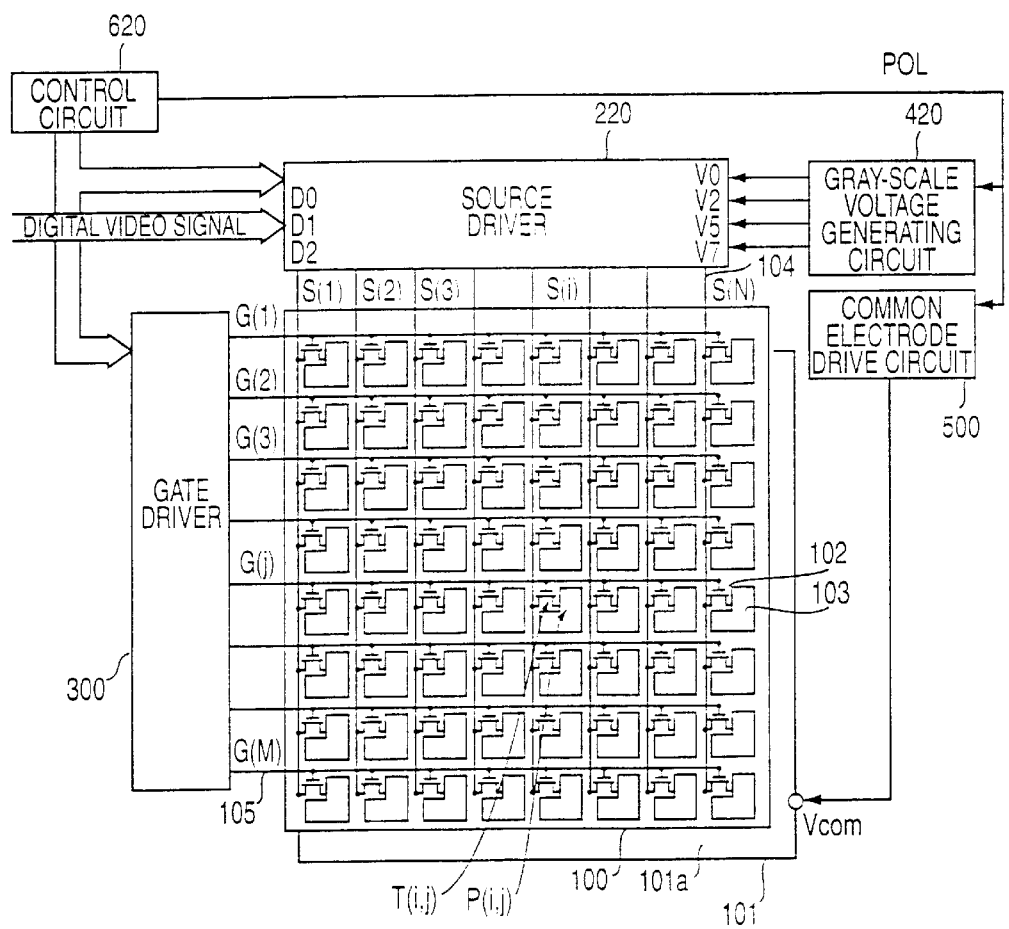
FIG. 24 is a circuit diagram of a display device of Example 14.

FIG. 23 is a circuit diagram of a gray-scale voltage generating circuit P1 (corresponding to the reference numeral 420 of FIG. 24) provided in a source driver 220 (see FIG. 24) of the present example. FIG. 24 is a block diagram of an active matrix liquid crystal display device (hereinafter, referred to as a display device) using the source driver 220. FIG. 25 is a block diagram of the source driver 220. The present example is characterized by the structure of the gray-scale voltage generating circuit P1 shown in FIG. 23.

As shown in FIG. 24, a display portion includes M×N pixel electrodes P(i, j) (i=1, 2, . . . , N; j=1,2, . . . ,M ) arranged in M rows and N columns and switching elements T(i, j) (i=1,2, . . . ,N; j=1,2, . . . ,M) respectively connected to the pixel electrodes P(i, j). The source driver 220 and a gate driver 300 constitute a drive circuit for driving the display portion. N signal lines S(i) (i=1,2, . . . ,N) respectively connect output terminals of the source driver 220 to the switching elements T(i, j). M scanning lines G(j) (j=1,2, . . . ,M) in the display portion respectively connect output terminals of the gate driver 300 to the switching elements T(i, j).

A thin film transistor (TFT) can be used as the switching element T(i, j). Other kinds of switching elements can also be used. Hereinafter, the TFT is exemplified, so that the scanning line G(j) is referred to as a gate line G(j).

A voltage is successively output to the gate line G(j) from the gate driver 300 through the output terminal G(j). This voltage is at a high level for a particular period (hereinafter, referred to as one horizontal scanning period (j)th (j=1,2, . . . ,M)). With respect to the variable j=1,2, . . . ,M, the total periods of the respective horizontal scanning period (j)th are referred to as one vertical scanning period.

When a voltage level of a gate signal output to the gate line G(j) is high, the switching element T(i, j) is in an ON state. When the switching element T(i, j) is in an ON state, the pixel electrode P(i, j) is charged in accordance with a voltage output from the output terminal of the source driver 220 to the signal line S(i). The level of the charged voltage is retained at a predetermined one during one vertical scanning period and a voltage at this level is applied to the pixel electrode P(i, j).

FIG. 25 is a block diagram showing the internal structure (fundamental structure) of the source driver 220. Hereinafter, the case where image data is made of 3 bits ($D_0$, $D_1$, $D_2$) will be exemplified. More specifically, the image data has 8 kinds of values (i.e., 0 to 7), and a signal voltage to be given to each pixel electrode P(i, j) is as follows: any one of 4 levels of external gray-scale voltages $v_0$, $v_2$, $v_5$, and $v_7$ from the external gray-scale power supplies $V_0$, $V_2$, $V_5$, and $V_7$ in the external gray-scale voltage generating circuit P1, or one or more of gray-scale voltages between any two of the external gray-scale voltages $v_0$, $v_2$, $v_5$, and $v_7$.

The source driver 220 is provided for the bits ($D_0$, $D_1$, $D_2$) of image data, including the first-stage sampling flip-flops $M_{SMP}$ for a sampling operation, the second-stage D-type flip-flops $M_H$ for a holding operation, the selection control circuit SCOL, and the analog switches $ASW_0$, $ASW_2$, $ASW_5$, and $ASW_7$ provided between the signal line S(i) and the four kinds of external gray-scale power supplies $V_0$, $V_2$, $V_5$, and $V_7$. The analog switches $ASW_0$ to $ASW_7$ are provided with the external gray-scale voltages $v_0$, $v_2$, $v_5$, and $v_7$ and control signals from the output terminals $S_0$, $S_2$, $S_5$, and $S_7$ of the selection control circuit SCOL. The selection control circuit SCOL is provided with a signal $t_3$ having a predetermined duty ratio.

In order to realize an 8-gray-scale display in the source driver 220 of FIG. 25, the number of the external gray-scale power supplies is reduced to half (i.e., 4) of the conventional example shown in FIG. 55. In the source driver 220, outputs from the gray-scale power supplies $V_1$, $V_3$, $V_4$, and $V_6$ are formed by an oscillating voltage driving method.

The relation between the image data input to the source driver 220 of FIG. 25 and the gray-scale voltage obtained from the source driver 220 is shown in Table 1.

When the value of image data is either of 1, 2, 5, or 7, either one of the external gray-scale voltages $v_0$, $v_2$, $v_5$, and. $v_7$ is output to the signal line S(i). When the value of image data is other than 1, 2, 5, and 7, a voltage oscillating between any two of the external gray-scale voltages $v_0$, $v_2$, $v_5$, and $v_7$ is output to the signal line S(i). In this way, 8 gray-scale display levels can be obtained from 4 levels of the external gray-scale power supplies.

Hereinafter, an oscillating voltage driving method will be described.

Figure 26:
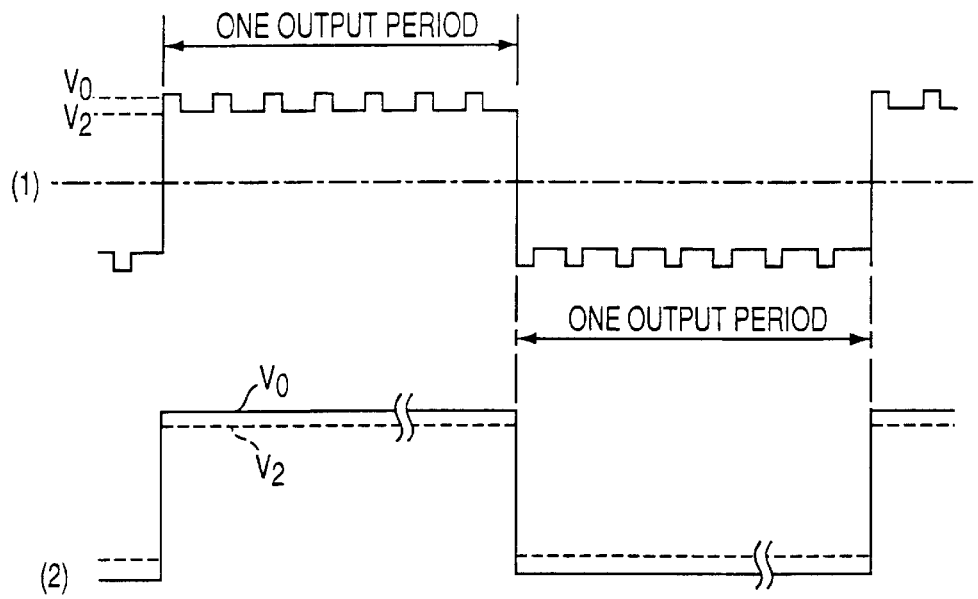
FIG. 26 is a diagram showing waveforms of output voltages in an oscillating voltage driving method.

FIG. 26 shows (1) an output waveform corresponding to the external gray-scale voltage $v_1$ and (2) a waveform of the external gray-scale voltages $v_0$ and $v_2$. That is, an oscillating voltage, which oscillates a plurality of times between the external gray-scale voltages $v_0$ and $v_2$ during one output period such as one horizontal scanning period, is output. A low pass filter (LPF) is formed due to the resistance and capacitance of wirings between the source driver and the pixels constituting the display panel. Thus, the oscillating voltage passes through the LPF, whereby the gray-scale voltage $v_1$ is given to a pixel as an average value of the oscillating voltage.

Figure 27:
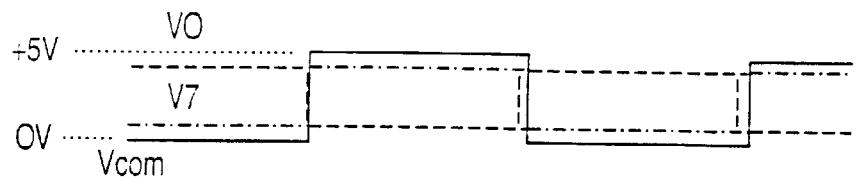
FIG. 27 is a waveform diagram showing the relation between a video data signal and a common electrode drive signal.

FIG. 27 shows an example of waveforms of the external gray-scale voltages $v_0$ and $v_7$ together with a common electrode drive signal $v_{com}$. FIG. 27 shows waveforms in the case of a line inversion (the polarity of a voltage is inverted per horizontal scanning period). As shown in this figure, the polarity of the external gray-scale voltage $v_0$ is opposite to that of the common electrode drive signal. Both of these waveforms are rectangular and these waveforms are inverted at the same point. When the image data is 0, the capacitance of a liquid crystal layer or the like is charged with a voltage between the gray-scale voltage $v_0$ and the common electrode drive signal $v_{com}$.

In the gray-scale voltage generating circuit P1 shown in FIG. 23, a power supply 7 outputs a rectangular wave or a waveform similar thereto. The power supply 7 may have the same structure as that of the power supply circuit shown in FIG. 57. The output from the power supply 7 is input to the respective input terminals of the switches $SW_1$ and $SW_2$. Output terminals of the switches $SW_1$ and $SW_2$ are respectively connected to a predetermined reference electric potential $V_{cns}$ through capacitors $C_1$ and $C_2$. The switch $SW_1$ is turned to be a conductive state or a non-conductive state by the control signal POL, and the switch $SW_2$ is turned to be a conductive state or a non-conductive state by an inversion signal $\overline{POL}$ which is inverted by an inverter 8. The switches $SW_1$ and $SW_2$ are turned to be a conductive state or a non-conductive state in a complementary manner only in either a positive time period or a negative time period.

Figure 28:
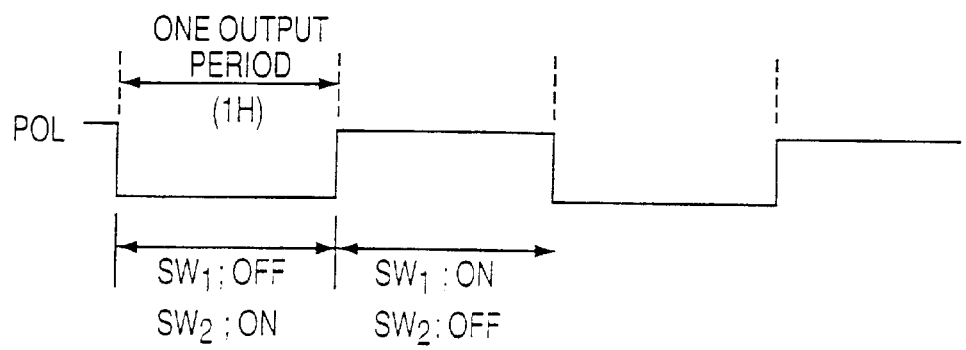
FIG. 28 is a waveform diagram of a control signal POL.

FIG. 28 shows a timing chart of the control signal POL. The operation of the gray-scale voltage generating circuit P1 of FIG. 23 will be described based on the waveform of the control signal POL of FIG. 28. The control signal POL shows the time when a pixel is charged with a positive voltage or a negative voltage. The control signal POL at a high level shows the time when a pixel is charged with a positive voltage, and the control signal POL at a low level shows the time when a pixel is charged with a negative voltage. The power supply 7 switches an output voltage between a positive level and a negative level, based on the control signal POL.

Referring to FIG. 23, when the control signal POL is at a high level, the switch $SW_1$ is in an ON state and the capacitor $C_1$ is connected to the power supply 7. During this time, the capacitor $C_1$ absorbs or supplies a charge based on the current fluctuation. On the other hand, during this time, the switch $SW_2$ is in an OFF state and the capacitor $C_2$ is disconnected from the power supply 7. Thus, the capacitor $C_2$ does not become a load for the power supply 7.

When the control signal POL is at a low level, the switch $SW_1$ is in an OFF state, and the capacitor $C_1$ is disconnected from the power source 7. Thus, in this case, the capacitor $C_1$ does not become a load for the power supply 7. On the other hand, during this time, the switch $SW_2$ is in an ON state, the capacitor $C_2$ is connected to the power source 7, and the capacitor $C_2$ absorbs or supplies a charge based on the current fluctuation.

As described above, in the gray-scale voltage generating circuit P1 of the present example, once the capacitors $C_1$ and $C_2$ are charged to an electric potential supplied from the power supply 7, the capacitors $C_1$ and $C_2$ are neither charged nor discharged while the output from the power supply 7 is switched between a positive level and a negative level. There is no possibility that these capacitors $C_1$ and $C_2$ become a load for the power supply 7 which outputs a voltage in a rectangular waveform. Thus, capacitors having such a large capacitance as to absorb the rapid fluctuation of a current and a voltage due to the load can be selected as the capacitors $C_1$ and $C_2$.

In the present example, the capacitors $C_1$ and $C_2$ are charged to the intended electric potential only once at the beginning of the operation of the gray-scale voltage generating circuit P1. However, the capacitors $C_1$ and $C_2$ may be charged throughout a plurality of positive or negative time periods, whereby the capacitors $C_1$ and $C_2$ are gradually charged to the intended electric potential.

EXAMPLE 15

Figure 29:
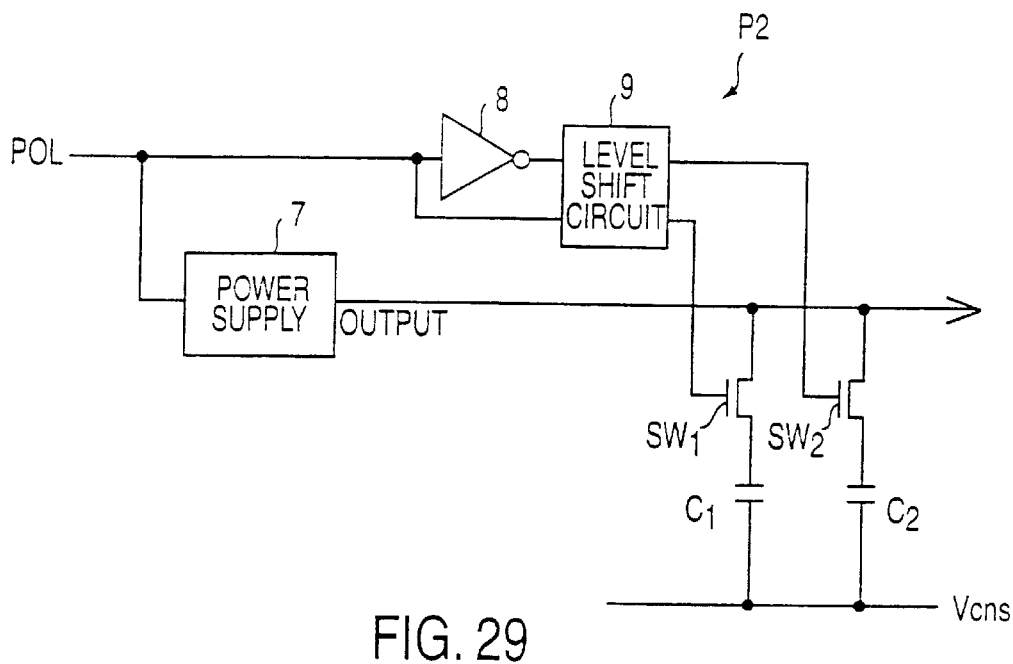
FIG. 29 is a circuit diagram of a power supply circuit of Example 15.

FIG. 29 shows the structure of a gray-scale voltage generating circuit P2 (corresponding to the reference numeral 420 of FIG. 24) of the present example. Components identical with those in Example 14 bear the identical reference numerals.

The gray-scale voltage generating circuit P2 is characterized in that field effect transistors (FETs) are used as the switches $SW_1$ and $SW_2$ and the control signal POL and the inverted signal thereof are respectively input to gates of the switches $SW_1$ and $SW_2$ through a level shift circuit 9. The FET allows a current to flow bidirectionally and has a remarkably small ON resistance; for this reason, the FET is suitable for the switches $SW_1$ and $SW_2$ of the present example. The level shift circuit 9 converts the control signal POL and the inverted signal thereof, which are provided at a logic level, into a signal level suitable for the control of the FET. The level shift circuit 9 is not necessary depending upon the characteristics of the FET to be used.

In the gray-scale voltage generating circuit P2 with the above-mentioned structure, the same effects as those of Example 14 can be obtained.

EXAMPLE 16

Figure 30:
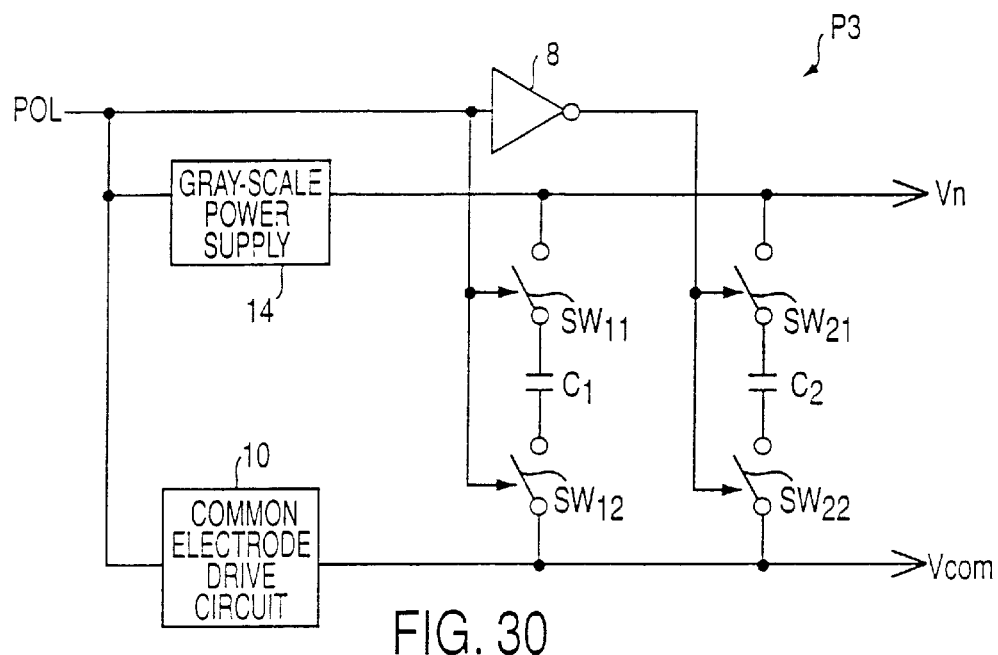
FIG. 30 is a circuit diagram of a power supply circuit of Example 16.

FIG. 30 shows the structure of a gray-scale voltage generating circuit P3 (corresponding to the reference numeral 420 of FIG. 24) of the present example. Components with those of Example 14 bear the identical reference numerals.

The gray-scale voltage generating circuit P3 is characterized in that a gray-scale power supply circuit 14 and a common electrode drive circuit 10 are provided, a series circuit including a switch $SW_{11}$, a capacitor $C_1$, and a switch $SW_{12}$ and a series circuit including a switch $SW_{21}$, a capacitor $C_2$, and a switch $SW_{22}$ are respectively connected between the gray-scale power supply circuit 14 and the common electrode drive circuit 10.

The display portion 5 shown in FIG. 24 is driven by a drive voltage oscillating between a common voltage $v_{com}$ from the common electrode drive circuit 10 and the external gray-scale voltage output through the source driver 220. Thus, the structure of the gray-scale voltage generating circuit P3 is more simplified, compared with the case where the gray-scale voltage $v_n$ (n=0, 2, 5, 7) and the common voltage $v_{com}$ are respectively formed by different circuits. In addition, the precision at which each of these signals is synchronized can be much improved.

According to the present example, the same effects as those in Example 14 can be obtained. In particular, the present example has its own effect that the structure of the gray-scale voltage generating circuit P3 is simplified.

EXAMPLE 17

Figure 31:
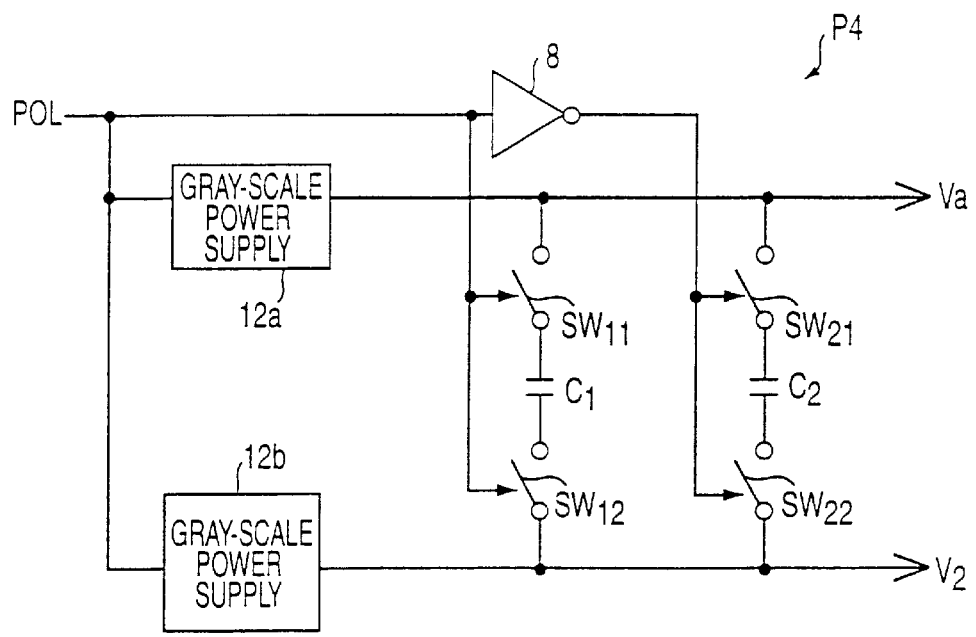
FIG. 31 is a circuit diagram of a power supply circuit of Example 17.

FIG. 31 shows the structure of a gray-scale voltage generating circuit P4 (corresponding to the reference numeral 420 of FIG. 24) of the present example. Components identical with those of Example 14 bear the identical reference numerals.

The gray-scale voltage generating circuit P4 is characterized in that a pair of gray-scale power supply circuits 12a and 12b which respectively output the external gray-scale voltages $v_0$ and $v_2$ are provided, and the series circuit including the switch $SW_{11}$, the capacitor $C_1$, and the switch $SW_{12}$ and the series circuit including the switch $SW_{21}$, the capacitor $C_2$, and the switch $SW_{22}$ are respectively connected between the gray-scale power supply circuits 12a and 12b. An oscillating voltage used for the above-mentioned oscillating voltage driving method is formed between the pair of external gray-scale voltages.

Thus, a power supply circuit with a structure similar to that of the gray-scale voltage generating circuit P4 shown in FIG. 31 may be provided between each pair of external gray-scale voltages $v_0, v_2; v_2, v_5; v_5, v_7$ which is required for forming the gray-scale voltages $v_{1, v_3}, v_4$; and $v_6$ shown in Table 1. The gray-scale voltage generating circuit P4 of the present example corresponds to a pair of external gray-scale power supplies $V_0$ and $V_2$ among pairs of the external gray-scale power supplies $V_{0, v_2}; V_2, V_5; V_5, V_7$.

According to the present example, the same effects as those of the Example 14 can be obtained.

The fundamental operation of each of the above-mentioned Examples 14 to 17 is as follows: The capacitors $C_1$ and $C_2$ are connected to or disconnected from the power supply circuit at the same time with the switching between a positive level and a negative level of the output voltage from the power supply circuit. For practical application, it is desired that the disconnection is conducted right before the switching and the connection is conducted when an appropriate period of time elapses after the switching; more specifically, the connection is conducted after a transition period following the switching.

EXAMPLE 18

Figure 32:
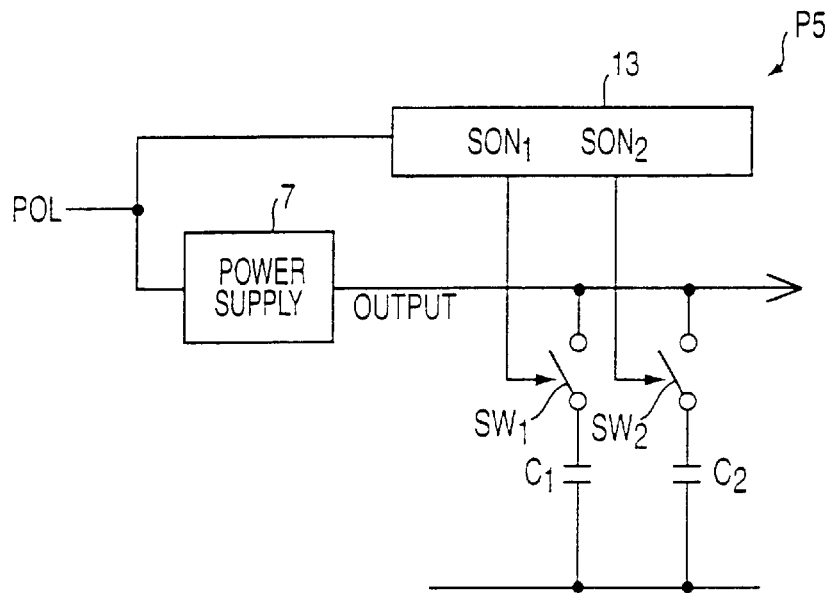
FIG. 32 is a circuit diagram of a power supply circuit of Example 18.
Figure 33:
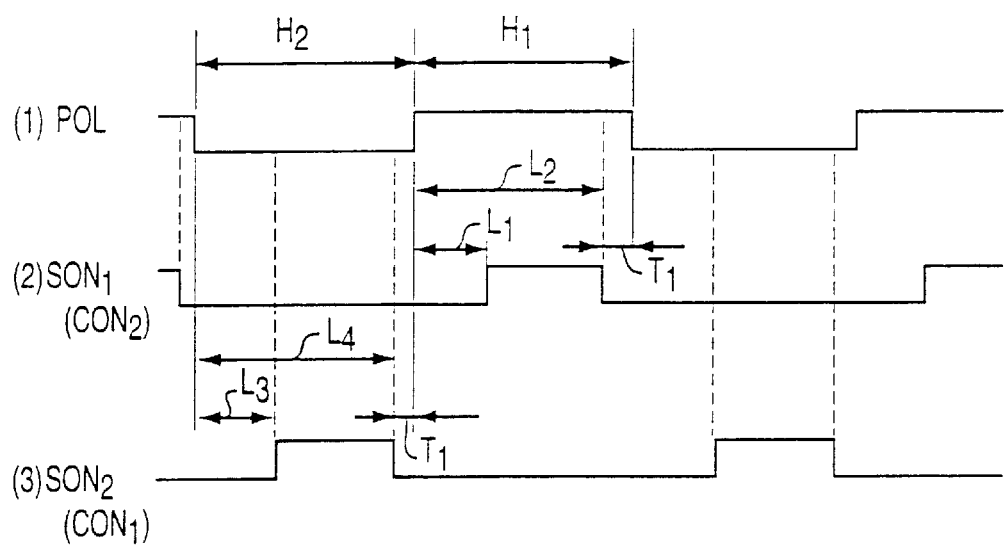
FIG. 33 is a timing chart showing control signals POL, $SON_1$, and $SON_2$.

FIG. 32 is a circuit diagram showing the structure of a gray-scale voltage generating circuit P5 (corresponding to the reference numeral 420 of FIG. 24) of the present example. The gray-scale voltage generating circuit P5 has the same structure as that of the gray-scale voltage generating circuit P1 shown in FIG. 23 except that the switching operations of the switches $SW_1$ and $SW_2$ are independently controlled by control signals $SON_1$ and $SON_2$. FIG. 33 shows the relation among the control signals $SON_1$, $SON_2$, and POL. The control signal POL of FIG. 33 is the same as the control signal POL of FIG. 28. The polarity of the output voltage from the gray-scale voltage generating circuit P5 is inverted to a positive state or a negative state, synchronized with the rise and fall of the control signal POL.

The control signals $SON_1$ and $SON_2$ are formed by a signal generating circuit 13, based on the control signal POL. When the control signals $SON_1$ and $SON_2$ are respectively at a high level, the switches $SW_1$ and $SW_2$ are respectively in an ON state and the capacitors $C_1$ and $C_2$ are connected to the power supply 7. In the present example, the disconnection of the switch $SW_1$ is conducted at a timing faster by a period $T_1$ than the timing at which the control signal POL is switched from a high level to a low level. The connection of the switch $SW_1$ is conducted after the elapse of a period $L_1$ following the time at which the control signal POL is switched from a low level to a high level. The period $L_1$ corresponds to a period during which a transition period right after the switching has almost been finished and the level of the output voltage becomes stable.

In the signal generating circuit 13, the timing for the rise of the control signal $SON_1$ is set so that the control signal $SON_1$ rises after the period $L_1$ elapses following the rise of the control signal POL. The timing for the fall of the control signal $SON_1$ is set so that the control signal $SON_1$ falls after the period $L_2$ elapses following the rise of the control signal POL. The period $L_2$ is set so as to be shorter by a predetermined period $T_1$ than a rise period $H_1$ of the control signal POL.

The timing for the rise of the control signal $SON_2$ is set so that the control signal $SON_2$ rises after a period $L_3$ elapses following the fall of the control signal POL. The period $L_3$ is equal to or nearly equal to the period $L_1$. The timing for the fall of the control signal $SON_2$ is set so that the control signal $SON_2$ falls after a period $L_4$ elapses following the rise of the control signal POL. The period $L_4$ is set so as to be shorter by the period $T_1$ than the fall period $H_2$ of the control signal POL. The period $H_2$ is equal to or nearly equal to the period $H_1$.

According to the present example, the same effects as those of Example 18 can be obtained. Further, the control signals $SON_1$ and $SON_2$ are set as described above, whereby the display quality can be remarkably improved in the display device shown in FIG. 24.

EXAMPLE 19

Figure 34:
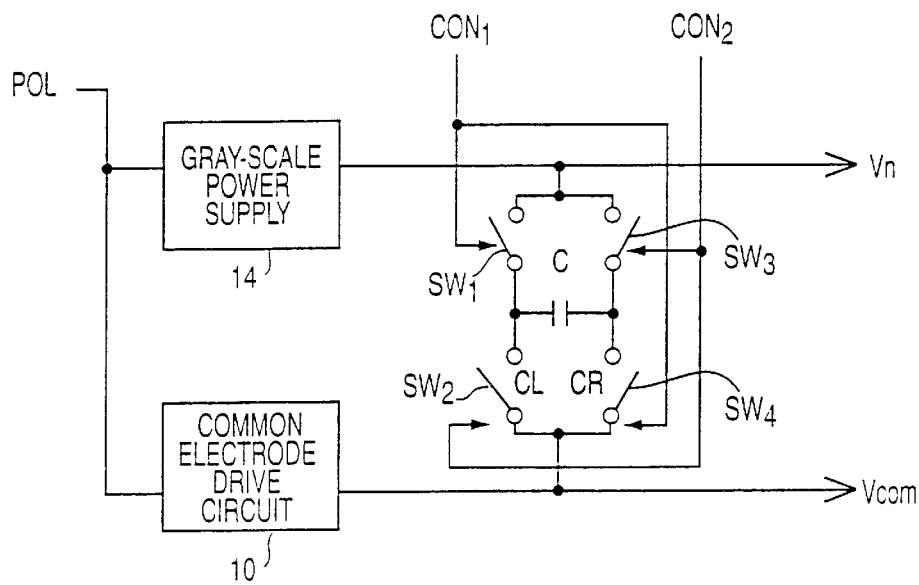
FIG. 34 is a circuit diagram of a power supply circuit of Example 19.

FIG. 34 is a circuit diagram of a gray-scale voltage generating circuit P6 (corresponding to the reference numeral 420 of FIG. 24) of the present example. The gray-scale voltage generating circuit P6 has a structure similar to that of the gray-scale voltage generating circuit P3 of Example 16. Components identical with those of Example 16 bear the identical reference numerals.

The power supply circuit P6 is characterized in that an output line of the gray-scale power supply circuit 14 is commonly connected to each input terminal of the switches $SW_1$ and $SW_3$, and an output line of the common electrode drive circuit 10 is commonly connected to each output terminal of the switches $SW_2$ and $SW_4$. The respective output terminals of the switches $SW_1$ and $SW_3$ are connected to the respective input terminals of the switches $SW_2$ and $SW_4$. A capacitor C is connected between the respective output terminals of the switches $SW_1$ and $SW_3$.

In the present example, the control signal $CON_1$ which is the same as that shown in FIG. 33 is used for controlling the on/off operation of the switches $SW_1$ and $SW_4$ and the control signal $CON_2$ is used for controlling the on/off operation of the switches $SW_2$ and $SW_3$.

In the present example, when the control signal $CON_1$ is at a high level and the control signal $CON_2$ is at a low level, the switches $SW_1$ and $SW_4$ are in an ON state, the switches $SW_2$ and $SW_3$ are in an OFF state, an electrode CL of the capacitor C on the side of the switch $SW_1$ is connected to the gray-scale power supply circuit 14, and an electrode CR of the capacitor C on the side of the switch $SW_3$ is connected to the common electrode drive circuit 10. The time period in which the control signal $CON_1$ is at a high level corresponds to a positive time period. This means that the gray-scale power supply circuit 14 outputs a positive voltage to the common electrode drive circuit 10. That is, the electrode CL is provided with a positive polarity and the electrode CR is provided with a negative polarity.

When the control signal $CON_1$ is at a low level and the control signal $CON_2$ is at a high level, the switches $SW_1$ and $SW_4$ are in an OFF state, the switches $SW_2$ and $SW_3$ are in an ON state, the electrode CL is connected to the common electrode drive circuit 10, and the electrode CR is connected to the gray-scale power supply circuit 14. The time period in which the control signal $CON_2$ is at a high level corresponds to a negative time period. This means that the gray-scale power supply circuit 14 outputs a negative voltage to the common electrode drive circuit 10. Thus, the electrode CL is provided with a positive polarity and the electrode CR is provided with a negative polarity, in the same way as in the control signal $CON_1$ at a high level and the control signal $CON_2$ at a low level.

According to the present example, in either a positive time period or a negative time period, the capacitor C can sufficiently absorb or supply a charge with respect to the rapid fluctuation of a current or a voltage due to the load of the gray-scale power supply circuit 14 and the common electrode drive circuit 10.

As described above, according to each of Examples 14 to 19, a charge storage unit (capacitor), which has a large capacitance sufficient for absorbing the change in a current in a positive time period or a negative time period, without becoming a load on the power supply circuit outputting an A.C. voltage having a rectangular wave, etc., can be realized. A power supply capable of minimizing the fluctuation of a voltage in a positive or a negative time period can be realized. Because of this, the problem of shadowing is solved; the display quality of a display device, in particular, using the oscillating voltage driving method can be remarkably improved.

The shadowing will be briefly described. The shadowing is caused in the case where a plurality of pixels in one horizontal line are supplied with different voltages. The voltage applied to a pixel affects the voltage applied to another pixel. The shadowing is caused particularly in a display device using an oscillating voltage driving method. The case where the gray-scale voltages $v_1$ and $v_5$ are applied to pixels in one horizontal line is exemplified. Since the gray-scale voltage $v_1$ is an interpolated voltage made of an oscillating voltage, its waveform does not have an ideal rectangular shape as shown in FIG. 58. The fluctuation of this waveform affects the waveform of the gray-scale voltage $v_5$ which is not made of an oscillating voltage. However, as described above, according to the present invention, the fluctuation of a voltage can be minimized, preventing the shadowing.

It is noted that the present invention can be applied to the conventional drive circuit for a display panel, using the source driver with the structure as shown in FIG. 55 which does not perform a gray-scale interpolation by the oscillating voltage driving method.

There is no special limit to the structure of an internal circuit of the power supply 7, the gray-scale power supply circuit 14, and the common electrode drive circuit 10. Each of the power supply 7, the gray-scale power supply circuit 14, and the common electrode drive circuit 10 may have a structure as shown in FIG. 57 or other structures. Examples of the other structures include those disclosed in the related art of the present applicant. Alternatively, the conventional drive circuit shown in FIG. 55 may be used. In this case, a great effect of preventing the generation of shadowing or the like can be obtained.

EXAMPLE 20

Figure 35:
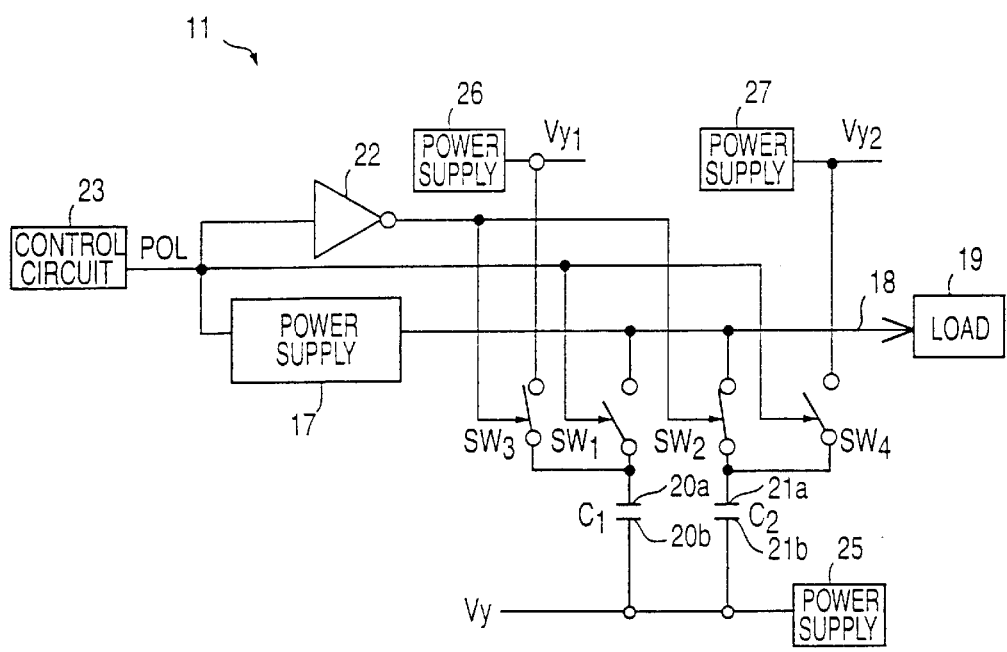
FIG. 35 is a circuit diagram of a power supply circuit of Example 20.
Figure 36:
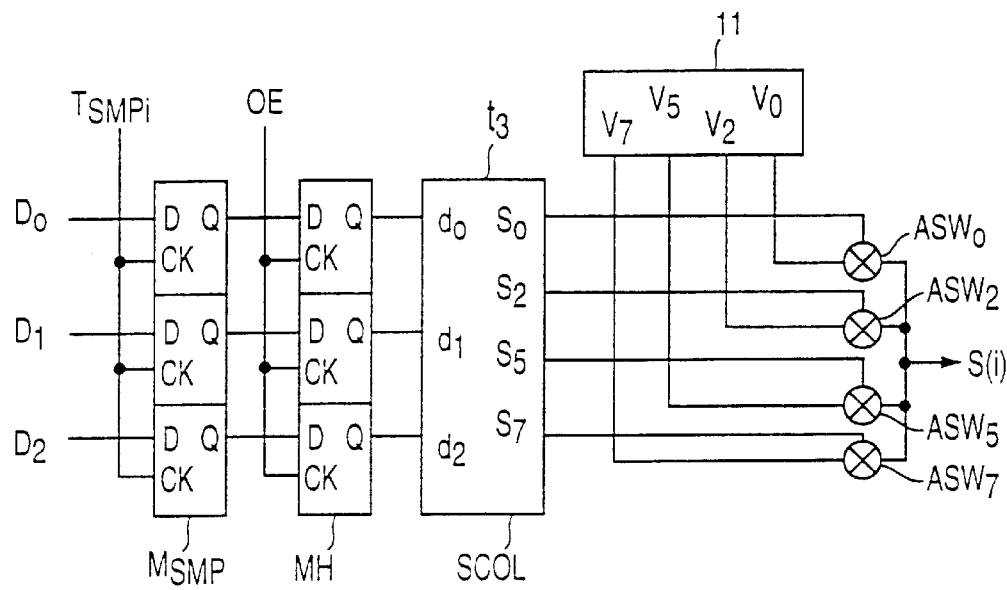
FIG. 36 is a block diagram of the data drive circuit.
Figure 37:
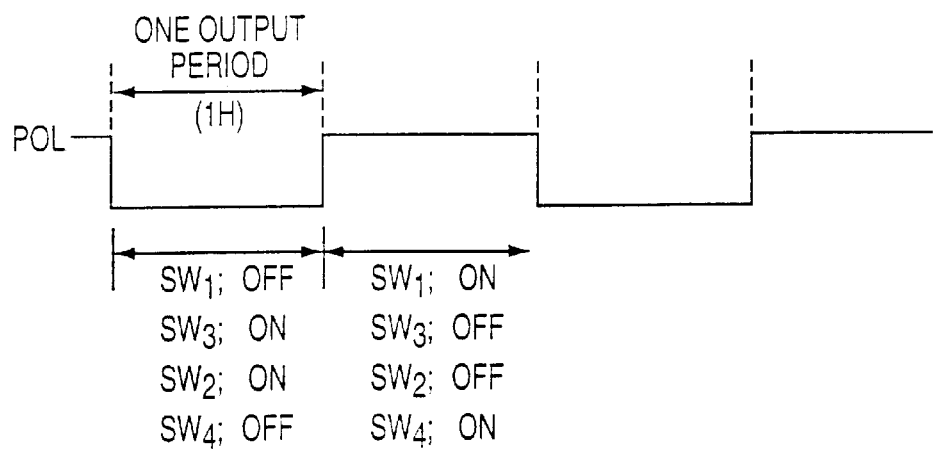
FIG. 37 is a timing chart illustrating the operation of a power supply circuit.

FIG. 35 shows an example of a power supply circuit diagram of the present invention used in Example 20. FIG. 36 is a block diagram of an active matrix liquid crystal display device (hereinafter, referred to as a display device). FIG. 37 is a block diagram of the source driver 220. The present example is characterized by the structure of a gray-scale voltage generating circuit 11 shown in FIG. 35.

The gray-scale voltage generating circuit 11 is used for a gray-scale display of a source driver in a flat type display device such as a liquid crystal display device or for driving a common electrode. The gray-scale voltage generating circuit 11 is provided with a voltage source and a storage unit such a capacitor. The connection and disconnection between the voltage source and the storage unit is controlled by a switching element. When being disconnected from the voltage source, the storage unit is connected to another circuit having a certain electric potential. Because of this, part of the charge and discharge current between the power supply and the load can be supplied from the storage unit, in the case where the level of an output from the power supply is switched.

As shown in FIG. 24, a display portion includes M×N pixel electrodes P(i, j) (i=1, 2, . . . , N; j=1,2, . . . ,M ) arranged in M rows and N columns and a switching elements T(i, j) (i=1,2, . . . ,N; j=1,2, . . . ,M ) respectively connected to the pixel electrodes P(i, j). The source driver 220 and a scanning circuit 300 constitute a drive circuit for driving the display portion. N signal lines S(i) (i=1,2, . . . ,N) in the display portion respectively connect output terminals of the source driver 220 to the switching elements T(i, j). M scanning lines G(j) (j=1,2, . . . ,M) in the display portion respectively connect output terminals of the gate driver 300 to the switching elements T(i, j).

A thin film transistor (TFT) can be used as the switching element T(i, j). Other kinds of switching elements can also be used. Hereinafter, the TFT is exemplified, so that the scanning line G(j) is referred to as a gate line G(j).

A voltage is successively output to the gate line G(j) from the gate driver 300 through the output terminal G(j). This voltage is at a high level for a particular period (hereinafter, referred to as one horizontal scanning period (j)th (j=1,2, . . . ,M)). With respect to the variable j=1,2, . . . ,M, the total periods of the respective horizontal period (j)th are referred to as one vertical scanning period.

When a voltage level of a gate signal output to the gate line G(j) is high, the switching element T(i, j) is in an ON state. When the switching element T(i, j) is in an ON state, the pixel electrode P(i, j) is charged in accordance with a voltage output from the output terminal of the source driver 220 to the signal line S(i). The level of the charged voltage is retained at a predetermined one during one vertical scanning period and a voltage at this level is applied to the pixel electrode P(i, j).

FIG. 36 is a block diagram showing an internal structure (fundamental structure) of the source driver 220. Hereinafter, the case where image data is made of 3 bits ($D_0$, $D_1$, $D_2$) will be exemplified. More specifically, the image data has 8 gray scale values (i.e., 0 to 7), and a signal voltage to be given to each pixel electrode is as follows: any one of 4 levels of external gray-scale voltages $v_0$, $v_2$, $v_5$, and $v_7$ from the external gray-scale power supplies $V_0$, $V_2$, $V_5$, and $V_7$ in the external gray-scale voltage generating circuit 11, or one or more gray-scale voltages between any two of the external gray-scale voltages $v_0$, $v_2$, $v_5$, and $v_7$.

The source driver 220 is provided for the bits ($D_0$, $D_1$, $D_2$) of image data, including the first-stage D-type flip-flops $M_{SMP}$ for a sampling operation, the second-stage D-type flip-flops $M_H$ for a holding operation, the selection control circuit SCOL, and the analog switches $ASW_0$, $ASW_2$, $ASW_5$, and $ASW_7$ provided between the signal line S(i) and the four kinds of external gray-scale power supplies $V_0$, $V_2$, $V5$, and $V_7$. The analog switches $ASW_0$ to $ASW_7$ are provided with the external gray-scale voltages $v_0$, $v_2$, $v_5$, and $v_7$ and the control signals output from output terminals $S_0$, $S_2$, $S_5$, and $S_7$ of the selection control circuit SCOL. The selection control circuit SCOL is provided with the duty signal $t_3$ having a predetermined duty ratio.

In order to realize an 8-gray-scale display in the source driver 220 of FIG. 36, the number of the external gray-scale power supplies is reduced to half (i.e., 4) of the conventional example shown in FIG. 55. In the source driver 220, outputs from the gray-scale power supplies $V_1$, $V_3$, $V_4$, and $V_6$ are formed by the oscillating voltage driving method.

When the value of image data is 1, 2, 5, or 7, one of the external gray-scale voltages $v_0$, $v_2$, $v_5$, and $v_7$ is output to the signal line S(i). When the value of image data is other than 1, 2, 5, and 7, an oscillating signal having an appropriate oscillating frequency and a duty ratio is formed based on any two of the external gray-scale voltages $v_0$, $v_2$, $v_5$, and $v_7$ and the duty signal $t_3$. Based on the oscillating frequency and duty ratio of the oscillating signal, an oscillating voltage oscillating between any two of the external gray-scale voltages $v_0$, $v_2$, $v_5$, and $v_7$ is output to the signal line S(i). If this oscillating voltage is averaged in terms of time, voltages equal to the gray-scale voltages $v_1$, $v_3$, $v_4$, and $v_6$ can be obtained. In this way, 8-gray-scale display levels can be obtained from 4 levels of the external gray-scale power supplies.

FIG. 35 shows the structure of the gray-scale voltage generating circuit 11 provided in the source driver 220. The gray-scale voltage generating circuit 11 includes the power supply 17 to which the control signal POL which is switched between a high level and a low level per horizontal scanning period H. The power supply 17 outputs a power supply voltage having a rectangular waveform or an A.C. waveform similar thereto. The power supply 17 may have a structure similar to that of the power supply circuit shown in FIG. 57. A power supply line 18 connects the power supply 17 to a load 19. The load 19 includes the data line Oi, each switching element T(i, j), and each pixel electrode P(i, j).

One terminal 20a of the capacitor $C_1$ is connected to the power supply line 18 through the switch $SW_1$, and the other terminal 20b of the capacitor $C_1$ is connected to a power supply 25 which outputs a predetermined electric potential $V_y$. One terminal 21a of the capacitor $C_2$ is connected to the power supply line 18 through the switch $SW_2$, and the other terminal 21b of the capacitor $C_2$ is connected to the power supply 25. Further, the terminal 20a of the capacitor $C_1$ is connected through the switch $SW_3$ to the power supply 26 which outputs a predetermined electric potential $V_{y1}$, and the terminal 21a of the capacitor $C_2$ is connected through the switch $SW_4$ to the power supply 27 which outputs a predetermined electric potential $V_{y2}$.

The control signal POL is generated by a control circuit 620 which is provided in the source driver 220. The control signal POL is input to the power supply 17 and then to the switches $SW_1$ and $SW_4$ as a control signal for switching between an ON state (conductive state) and an OFF state (non-conductive state) of the switches $SW_1$ and $SW_4$. The control signal POL has its polarity inverted by an inversion circuit 22 per horizontal scanning period H, and an inverted control signal POL is input to the switches $SW_2$ and $SW_3$ as a control signal for switching between an ON state and an OFF state of the switches $SW_2$ and $SW_3$. Each of the switches $SW_1$ to $SW_4$ is in an ON state when the control signal POL or the inverted control signal POL is at a high level and is in an OFF state when the control signal POL or the inverted control signal POL is at a low level. It is also possible that each of the switches $SW_1$ to $SW_4$ is in an OFF state when the control signal POL or the inverted control signal POL is at a low level and is in an ON state when the control signal POL or the inverted control signal POL is at a high level.

As described above, the switches $SW_1$ and $SW_2$ are in an ON state and the capacitors $C_1$ and $C_2$ are connected to the power supply line 18, while the control signal POL is at a high level or at a low level. The capacitors $C_1$ and $C_2$ are respectively connected to the power supplies 26 and 27 by the switches $SW_3$ and $SW_4$, when being disconnected from the power supply line 18 extending from the power supply 17 by the switches $SW_1$ and $SW_2$.

In the present example, irrespective of the structure of the power supply 17, the peak current characteristics of a current from the gray-scale voltage generating circuit 11 to the load 19 can be made small. In the following description, the power supply 17 is assumed to have the same structure as that of the power supply circuit shown in FIG. 57.

FIG. 37 is a timing chart illustrating the operation of the gray-scale voltage generating circuit 11 shown in FIG. 35. Here, the case where the control signal POL is at a high level corresponds to the case where the pixel P shown in FIG. 35 is positively charged, and the case where the control signal POL is at a low level corresponds to the case where the pixel P is negatively charged. The power supply 17 switches the polarity of the output voltage based on the level of the control signal POL.

In FIG. 37, When the control signal POL is at a low level, the output voltage of the power supply 17 becomes negative, the switches $SW_2$ and $SW_3$ are turned on, and the switches $SW_1$ and $SW_4$ are turned off. As a result, the capacitor $C_1$ is charged with the electric potential $V_{y1}$ which is set to be a level in the vicinity of that of the output voltage from the power supply 17 in a positive time period. At this time, the capacitor $C_2$ is connected to the power supply line 18.

Then, the control signal POL becomes a high level, the output voltage from the power supply 17 becomes positive, the switches $SW_1$ and $SW_4$ are turned on, and the switches $SW_2$ and $SW_3$ are turned off. When the switch $SW_1$ is turned on, the capacitor $C_1$ is connected to the power supply line 18 and is charged with the output potential from the power supply 17. At this time, the capacitor $C_1$ is charged with the electric potential $V_{y1}$, thus constituting a circuit, which supplies or absorbs a charge, between the power supply 17 and the load 19 containing the signal line S(i) or the like shown in FIG. 58. Thus, in the case where a charge current or a discharge current of the load 19 is rapidly fluctuated, the fluctuated current can be supplied by the power supply 17 and the capacitor $C_1$. The capacitor $C_2$ is charged with an electric potential $V_{y2}$ which is set to be a level in the vicinity of that of the output voltage from the power supply 17 in a negative time period.

When the control signal POL becomes a low level again, the output voltage from the power supply 17 becomes negative, the switches $SW_2$ and $SW_3$ are turned on, and the switches $SW_1$ and $SW_4$ are turned off. As a result, the capacitor $C_1$ is charged with the electric potential $Vy_1$ which is set to be a level in the vicinity of that of the output voltage from the power supply 17 in a positive time period. The capacitor $C_2$ is connected to the power supply line 18. At this time, the capacitor $C_2$ in addition to the power supply 17 constitutes a circuit, which supplies a charge to the load 19 or absorbs a charge therefrom.

Thus, while being disconnected from the power supply 17, the capacitor $C_1$ is charged with the electric potential $V_{y1}$ whose level is in the vicinity of that of the voltage output from the power supply 17 during this period. Because of this, part of a charge and discharge current, which is used at the time when the power supply voltage from the power supply 17 is inverted between the first level and the second level, is supplied from the capacitor $C_1$. Owing to this structure, a simplified and miniaturized power supply with a small current capacity can be used as the power supply 17. Consequently, a simplified and miniaturized power supply circuit having a small current capacity and a low current consumption can be realized as the gray-scale voltage generating circuit 11.

EXAMPLE 21

Figure 38:
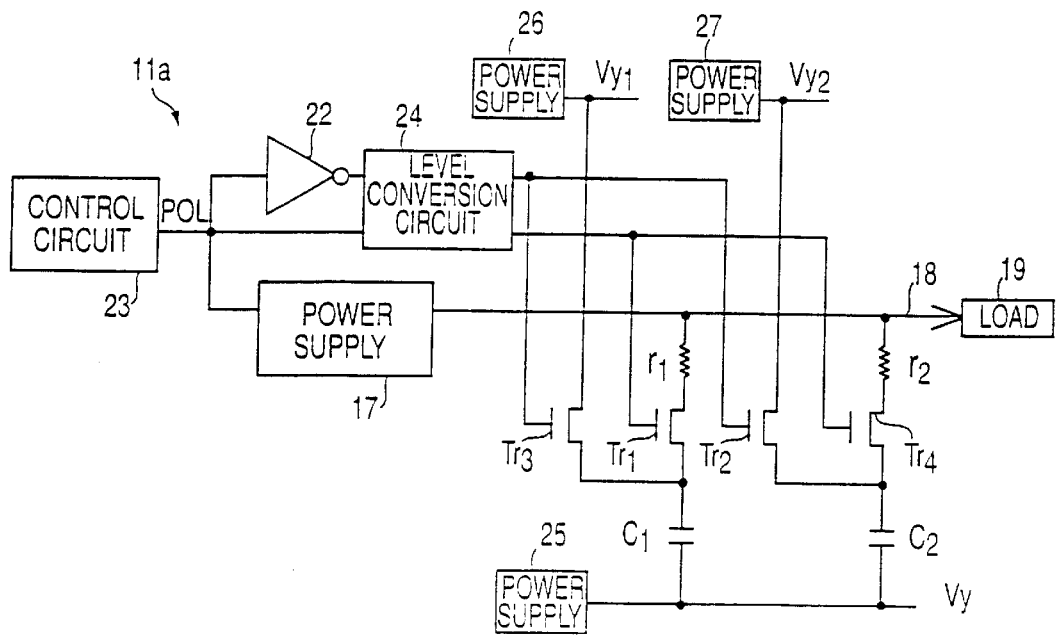
FIG. 38 is a circuit diagram of a power supply circuit of Example 21.

FIG. 38 shows a circuit diagram of a gray-scale voltage generating circuit 11a of the present example. Components identical with those of Example 20 bear the identical reference numerals. In the present example, FETs are used as transistors $Tr_1$, $Tr_2$, $Tr_3$, and $Tr_4$ provided between the power supply 17 and the respective capacitors $C_1$ and $C_2$. The control signal POL and the inverted control signal $\overline{POL}$ are converted from the TTL (Transistor-Transistor Logic) level (for example) to that suitable for the control of the FETs by a level conversion circuit 24.

A resistor $r_1$ is connected in series between the transistor $Tr_1$ and the power supply line 18, and a resistor $r_2$ is connected in series between the transistor $Tr_2$ and the power supply line 18. These resistors $r_1$ and $r_2$ are provided for restricting the current. The purpose for providing these resistors $r_1$ and $r_2$ is to restrict the flow of a current out of or into the capacitors $C_1$ and $C_2$, thereby preventing the sudden flow of a large current. Thus, the damages to the transistors $Tr_1$ and $Tr_2$ and the load 19 such as the signal line S(i) are prevented from being caused. In addition, even when a large current is generated in the capacitors $C_1$ and $C_2$, the waste consumption of the current due to the absorption of the large current by the power supply 17 is prevented. In some cases, for example, depending upon the characteristics of the FET or other switching elements to be used, the resistors $r_1$ and $r_2$ are not required. The level conversion circuit 24 is not required depending upon the characteristics of the FET to be used.

The following description is related to Examples 20 and 21.

The electric potentials $V_y$, $V_{y1}$, and $V_{y2}$ of the power supply voltages respectively output from the power supplies 25, 26, and 27 will be described in detail. It is desired that the power supply circuit 26 outputs the electric potential $V_{y1}$ close to the electric potential in the case where the output from the power supply 17 is in a positive time period. On the other hand, it is desired that the power supply circuit 27 outputs the electric potential $V_{y2}$ close to the electric potential in the case where the output from the power supply 17 is in a negative time period. Further, it is desired that the electric potential $V_y$ output from the power supply 25 is between the electric potentials $V_{y1}$ and $Vy_2$. Thus, in the display device 12 including the gray-scale voltage generating circuits 11 and 11a, the existing power supply can be used as the power supplies 25, 26, and 27.

For practical use, the electric potentials $V_y$, $V_{y1}$, and $V_{y2}$ are not required to be restricted to the above-mentioned desired ones. As long as part of the charge and discharge current between the load 19 and the power supply 17 at the time of switching between a positive time period and a negative time period of the power supply voltage from the power supply 17 can be compensated as described above, there is no strict limit to the electric potentials $V_y$, $V_{y1}$, and $V_{y2}$.

EXAMPLE 22

Figure 39:
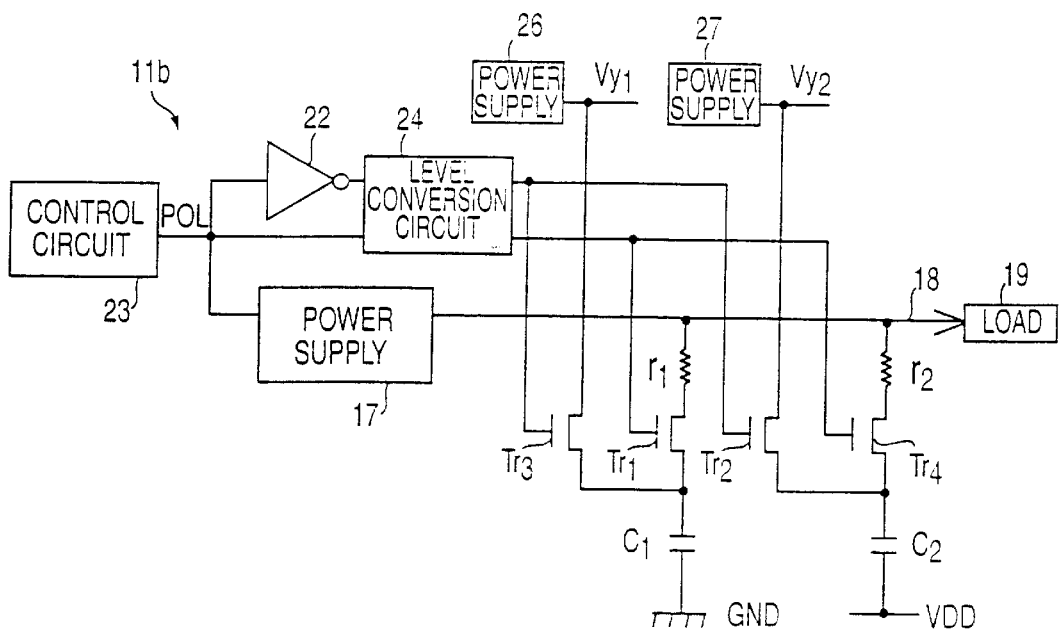
FIG. 39 is a circuit diagram of a power supply circuit of Example 22.

FIG. 39 shows a circuit diagram of a gray-scale voltage generating circuit 11b of the present example. As the electric potential $V_y$, electric potentials $V_{y1}$ and $V_{y2}$ are used. In the gray-scale voltage generating circuit 11b, the electric potential $V_y$, is set at 0 V and the electric potential $V_{y2}$ is set at $V_{DD}$ (+5 V).

In the present example, when the control signal POL is at a low level, the output voltage from the power supply 17 becomes negative, the transistors $Tr_2$ and $Tr_3$ are turned on, and the transistors $Tr_1$ and $Tr_4$ are turned off. Because of this, the capacitor $C_1$ is charged with a voltage between the electric potential $V_{y1}$ and the ground electric potential, where the voltage $V_{y1}$ is set so as to be close to that of the output voltage from the power supply 17 in a positive time period. The capacitor $C_2$ is connected to the power supply line 18.

Figure 56:
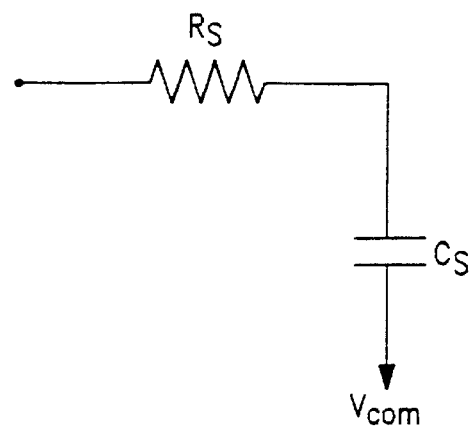
FIG. 56 is an equivalent circuit diagram of a signal line considered as a load.

Then, the control signal POL becomes a high level, the output voltage from the power source 17 becomes positive, the transistors $Tr_1$ and $Tr_4$ are turned on, and the transistors $Tr_2$ and $Tr_3$ are turned off. When the transistor $Tr_1$ is turned on, the capacitor $C_1$ is connected to the power supply line 18 and is charged with the output electric potential from the power supply 17. Here, the capacitor $C_1$ is charged with a voltage between the electric potential $V_y$, and the ground electric potential; therefore, the capacitor $C_1$ in addition to the power supply 17 constitutes a circuit, which supplies a charge to the load 19 including the signal line S(i) or the like shown in FIG. 56 or absorbs a charge therefrom. Accordingly, in the case where the charge current or the discharge current of the load 19 is rapidly fluctuated, the fluctuated current is supplied from the power supply 17 and the capacitor $C_1$. At this time, the capacitor $C_2$ is charged with a voltage between the electric potential $V_{y2}$ and the drive electric potential $V_{DD}$, where the electric potential $V_{y2}$ is set so as to be close to that of the output voltage from the power supply 17 in a negative time period.

When the control signal POL becomes a low level again, the output voltage from the power supply 17 becomes negative, the transistors $Tr_2$ and $Tr_3$ are turned on, and the transistors $Tr_1$ and $Tr_4$ are turned off. Because of this, the capacitor $C_1$ is charged with a voltage between the electric potential $V_1$ and the ground electric potential. The capacitor $C_2$ is connected to the power supply line 18. At this time, the capacitor $C_2$ in addition to the power supply 17 constitutes a circuit, which supplies a charge to the load 19 or absorbs a charge therefrom.

As described above, even when the gray-scale voltage generating circuit 11b having a structure shown in FIG. 39 is used, the effects described in Example 21 can be obtained. Further, the ground electric potential and the drive voltage $V_{DD}$ are used as the electric potential $V_y$, so that it is not required to use another circuit as the electric potential $V_y$, simplifying the structure of the gray-scale voltage generating circuit 11b.

In Examples 20 to 22, the current capacity characteristic with respect to the peak current of the power supply can be remarkably suppressed. In each of the examples, the power supply can include a less expensive operation amplifier having a small through rate. Thus, according to the specification of the operation amplifier, the current amplifier circuit is not required and the overall structure is simplified, miniaturized, and made less expensive. In addition, waste power consumption is minimized to realize a power supply circuit having a small power consumption.

EXAMPLE 23

Figure 40:
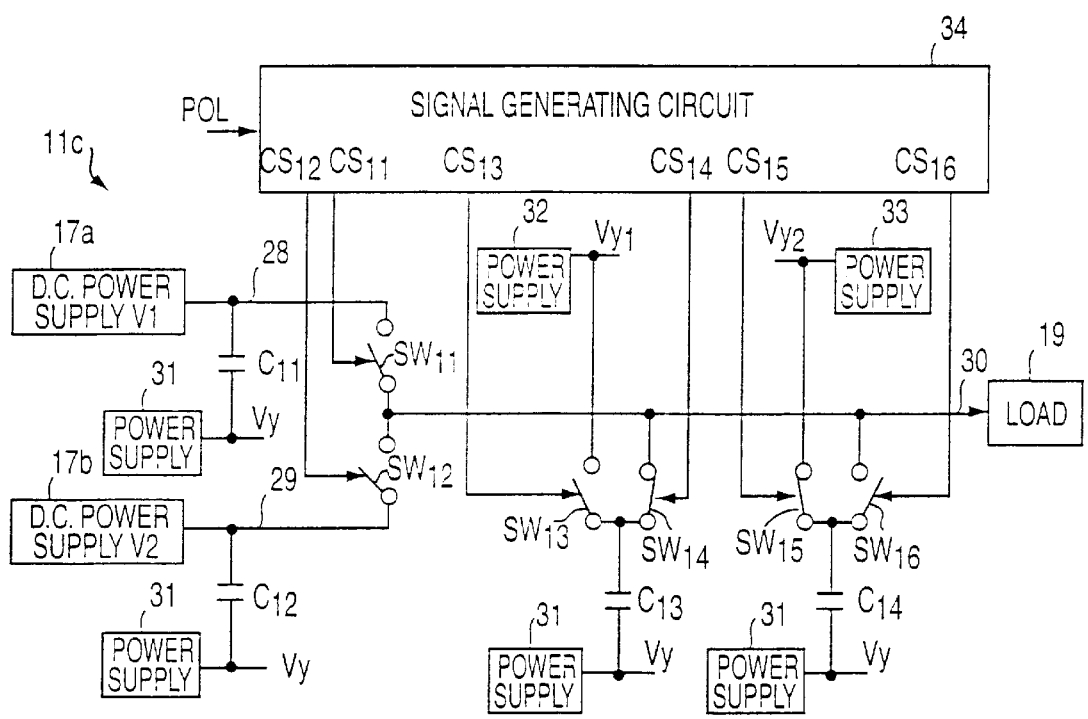
FIG. 40 is a circuit diagram of a power supply circuit of Example 23.

FIG. 40 is a circuit diagram showing an electrical structure of the gray-scale voltage generating circuit 11c of the present example. Components identical with those of Example 22 bear the identical reference numerals. The present example is characterized as follows:

The gray-scale voltage generating circuit of the present example includes two D.C. power supplies, switches, and capacitors respectively connected to a power supply line connected to the output side of the switches. The two D.C. power supplies are switched by means of the switches, whereby an A.C. voltage can be generated as an output from the gray-scale voltage generating circuit. In addition, the timing of connecting the capacitors to the power source line and the timing of switching the switches are appropriately regulated. Because of this structure, when the output voltage is switched between a positive state and a negative state in the power supply line, all or almost all of the suddenly generated charge and discharge current (peak current) of the load can be supplied from the capacitors.

The gray-scale voltage generating circuit 11c includes two D.C. power supplies 17a and 17b. The D.C. power supply 17a outputs a predetermined electric potential $V_1$, and the D.C. power supply 17b outputs a predetermined electric potential $V_2$ which is different from the electric potential $V_1$. These electric potentials $V_1$ and $V_2$ may have the same absolute values and have opposite polarities to each other.

A power supply line 28 extending from the D.C. power supply 17a is connected to a power supply 31 through a capacitor $C_{11}$. A power supply line 29 extending from the D.C. power supply 17b is also connected to a power supply 31 through a capacitor $C_{12}$. The power supply 31 outputs a predetermined electric potential $V_y$. The capacitors $C_{11}$ and $C_{12}$ are respectively provided so as to be in parallel with the power supply lines 28 and 29. The power supply lines 28 and 29 are connected to a common power supply line 30 respectively through switches $SW_{11}$ and $SW_{12}$. The switches $SW_{11}$ and $SW_{12}$ are respectively turned on/off by control signals $CS_{11}$ and $CS_{12}$ (described later).

The common power supply line 30 is connected to the load 19. The common power supply line 30 is connected to the power supply 31 through series circuits respectively consisting of a switch $SW_{14}$ and a capacitor $C_{13}$ and a switch $SW_{16}$ and a capacitor $C_{14}$. The terminal of the capacitor $C_{13}$ connected to the switch $SW_{14}$ is further connected to a power supply 32 through a switch $SW_{13}$. The terminal of the capacitor $C_{14}$ connected to the switch $SW_{16}$ is further connected to the power supply 33 through a switch $SW_{15}$. The power supplies 32 and 33 respectively output predetermined electric potentials $V_{y1}$ and $V_{y2}$. The switches $SW_{13}$, $SW_{14}$, $SW_{15}$, and $SW_{16}$ are respectively turned on/off by control signals $CS_{13}$, $CS_{14}$, $CS_{15}$, and $CS_{16}$. The control signals $CS_{11}$ to $CS_{16}$ are generated in a signal generating circuit 34 so as to have a timing of switching between a high level and a low level (described later) based on the control signal POL.

Figure 41:
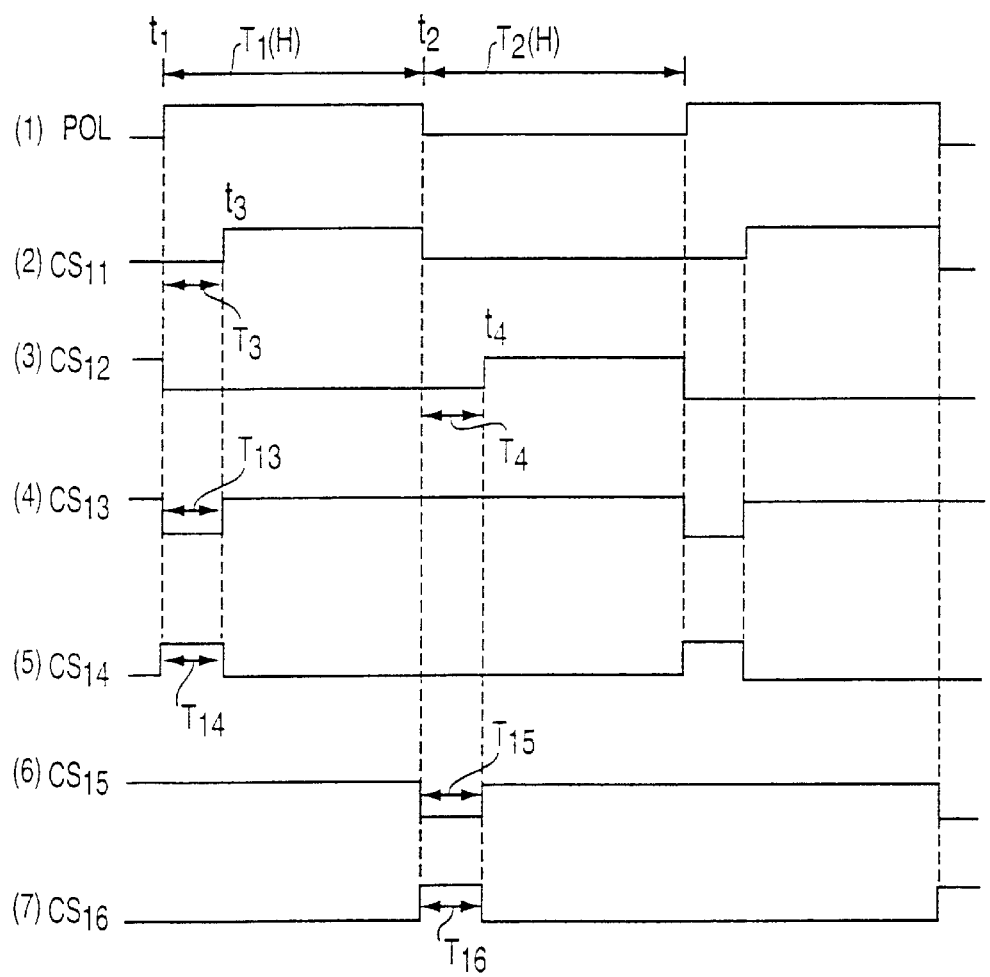
FIG. 41 is a timing chart illustrating the operation of a power supply circuit of Example 23.

FIG. 41 is a timing chart illustrating the operation of the gray-scale voltage generating circuit 11c of the present example. In this figure, (1) to (7) represent the timing relation between the control signal POL and the respective control signals $CS_{11}$ to $CS_{16}$.

As is represented in (1), the control signal POL has a high level period and a low level period alternately per horizontal scanning period. More specifically the control signal POL rises at a time $t_1$ and falls at a time $t_2$ (one horizontal scanning period $T_1(H)$ corresponds to a period from the time $t_1$ to $t_2$) and then rises again after the subsequent horizontal scanning period $T_2(H)$. As is represented in (2), the control signal $CS_{11}$ rises at a time $t_3$ (i.e., after a predetermined delay period $T_3$ from the time $t_1$) and falls together with the control signal POL. As is represented in (3), the control signal $CS_{12}$ falls together with the rise of the control signal POL and rises at a time $t_4$ (i.e., after a predetermined delay period $T_4$ from the time $t_2$). As is represented in (4), the control signal $CS_{13}$ falls together with the rise of the control signal POL and retains a low level during a period $T_{13}$, that is, until the time $t_3$. Then, the control signal $CS_{13}$ rises at the time $t_3$ and retains a high level until the control signal POL falls and rises again. As is represented in (5), the control signal $CS_{14}$ is an inverted signal of the control signal $CS_{13}$. Thus, the control signal $CS_{14}$ retains a high level during a period $T_{14}$ (which is the same as the period $T_{13}$) and a low level while the control signal $CS_{13}$ retains a high level. As is represented in (6), the control signal $CS_{15}$ falls at the time $t_2$ and rises at the time $t_4$, more specifically, the control signal $CS_{15}$ retains a low level during a period $T_{15}$ (from the time $t_2$ to $t_4$) and a high level during the other period. As is represented in (7), the control signal $CS_{16}$ is an inverted signal of the control signal $CS_{15}$. Thus, the control signal $CS_{16}$ retains a low level while the control signal $CS_{15}$ retains a high level and a high level during a period $T_{16}$ (which is the same as the period $T_{15}$).

Hereinafter, the operation of the present example will be described.

When the control signal $CS_{11}$ is at a high level, the switch $SW_1$, is connected to the D.C. power supply 17a and the power supply electric potential $V_1$ corresponding to a positive polarity is output to the common power supply line 30. During this time, the switch $SW_{15}$ is also in an ON state, and the capacitor $C_{14}$ is charged with the electric potential $V_{y2}$ which is set so as to be close to the power supply electric potential $V_2$ of the D.C. power supply 17b. At the time $t_2$, the D.C. power supply 17a is disconnected from the common power supply line 30. At the time $t_3$, the power supply 33 (electric potential $V_{y2}$) is disconnected from the capacitor $C_{14}$ and the capacitor $C_{14}$ is connected to the common power supply line 30.

At this time, the capacitor $C_{14}$ is charged with the electric potential $V_{y2}$ which is close to the power supply electric potential $V_2$ and the D.C. power supplies 17a and 17b are disconnected from the common power supply line 30. Thus, charging and discharging are effected only between the load 19 and the capacitor $C_{14}$. After the period $T_4$, in which the device is in a transient state, elapses, the switch $SW_{12}$ is turned on, the D.C. power supply 17b is connected to the common power supply line 30, and the power supply electric potential $V_2$ is output to the common power supply line 30. At this time, the capacitor $C_{14}$ is disconnected from the common power supply line 30 and is charged again with the power supply electric potential $V_{y2}$.

When the control signal POL is switched from a low level to a high level, the capacitor $C_{13}$ performs an operation similar to that described above with respect to the capacitor $C_{14}$.

Accordingly, the periods $T_3$ and $T_4$ (where both of the D.C. power supplies 17a and 17b are disconnected from the common power supply line 30) are provided in timing where the D.C. power supply 17a is switched to the D.C. power supply 17b and in the timing where the D.C. power supply 17b is switched to the D.C. power supply 17a. During the periods $T_3$ and $T_4$, the common power supply line 30 is connected to the capacitors $C_{13}$ and $C_{14}$.

As described above, in the present example, the same effects as those in Examples 21 and 22 can be obtained. Particularly, in the present example, all of the peak currents generated in the common power supply line 30 in the case where the polarity of the power supply voltage supplied to the load 19 is switched can be supplied from the capacitors $C_{13}$ and $C_{14}$. Because of this, the problem that the D.C. power supplies 17a and 17b should supply even part of the peak current has been solved. Therefore, the current capacity characteristics of the D.C. power supplies 17a and 17b can be remarkably suppressed.

EXAMPLE 24

Figure 42:
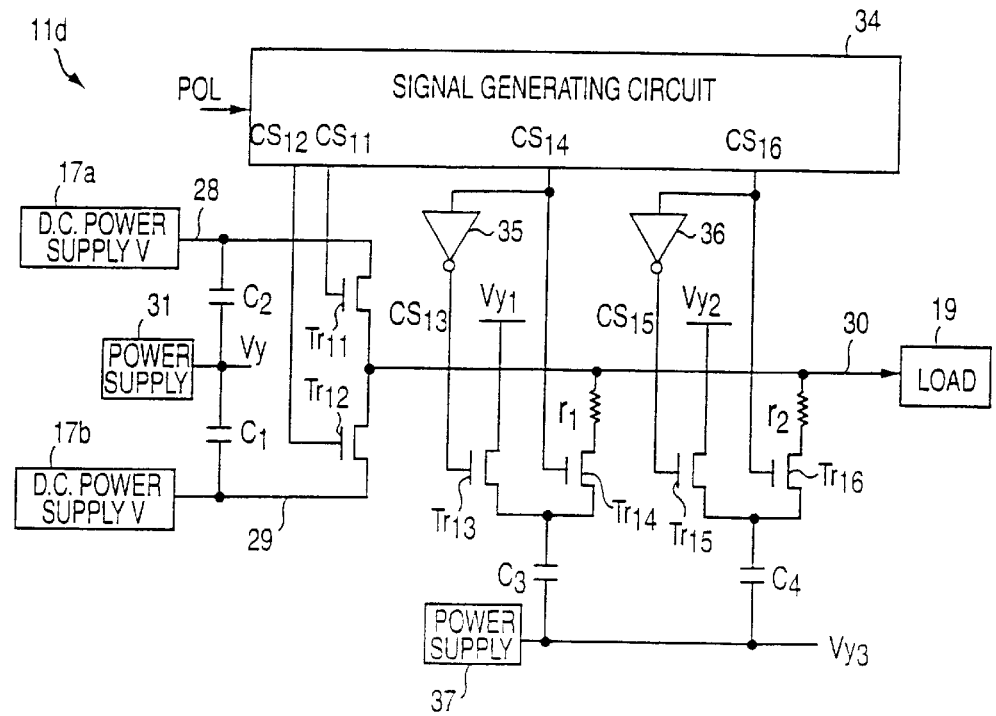
FIG. 42 is a circuit diagram of a power supply circuit of Example 24.

FIG. 42 is a circuit diagram of a gray-scale voltage generating circuit 11d of the present example. Components identical with those of Example 23 bear the identical reference numerals. In the present example, transistors $Tr_{11}$ to $Tr_{16}$ made of FETs are used as the switches $SW_{11}$ to $SW_{16}$ of the gray-scale voltage generating circuit 11c. The transistors $Tr_{11}$ and $Tr_{12}$ are turned on/off by the control signals $CS_{11}$ and $CS_{12}$. The transistors $Tr_{14}$ and $Tr_{16}$ are turned on/off by the control signals $CS_{14}$ and $CS_{16}$. The transistors $Tr_{13}$ and $Tr_{15}$ are turned on/off by control signals $\overline{CS}_{14}$ and $\overline{CS}_{16}$ (which are obtained by inverting the control signals $CS_{14}$ and $CS_{16}$ with inversion circuits 35 and 36).

As shown in FIG. 42, the transistors $Tr_{13}$ and $Tr_{14}$ are connected to a power supply 37 through the capacitor $C_3$ and the transistors $Tr_{15}$ and $Tr_{16}$ are connected to a power supply 37 through the capacitor $C_4$. The power supply 37 outputs a predetermined electric potential $V_{y3}$. Resistors $r_1$ and $r_2$ are respectively connected between the common power supply line 30 and the transistor $Tr_{14}$ and between the common power supply line 30 and the transistor $Tr_{16}$. The resistance values of the resistors $r_1$ and $r_2$ may be identical with each other. The resistors $r_1$ and $r_2$ restrict the current flowing from the capacitors $C_3$ and $C_4$ to the load 19. The resistors $r_1$ and $r_2$ are not required depending upon the ON resistance value of the switching elements such as TFTs to be used.

As described above, in the present example, the same effects as those of Examples 23 can be obtained.

EXAMPLE 25

Figure 43:
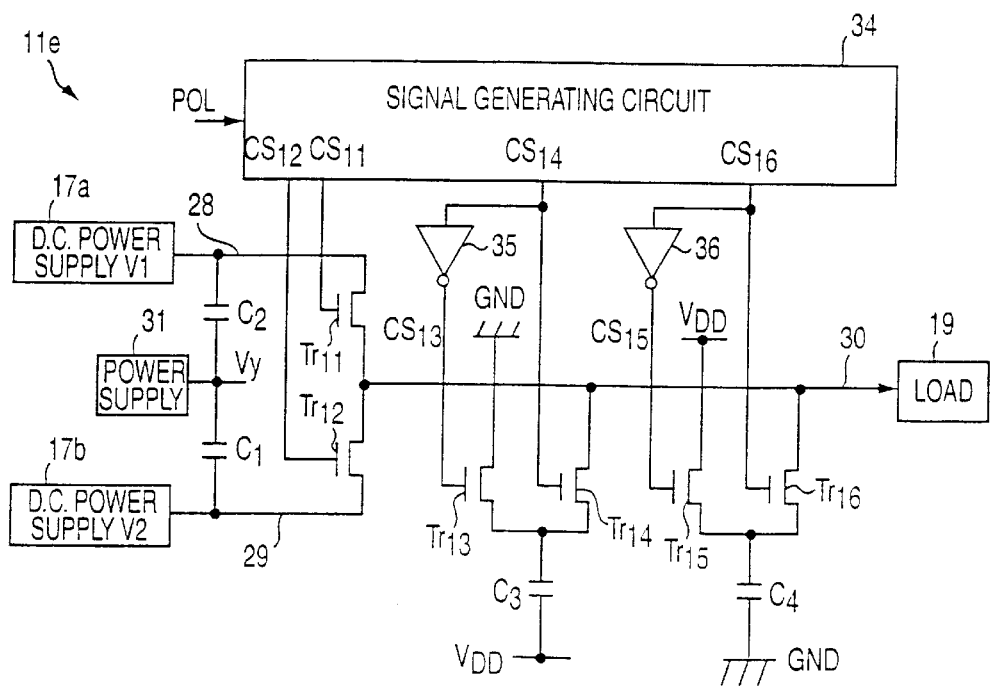
FIG. 43 is a circuit diagram of a power supply circuit of Example 25.

FIG. 43 shows a circuit diagram of a power supply circuit 11e of the present example. In the power supply circuit 11e, a ground electric potential GND is used as the electric potential $V_{y1}$ and the drive electric potential $V_{DD}$ is used as the electric potential $V_{y2}$. As the electric potential $Vy3_1$, two electric potentials $V_{DD}$ and GND are used. The capacitor $C_3$ is connected to the electric potential $V_{DD}$ and the capacitor $C_4$ is connected to the electric potential GND.

In Examples 23, 24, and 25, the electric potentials $V_{y1}$ and $V_{y2}$ are set so as to be close to the positive and negative electric potentials $V_1$ and $V_2$ of the output voltages from the D.C. power supplies 17a and 17b. For practical use, the electric potentials $V_{y1}$ and $V_{y2}$ are not required to be restricted in such a manner.

EXAMPLE 26

Figure 44:
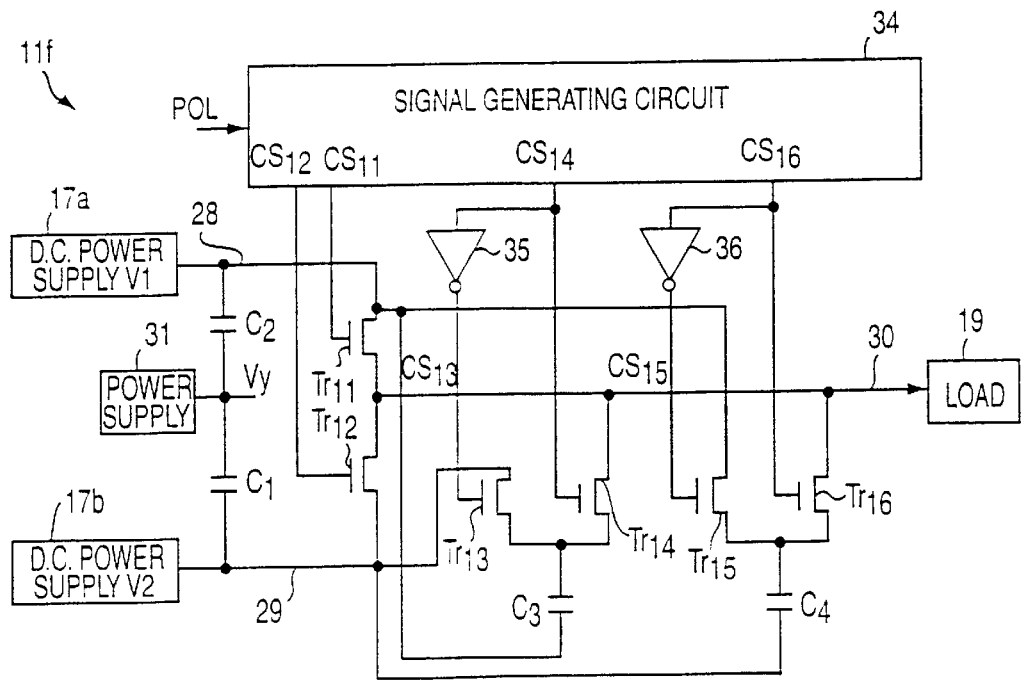
FIG. 44 is a circuit diagram of a power supply circuit of Example 26.

FIG. 44 is a circuit diagram of a power supply circuit 11f of the present example. Components identical with those of Example 25 bear the identical reference numerals. The power supply circuit 11f has the same structure as that of Example 25 with the following alterations:

The terminal of the transistor $Tr_{13}$ is connected to the power source line 29 extending from the D.C. power supply 17b instead of the ground electric potential GND. The terminal of the transistor $Tr_{15}$ is connected to the power supply line 28 extending from the D.C. power supply 17a instead of the drive electric potential $V_{DD}$. The terminal of the capacitor $C_3$ is connected to the power supply line 28 instead of the drive electric potential $V_{DD}$, and the terminal of the capacitor $C_4$ is connected to the power supply line 29 instead of the ground electric potential GND.

In the power supply circuit 11f with the above-mentioned structure, the same effects as those of Examples 25 can be obtained.

In the gray-scale voltage generating circuits 11c to 11f of Examples 23 to 26, the following effects can be realized.

(1) Since the power supply circuit, which outputs an A.C. voltage having a rectangular wave or the like, has a structure including two D.C. power supplies 17a and 17b and two switching elements $SW_{11}$ and $SW_{12}$, most of the charge and discharge current between the power supply circuit and the load, required in the case where the A.C. voltage is switched between a positive state and a negative state, can be supplied from the capacitors. Thus, the current capacity characteristics with respect to a peak current of the D.C. power supply for forming the rectangular wave can be substantially decreased.

(2) The current capacity characteristics can be decreased by 1/10 or more. Thus, the cost of the D.C. power supply can be greatly reduced.

(3) Withstanding the above, the gray-scale voltage generating circuits 11c to 11f of Examples 23 to 26 can have a rapid rise characteristic.

(4) Consequently, the display quality of the display device using the gray-scale voltage generating circuits 11c to 11f is improved.

(5) Further, the supply of a charge to the capacitors $C_1$ to $C_4$ and $C_{11}$ to $C_{14}$ can be performed by the gray-scale voltage generating circuits 11c to 11f, a circuit for generating a drive electric potential $V_{DD}$, a circuit for supplying a drive electric potential $V_{DD}$ or a ground circuit in the display device 12 can be used. Because of this, another circuit for generating and supplying a power supply voltage, another ground circuit, or the like are not required to be provided, simplifying the circuit structure.

(6) In this case, the waste power consumption caused when a charge is supplied is minimized, and power consumed for driving the D.C. power supply itself becomes small. Thus, as a whole, the power consumption which is not substantially required for driving the display portion can be greatly reduced.

EXAMPLE 27

Figure 45:
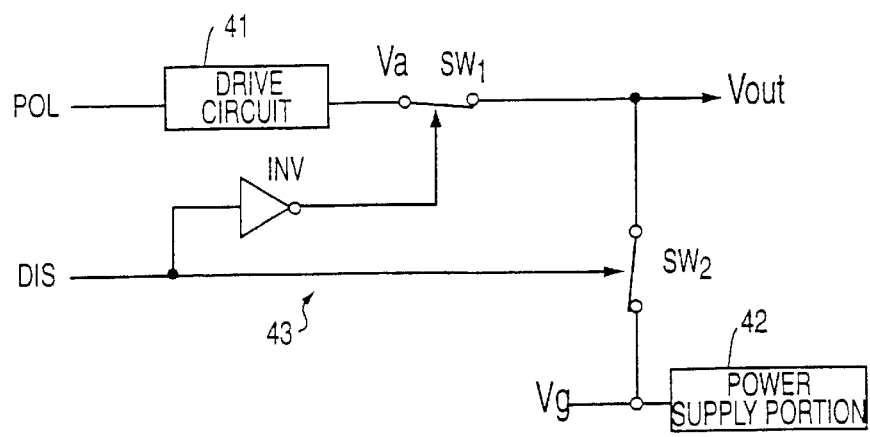
FIG. 45 is a circuit diagram showing the structure of a display drive device of Example 27.

FIG. 45 shows the structure of a voltage generating circuit 43. A drive circuit 41 is connected to an output terminal $V_{out}$ through a switch $SW_1$, and a power supply portion 42 is connected to the output terminal $V_{out}$ through a switch $SW_2$. The drive circuit 41 is provided with a control signal POL (polarity inversion signal). The switch $SW_2$ is provided with a control signal DIS. The control signal DIS is inverted by an inverter INV and then input to the switch $SW_1$. More specifically, when the switch $SW_1$ is in an ON state, the switch $SW_2$ is turned off, and when the switch $SW_1$ is in an OFF state, the switch $SW_2$ is turned on. It is desired that the switches $SW_1$ and $SW_2$ have the lowest possible ON resistance and a high OFF resistance.

Figure 46:
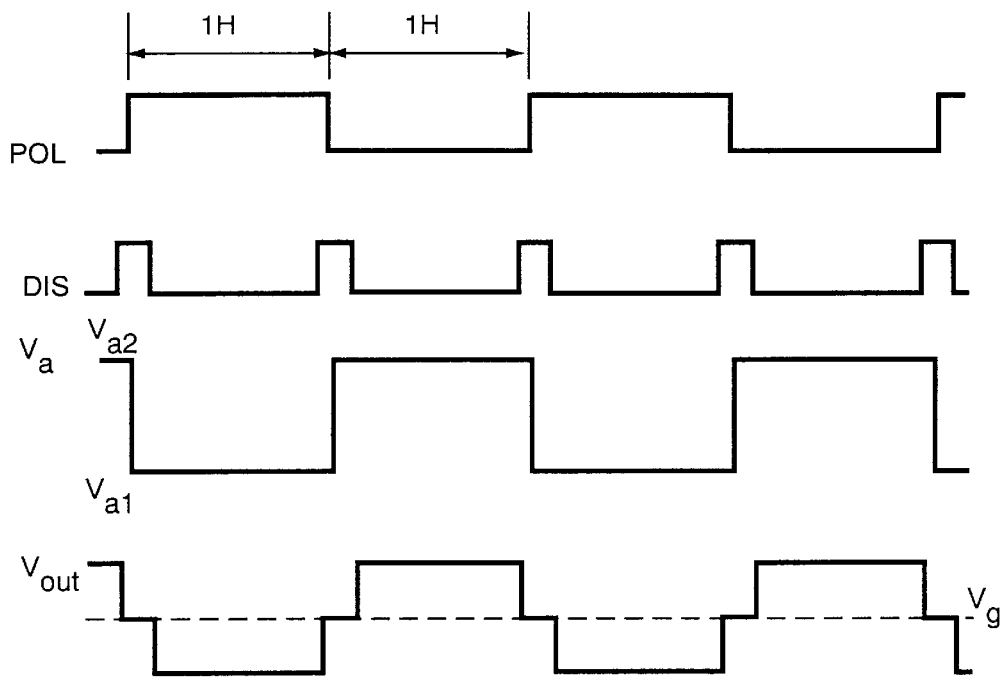
FIG. 46 is a waveform diagram showing the signal timing of each main portion of the display drive device of FIG. 45.

FIG. 46 shows a timing chart of each main portion of the voltage generating circuit 43 shown in FIG. 45. The operation of the voltage generating circuit 43 will be described with reference to this figure.

In a line inversion drive, the control signal POL is inverted per horizontal scanning period. When the control signal POL is at a high level, which corresponds to the time period where a pixel is positively charged, the drive circuit 41 outputs a voltage $V_{a1}$. When the control signal POL is at a low level, which corresponds to the time period where a pixel is negatively charge, the drive circuit 41 outputs a voltage $V_{a2}$. Thus, a voltage $V_a$ output from the drive circuit 41 is a rectangular waveform made of the voltages $V_{a1}$ and $V_{a2}$. The control signal DIS becomes a high level for a predetermined period, synchronized with the timing at which the inversion signal POL is switched from a high level to a low level and from a low level to a high level. Further, a power supply portion 42 outputs a power supply voltage $V_g$ having a level between those of the voltages $V_{a1}$ and $V_{a2}$ from the drive circuit 41. The drive circuit 41 is a rectangular waveform generating circuit, which is controlled by the control signal POL. When the control signal POL is at a high level, the drive circuit 41 outputs the voltage $V_a$, at a low level, and when the control signal POL is at a low level, the drive circuit 41 outputs the voltage $V_{a2}$ at a high level.

Thus, in the case of the voltage generating circuit 43, when the polarity of the control signal POL is switched, the drive circuit 41 is disconnected from the output terminal $V_{out}$ and the power supply portion 42 is connected to the output terminal $V_{out}$. Because of this, a rush (peak) current flowing when the polarity is switched is supplied from the power supply portion 42. In this way, the burden of the drive circuit 41 is alleviated. In addition, the power supply portion 42 generates the power supply voltage $V_g$ whose level is between those of the voltages $V_{a1}$ and $V_{a2}$ output from the drive circuit 41, whereby the rush current to be output from the drive circuit 41 can also be reduced.

EXAMPLE 28

Figure 47:
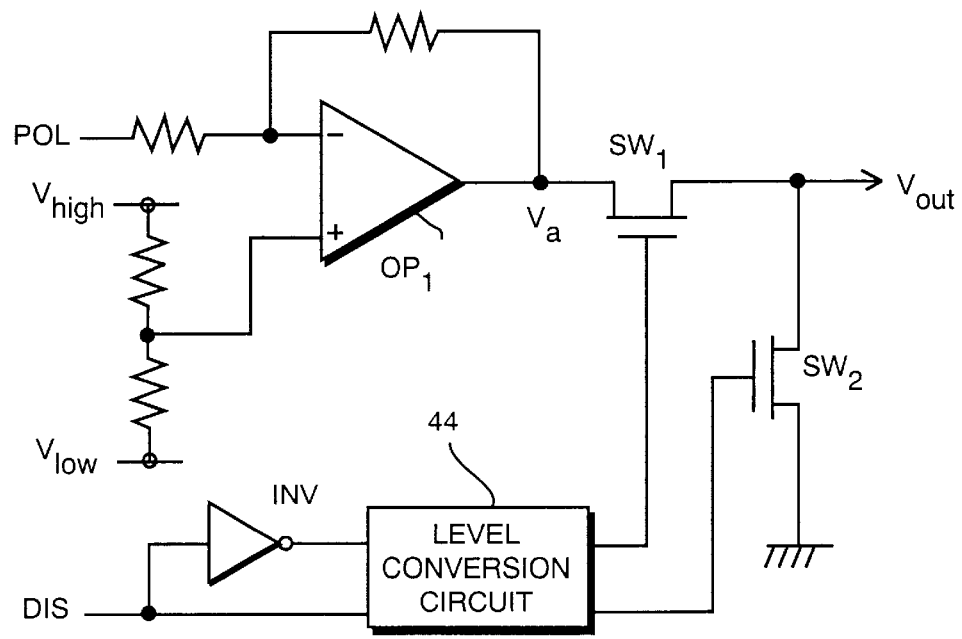
FIG. 47 is a circuit diagram showing the structure of the display drive device of Example 28.

As shown in FIG. 47, an operational amplifier $OP_1$ is used for the drive circuit 41 of Example 27. Further, in the present example, FETs are used as switches $SW_1$ and $SW_2$. FETs allow an electric current to flow bidirectionally and have a remarkably small ON resistance, so that the FETs are suitable for use as a switching circuit of the present invention. The levels of the control signal DIS and its inverted signal obtained through an inverter INV, which are given at a logic level, can be converted to those suitable for controlling the FETs by a level conversion circuit 44. The level conversion circuit 44 is not required, depending upon the characteristics of FETs to be used.

In the above-mentioned structure, an output voltage $V_a$ from the operational amplifier $OP_1$ is disconnected from an output terminal $V_{out}$ of the drive circuit by the switch $SW_1$, and then, the output terminal $V_{out}$ is grounded by the switch $SW_2$. In the case where the output voltage Va from the operational amplifier $OP_1$ becomes positive and negative respectively in different polarities of the control signal POL, the output terminal $V_{out}$ is grounded to an electric potential GND instead of being connected to the power supply portion 42 as shown in FIG. 45, whereby overall power consumption of the drive circuit can be reduced. The reason for this is as follows:

In Example 27, the power supply portion 42 supplies a rush current while the rush current from the drive circuit 41 is reduced. When the output terminal $V_{out}$ is grounded to the electric potential GND instead of being connected to the power supply portion 42, the rush current flowing when the polarity of the control signal POL is switched can be supplied from the ground.

In this case, the switches $SW_1$ and $SW_2$ are not turned on together; therefore, there is no possibility that the electric current output from the operational amplifier $OP_1$ flows into the ground through the switches $SW_1$ and $SW_2$.

In the present example, a FET is exemplified as a switching circuit. The present example is not limited thereto. Other kinds of switching elements can be used.

EXAMPLE 29

In Examples 27 and 28, the switches $SW_1$ and $SW_2$ are not turned on together. However, in the case where a switch having a large transient response such as an MOS analog switch is used, a feedthrough current is likely to flow in a transient period from an On state to an OFF state or from an OFF state to an ON state. In this case, if each switch is set to be turned off together for a predetermined period at a timing where the switches $SW_1$ and $SW_2$ are turned on/off, the feedthrough current does not flow. The OFF period is set so as to be longer than a switching period (transient period) of the switches $SW_1$ and $SW_2$.

In Examples 27 to 29, the common electrode drive circuit is described. However, the same effects as those in these examples can be obtained in the gray-scale voltage generating circuit which directly outputs an externally provided gray-scale voltage or an interpolated voltage formed by the combination of gray-scale voltages. Further, in these examples, the timing per horizontal scanning period in a line inversion drive method is exemplified. The present invention is not limited thereto, and other timings can be used depending upon a driving method to be used.

As described above, according to Examples 27 to 29, a rush current flowing when the polarity of the control signal POL is switched is prevented from being compensated by the drive portion itself; thus, the rush current from the drive portion is greatly decreased and a display drive device with a low power consumption can be realized. In addition, the deterioration of a display quality as seen in the conventional example, due to the strain of a voltage waveform caused by the rush current can be prevented. Moreover, unlike the conventional example, a complementary circuit for amplifying an electric current, which is made of a transistor or the like, is not required, thus decreasing the cost. The electric power consumed by transistors as in the conventional example is not required, leading to the reduction of electric power. Since the drive portion consumes a low electric power, that is, the drive portion itself becomes a low power consumption circuit, the circuit can be made smaller than the conventional one, leading to the miniaturization of the substrate of the drive portion, the economy of space, and a thin display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A drive circuit for a display device supplying a plurality of gray-scale voltages to the display device, based on externally supplied digital video signal data, comprising:

a plurality of gray-scale voltage power supplies;

a plurality of drive power supplies;

means for forming a first part of the plurality of gray-scale voltages using only the gray-scale voltage power supplies, means for forming a second part of the plurality of gray-scale voltages using only the drive power supplies.

2. A drive circuit for a display device according to claim 1, wherein the gray-scale voltages formed by the drive power supplies comprise at least one of a maximum gray-scale voltage and a minimum gray-scale voltage among the plurality of gray-scale voltages.

3. A drive circuit for a display device supplying a plurality of gray-scale voltages to the display device, based on externally supplied digital video signal data, comprising: a plurality of gray-scale power supplies, a plurality of drive power supplies, means for forming a first part of the plurality of gray-scale voltages using the gray-scale voltage power supplies, and means for forming a second part of the plurality of gray-scale voltages using the drive power supplies; and wherein the means for forming the second part of the plurality of gray-scale voltages by the drive power supplies comprises a pair of ON-OFF control means for forming one of the plurality of gray-scale voltages, respectively provided in first and second sections, one of the pair of ON-OFF control means in the first section is an AND circuit, the other of the pair of ON-OFF control means in the first section is a NOR circuit, the AND circuit performs an ON-OFF switch of one of the pair of ON-OFF control means in the second section, and the NOR circuit performs an ON-OFF switch of the other of the pair of ON-OFF control means in the second section.

4. A drive circuit for a display device supplying a plurality of gray-scale voltages to the display device, based on externally supplied digital video signal data, comprising:

a plurality of gray-scale power supplies, a plurality of drive power supplies, means for forming a first part of the plurality of gray-scale voltages using the gray-scale voltage power supplies, means for forming a second part of the plurality of gray-scale voltages using the drive power supplies; and switching circuitry for receiving outputs from each of the gray-scale power supplies and from each of the drive power supplies, the switching circuitry functioning so that the outputs from each of the gray-scale power supplies and drive power supplies can be selectively output from the switching circuitry as at least part of respective gray scale voltage(s) supplied to the display device.

5. A drive circuit for a display device according to claim 4, wherein the gray-scale voltages formed by the drive power supplies comprise at least one of a maximum gray-scale voltage and a minimum gray-scale voltage among the plurality of gray-scale voltages.

6. A drive circuit for a display device supplying a plurality of gray-scale voltages to the display device, based on externally supplied digital video signal data, comprising:

a plurality of gray-scale power supplies, a plurality of drive power supplies, switching circuitry for forming a first part of the plurality of gray-scale voltages using the gray-scale voltage power supplies, and for forming a second part of the plurality of gray-scale voltages using the drive power supplies; and wherein the switching circuitry receives outputs from each of the gray-scale power supplies and from each of the drive power supplies, the switching circuitry functioning so that the outputs from each of the gray-scale power supplies and drive power supplies can be selectively output from the switching circuitry as at least part of respective gray scale voltage(s) supplied to the display device.

* * * * *